United States Patent
Abe et al.

(10) Patent No.: US 8,049,389 B2
(45) Date of Patent: Nov. 1, 2011

(54) AXIAL GAP MOTOR

(75) Inventors: Shoei Abe, Saitama (JP); Manabu Sakurada, Saitama (JP); Keiichi Yamamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 12 days.

(21) Appl. No.: 12/457,106

(22) Filed: Jun. 1, 2009

(65) Prior Publication Data
US 2009/0295245 A1    Dec. 3, 2009

(30) Foreign Application Priority Data

Jun. 2, 2008  (JP) ................................. 2008-144917
Jun. 4, 2008  (JP) ................................. 2008-147037
Jun. 4, 2008  (JP) ................................. 2008-147038

(51) Int. Cl.
*H02K 1/27* (2006.01)
(52) U.S. Cl. ......... 310/156.62; 310/156.64; 310/156.65; 310/268
(58) Field of Classification Search ............. 310/156.08, 310/156.31, 156.33, 156.38, 156.48–156.56, 310/156.62–156.65, 216.045, 216.048, 216.049, 310/216.057–216.058, 216.062, 268, 418, 310/420, 423, 431
See application file for complete search history.

(56) References Cited

U.S. PATENT DOCUMENTS

| | | | | |
|---|---|---|---|---|
| 336,087 A * | 2/1886 | Brush | ............................ | 310/267 |
| 2,154,146 A * | 4/1939 | Becker | ......................... | 310/431 |
| 2,632,861 A * | 3/1953 | Morton et al. | ................ | 310/431 |
| 3,108,200 A * | 10/1963 | Baldwin | ................ | 310/216.083 |
| 3,465,188 A * | 9/1969 | Sisk | ....................... | 310/216.004 |
| 4,007,387 A | 2/1977 | Rustecki | | |
| 4,095,150 A | 6/1978 | Senckel | | |
| 4,864,175 A | 9/1989 | Rossi | | |
| 4,996,457 A | 2/1991 | Hawsey et al. | | |
| 5,142,179 A * | 8/1992 | Nakamura et al. | ..... | 310/216.133 |
| 5,245,238 A | 9/1993 | Lynch et al. | | |
| 5,334,899 A | 8/1994 | Skybyk | | |
| 5,387,854 A | 2/1995 | McCleer et al. | | |
| 5,394,321 A | 2/1995 | McCleer et al. | | |
| 5,397,953 A | 3/1995 | Cho | | |
| 5,642,009 A | 6/1997 | McCleer et al. | | |
| 5,757,108 A * | 5/1998 | Suzuki | ................... | 310/216.036 |
| 5,907,210 A | 5/1999 | Chaix | | |
| 5,925,965 A | 7/1999 | Li et al. | | |
| 5,955,809 A | 9/1999 | Shah | | |
| 6,373,162 B1 | 4/2002 | Liang et al. | | |
| 7,315,102 B2 | 1/2008 | Minagawa | | |
| 7,679,260 B2 * | 3/2010 | Yamamoto et al. | ........... | 310/268 |
| 7,737,594 B2 * | 6/2010 | Abe et al. | ................. | 310/156.53 |

(Continued)

FOREIGN PATENT DOCUMENTS

EP    1612913 A2    1/2006

(Continued)

*Primary Examiner* — Tran Nguyen
(74) *Attorney, Agent, or Firm* — Arent Fox, LLP

(57) ABSTRACT

An axial gap motor includes a rotor and a stator, and the rotor includes within a rotor frame a plurality of main magnet pieces which are disposed in a circumferential direction in such a manner that their magnetized direction is in a rotational axis direction and magnetic members which are disposed on surfaces of at least one sides in the rotational axis direction of the main magnet pieces. The magnetic member has a fitting portion on one end face in a radial direction of the rotor thereof which is adapted to fit in the rotor frame.

17 Claims, 36 Drawing Sheets

U.S. PATENT DOCUMENTS

| | | |
|---|---|---|
| 2004/0070307 A1 | 4/2004 | Haugan et al. |
| 2005/0194855 A1 | 9/2005 | Hasebe et al. |
| 2005/0285467 A1 | 12/2005 | Shimizu |
| 2006/0028093 A1* | 2/2006 | Minagawa et al. ............ 310/268 |
| 2006/0284507 A1* | 12/2006 | Murakami ............... 310/156.37 |
| 2007/0018520 A1 | 1/2007 | Kaneko et al. |
| 2007/0170802 A1 | 7/2007 | Potoradi |
| 2008/0129136 A1 | 6/2008 | Abe et al. |
| 2008/0290752 A1 | 11/2008 | Yamamoto et al. |
| 2009/0243422 A1* | 10/2009 | Atarashi et al. ........ 310/216.074 |
| 2009/0251021 A1* | 10/2009 | Atarashi et al. .......... 310/156.07 |
| 2009/0295245 A1 | 12/2009 | Abe et al. |
| 2009/0295246 A1* | 12/2009 | Abe ........................ 310/156.35 |
| 2010/0090555 A1* | 4/2010 | Tajima et al. ............ 310/156.35 |
| 2010/0117474 A1* | 5/2010 | Atarashi et al. .......... 310/156.43 |
| 2010/0141075 A1* | 6/2010 | Atarashi et al. .......... 310/156.35 |
| 2010/0187933 A1* | 7/2010 | Yamamoto et al. ...... 310/156.29 |
| 2010/0219710 A1* | 9/2010 | Kawamura et al. ...... 310/156.12 |

FOREIGN PATENT DOCUMENTS

| | | |
|---|---|---|
| EP | 1850451 A1 | 10/2007 |
| JP | 59-230453 A | 12/1984 |
| JP | 2-79174 U | 6/1990 |
| JP | 6-500457 A | 1/1994 |
| JP | 9-168263 A | 6/1997 |
| JP | 10-271784 A | 10/1998 |
| JP | 3062085 U | 6/1999 |
| JP | 11-511948 A | 10/1999 |
| JP | 2000-197301 A | 7/2000 |
| JP | 2000-262026 A | 9/2000 |
| JP | 2001-136721 A | 5/2001 |
| JP | 2002-112481 A | 4/2002 |
| JP | 2005-094955 A | 4/2005 |
| JP | 2005-269778 A | 9/2005 |
| JP | 2005-341696 A | 12/2005 |
| JP | 2006-166635 A | 6/2006 |
| JP | 2006-222131 A | 8/2006 |
| JP | 2006-527578 A | 11/2006 |
| JP | 2006-345627 A | 12/2006 |
| JP | 2007-028868 A | 2/2007 |
| JP | 2008-22663 A | 1/2008 |
| JP | 2008-048497 A | 2/2008 |
| JP | 2008-104278 A | 5/2008 |
| WO | WO 96/29774 A1 | 9/1996 |
| WO | WO 2004/109894 A1 | 12/2004 |
| WO | WO 2006/077812 | 7/2006 |

* cited by examiner

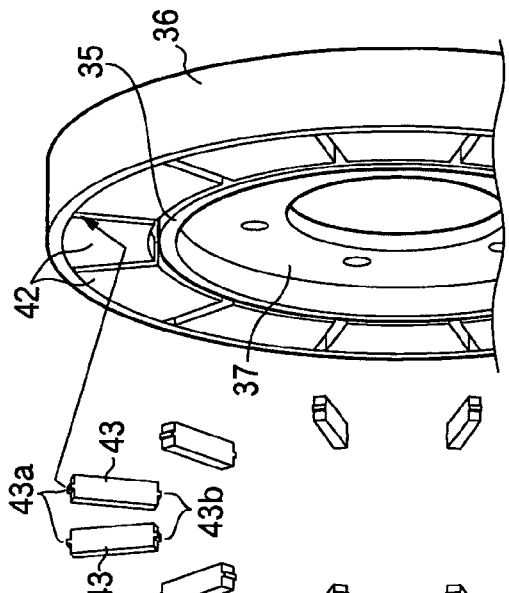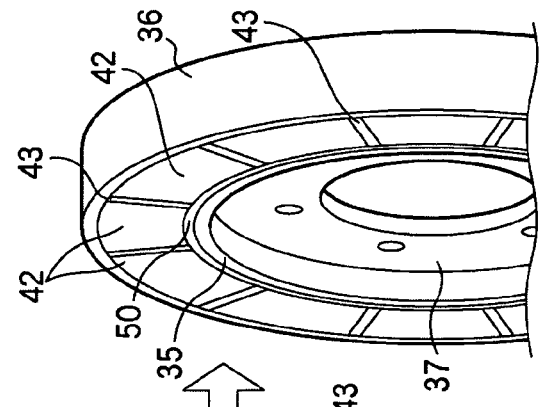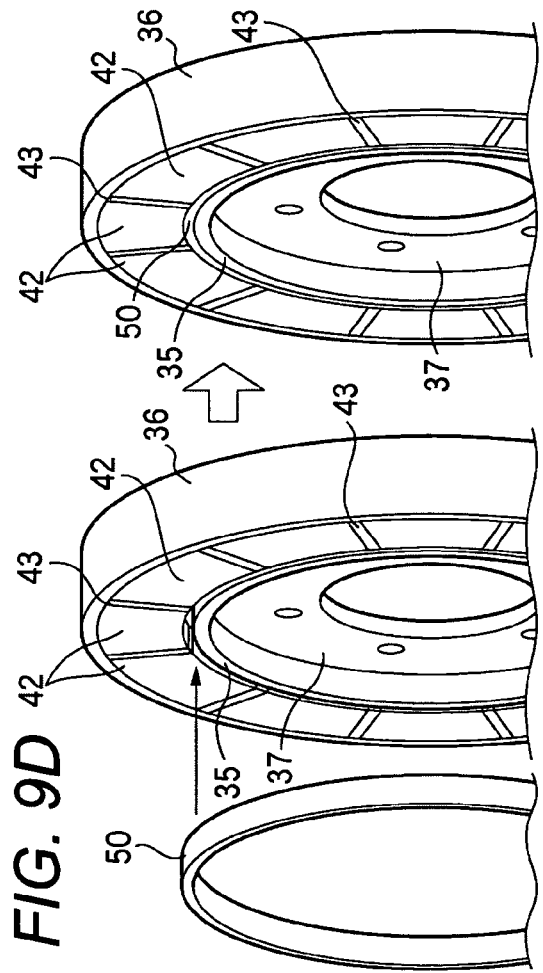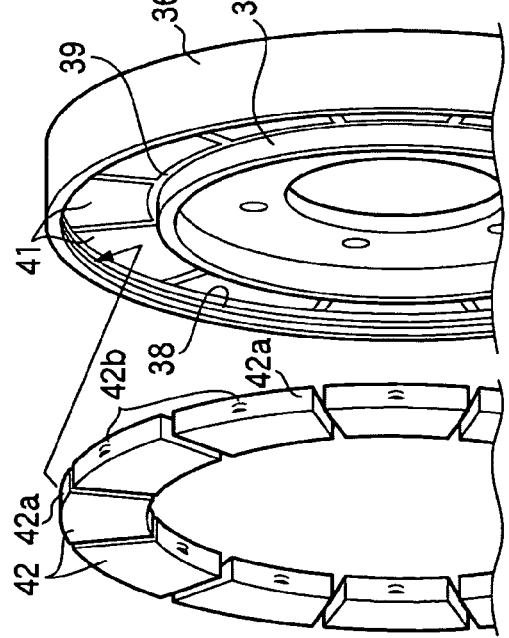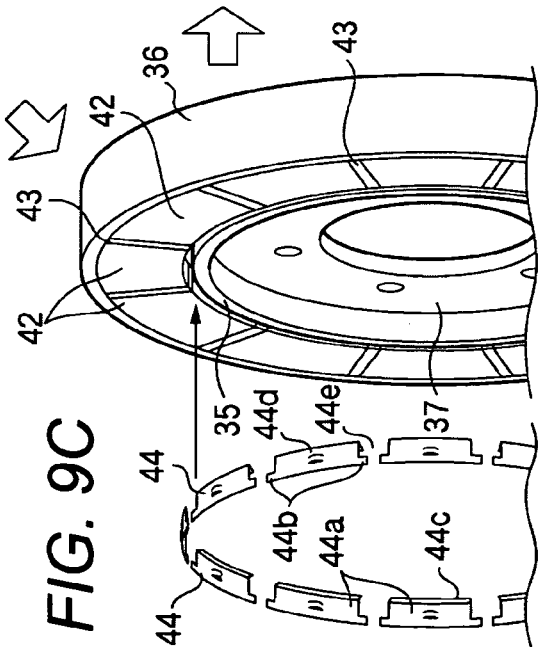

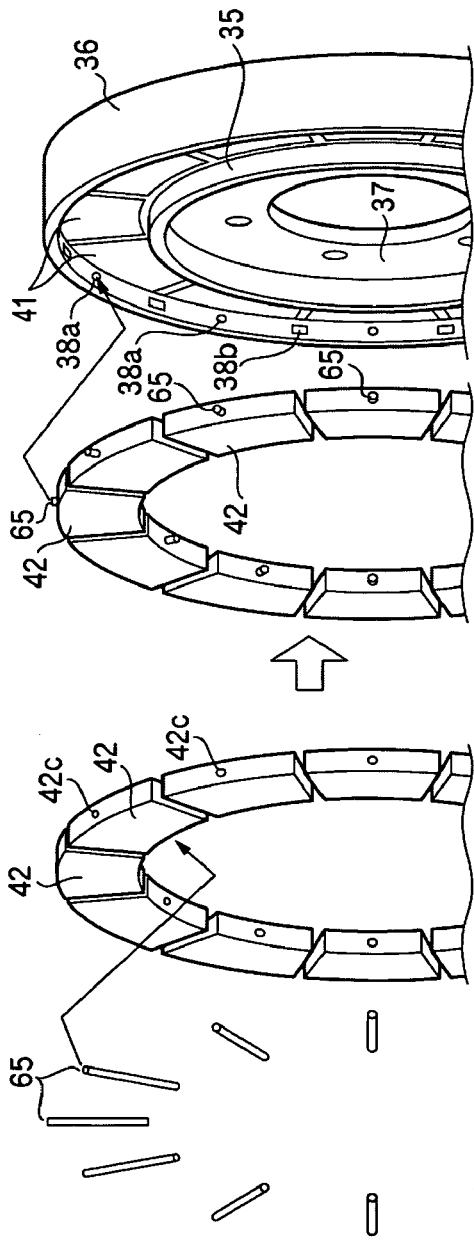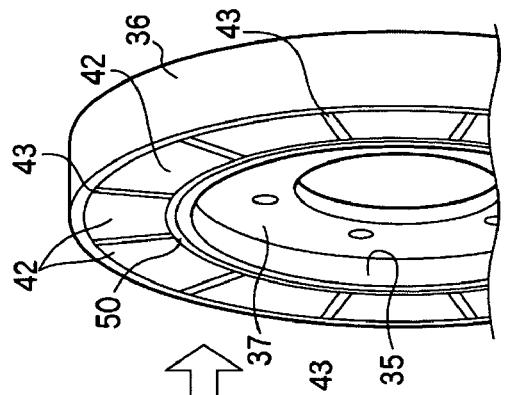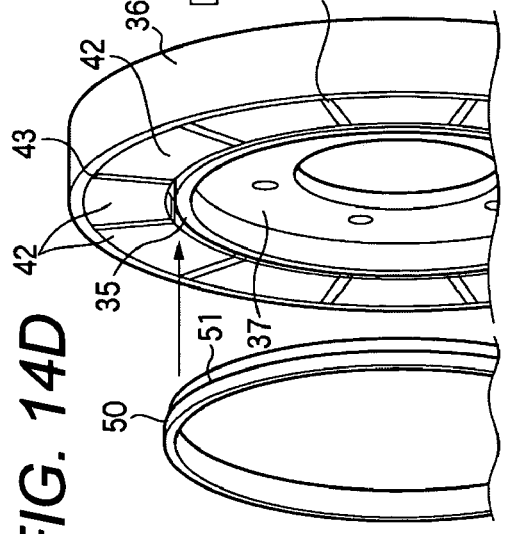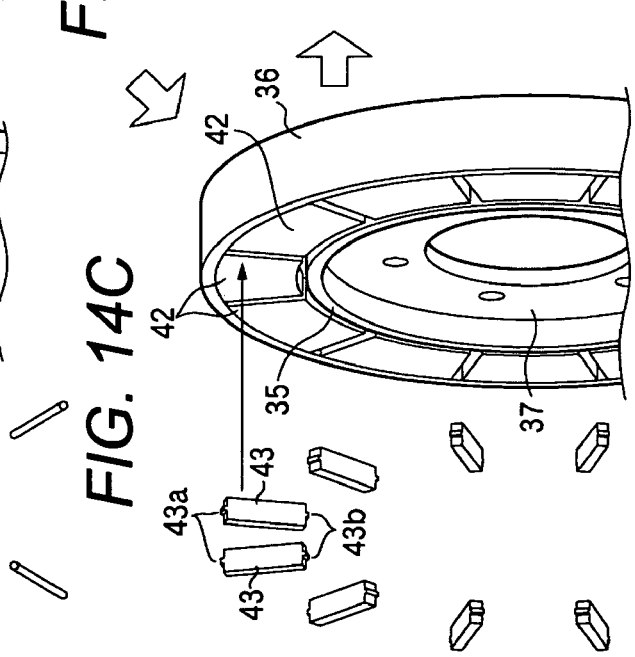

AXIAL GAP MOTOR

CROSS-REFERENCE TO RELATED APPLICATION

This application claims the priority of Japanese Application Nos. P2008-144917, filed Jun. 2, 2008, P2008-147037, filed Jun. 4, 2008 and P2008-147038, filed Jun. 4, 2008, the entire specifications, claims and drawings of which are incorporated herewith by reference.

TECHNICAL FIELD

The present disclosure relates to an axial gap motor.

RELATED ART

In related art, there have been known axial gap electric motor which include a stator which is disposed on at least one side in a rotational axis direction of a rotor in such a manner as to confront the rotor, so as to form magnetic flux loops relative to field magnetic flux by permanent magnets of the rotor (for example, refer to Patent Document 1 and Patent Document 2).

A rotor of an axial gap electric motor according to Patent Document 1 is configured in such a manner that a plurality of permanent magnets are disposed at equal intervals in a circumferential direction on a rotor core (a magnetic member) which is made up of stacked electromagnetic steel sheets. In addition, a rotor of an electric motor described in Patent Document 2 is such that a tape-like electromagnetic steel sheet is wound there round in a stacked fashion, and after permanent magnets are embedded in holes opened in an outer circumferential surface thereof, the tape-like electromagnetic sheet is wound further, with an end portion of the tape-like electromagnetic sheet being bonded to the outer circumferential surface. In addition, a rotor has also been known in which magnetic circuit elements such as a plurality of magnets like main magnets and sub-magnets and magnetic members are accommodated within a rotor frame which is made of a non-magnetic member.

[Patent Document 1] JP-A-2005-341696
[Patent Document 2] JP-A-2006-166635

In the electric motors described in Patent Document 1 and Patent Document 2, when the magnetic members are mounted within the rotor frame, in the event that the bonding force with which the magnetic members are bonded to the rotor frame is reduced due to an increase in temperature or deterioration with age, there has been a fear that the magnetic members themselves fall from the rotor frame due to a magnetic attracting force by the stator.

In addition, when the rotor rotates in which the magnetic circuit elements such as the magnets and the magnetic members are accommodated within the rotor frame, the rotor frame is deformed due to centrifugal force, or the magnets and the magnetic members are slightly displaced radially outwards by the centrifugal force acting on the magnets and the magnetic members, leading to a fear that a radial gap is generated between the magnets and the magnetic members or a circumferential gap is generated between the magnets and the magnetic members which are disposed adjacent to each other.

Additionally, when the temperatures at respective portions in the axial gap motor increase due to the operation thereof, there may be a situation in which gaps are generated between the constituent members of the axial gap motor due to different thermal expansion coefficients among the constituent members. Because of this, in a case where the constituent members are bonded to be fixed in place, in the event that centrifugal force and thermal expansion are repeatedly applied to the constituent members, the adhesion of the adhesive is reduced, and there is caused a possibility that the magnets and the magnetic members cannot resist the attracting force of the stator to thereby be caused to shift from their proper positions, leading to a fear that the motor properties of the axial gap motor is deteriorated.

Further, although the rotors described in Patent Document 1 and Patent Document 2 each have the construction in which the electromagnetic steel sheets are stacked one on another, they have a problem that there is no description on the fixing method of the plurality of electromagnetic steel sheets, or the rotor body round which the electromagnetic steel sheet is to be wound and which has the holes opened in the outer circumferential surface thereof is difficult to be manufactured. In addition, they also have their inherent problem that the assemblage of the rotor which has a number of permanent magnets and the magnetic members which are made up of stacked electromagnetic sheets involves many assembling steps and hence becomes complex and troublesome.

SUMMARY

Exemplary embodiments of the present invention provide an axial gap motor which can hold magnetic members in an ensured fashion against the magnetic attracting force of a stator.

In addition, exemplary embodiments of the present invention provide an axial gap motor which can hold magnets and magnetic members, in the event that the magnets and the magnetic members are displaced relative to a rotor frame due to centrifugal force generated when the rotor rotates or thermal expansion, with a substantially constant holding force by following the displacement.

Additionally, exemplary embodiments of the present invention provide an axial gap motor which can facilitate the assemblage of a rotor and reduce the manufacturing costs.

According to a first aspect of the invention, there is provided an axial gap motor including a rotor (for example, a rotor 11 in an embodiment that will be described later) which can rotate around a rotational axis and a stator (for example, a stator 12 in the embodiment that will be described later) which is disposed on at least one side in a rotational axis direction of the rotor in such a manner as to confront the rotor, wherein the rotor includes within a rotor frame (for example, a rotor frame 33 in the embodiment that will be described later) a plurality of main magnet portions (for example, main magnet portions 41 in the embodiment that will be described later) which are magnetized in the rotational axis direction and are disposed in a circumferential direction and magnetic members (for example, magnetic members 42 in the embodiment that will be described later) which are disposed individually on surfaces of the main magnet portions which face the at least one side in the rotational axis direction of the main magnet portions, and wherein the magnetic members have fitting portions (for example, clamping portions 42b or through pins 65 in the embodiment that will be described later) on one end faces in a radial direction of the rotor of the magnetic members for fitting in the rotor frame.

According to a second aspect of the invention, there is provided an axial gap motor as set forth in the first aspect, wherein the magnetic member is made up of magnetic sheets (for example, electromagnetic steel sheets 42a in the embodiment that will be described later) which each include a clamping portion and which are stacked together in the radial direction, and wherein the clamping portion of the magnetic sheet which configures the end face in the radial direction of the rotor of the magnetic member configures the fitting portion.

According to a third aspect of the invention, there is provided an axial gap motor as set forth in the second aspect, including hooking plates (for example, hooking plates 44 in the embodiment that will be described later) adapted to be brought into engagement with the clamping portions on the other end faces in the radial direction of the rotor of the magnetic members are provided between the other end faces in the radial direction of the rotor of the magnetic members and the rotor frame.

According to a fourth aspect of the invention, there is provided an axial gap motor as set forth in the first aspect, wherein a pin (for example, a through pin 65 in the embodiment that will be described later) is inserted into the magnetic member in such a manner as to penetrate through an interior thereof in the radial direction, and the pin that projects from the magnetic member configures the fitting portion.

According to a fifth aspect of the invention, there is provided an axial gap motor as set forth in the fourth aspect, having further an engagement ring (for example, a press ring 50 in the embodiment that will be described later) which is interposed between the other end faces in the radial direction of the rotor of the magnetic members and the rotor frame and is adapted to be brought into engagement with the pins for fixing.

According to a sixth aspect of the invention, there is provided an axial gap motor as set forth in the first aspect, wherein a plurality of fitting portions are provided on the one end face of the magnetic member.

According to a seventh aspect of the invention, there is an axial gap motor as set forth in the first aspect, wherein the rotor includes further a plurality of sub-magnet portions (for example, sub-magnet portions 43 in the embodiment that will be described later) which are magnetized in a circumferential direction and are disposed at both end portions of the main magnet portions, and wherein fitting portions (for example, projecting portions 43a, 43b in the embodiment that will be described later) which are adapted to be brought into engagement with the rotor frame are provided on one end faces in the radial direction of the rotor of the sub-magnet portions.

According to the first aspect of the invention, by the fitting portions provided on the one end faces in the radial direction of the rotor of the magnetic members fitting in the rotor frame, the fitting portions of the magnetic members fit in the rotor frame even when the magnetic attracting force of the stator acts on the magnetic members, whereby the magnetic members are caused to fall from the rotor frame in no case.

According to the second aspect of the invention, even when in the magnetic members which are each made up of the stack of magnetic sheets, the adhesion between the magnetic sheets is reduced due to the increase in temperature or deterioration with age, by the respective clamping portions of the magnetic sheets being caused to mesh with the magnetic sheets lying thereabove and therebelow, the occurrence of a drawback that the magnetic members are offset, broken or unfastened can be prevented.

According to the third aspect of the invention, by mounting the hooking plates adapted to be brought into engagement with the corresponding clamping portions on the other end faces in the radial direction of the rotor of the magnetic members between the other end faces of the magnetic members and the rotor frame, the magnetic members can be positioned properly even at the opposite sides to the sides thereof where the fitting portions are provided. In addition, the hooking plates may be fixed to the rotor frame by the press fit ring or may be fixed to the rotor frame with an annular ring and screws.

According to the fourth aspect of the invention, by the fitting portions being made up of the pins which individually penetrate through the interiors of the corresponding magnetic members, even when the magnetic attracting force by the stator acts on the magnetic members, the magnetic members are prevented from falling from the rotor frame by the pins which penetrate through the corresponding magnetic members being kept fitting in the rotor frame. In addition, in the case of the magnetic members each being made up of a stack of magnetic sheets, even though the adhesion between the stacked magnetic sheets is reduced due to an increase in temperature or deterioration with age, by the pins which individually penetrate through the interiors of the corresponding magnetic members restricting the relative movement between the specific magnetic sheets which are stacked together vertically, a drawback that the magnetic members are offset, broken or unfastened can be prevented.

According to the fifth aspect of the invention, since the engagement ring adapted to be brought into engagement with the pins for fixing is interposed between the other end faces in the radial direction of the rotor of the magnetic members and the rotor frame, the magnetic members can be positioned properly even at the opposite sides to the sides thereof where the fitting portions are provided.

According to the sixth aspect of the invention, the magnetic members are held on to the rotor frame in a more ensured fashion by the plurality of fitting portions.

According to the seventh aspect of the invention, sub-magnet portions of a Halbach-type motor can be held on to a rotor frame in an ensured fashion.

In addition, according to an eighth aspect of the invention, there is provided an axial gap motor including:

a rotor (for example, a rotor 11 in an embodiment that will be described later) which can rotate around a rotational axis; and a stator (for example, a stator 12 in the embodiment that will be described later) which is disposed in such a manner as to confront the rotor from at least one side in a rotational axis direction of the rotor, wherein the rotor includes:

a rotor frame (for example, a rotor frame 33 in the embodiment that will be described later) which includes a plurality of ribs (for example, radial ribs 34 in the embodiment that will be described later), and a shaft portion (for example, an inner circumferential side cylindrical portion 35) and a rim portion (for example, an outer circumferential side cylindrical portion 36 in the embodiment that will be described later) which are provided at inside diameter sides and outside diameter sides of the plurality of ribs, respectively;

a plurality of main magnet portions (for example, main magnet portions 41 in the embodiment that will be described later) which are magnetized in the rotational axis direction and are disposed individually between the ribs which lie adjacent to each other in a circumferential direction;

magnetic members (for example, magnetic members 42 in the embodiment that will be described later) which are disposed individually on at least one lateral sides in the rotational axis direction of the main magnet portions;

a plurality of sub-magnet portions (for example, sub-magnet portions 43 in the embodiment that will be described later) which are magnetized in a direction which is orthogonal to the rotational axis direction and the radial direction and are disposed between the magnetic members which lie adjacent to each other in the circumferential direction on both sides in the rotational axis direction of the ribs; and a biasing member (for example, a biasing ring 50 in the embodiment that will be described later) which is placed between the magnetic members and the shaft portion or the rim portion of the rotor frame so as to bias the magnetic members in the radial direction.

According to a ninth aspect of the invention, there is provided an axial gap motor as set forth in the eighth aspect, wherein the biasing member is a biasing ring having a plurality of projections which are formed in such a manner as to project radially outwards or inwards as viewed from a side thereof.

According to a tenth aspect of the invention, there is provided an axial gap motor as set forth in the eighth aspect, wherein the biasing member is disposed further between the sub-magnet portions and the shaft portion or the rim portion of the rotor frame, whereby the magnetic members and the sub-magnet portions are biased individually radially by the biasing member.

According to an eleventh aspect of the invention, there is provided an axial gap motor as set forth in the eighth aspect, wherein the rotor includes further support plates (for example, outer support plates 44, inner support plates 45 in the embodiment that will be described later) which are disposed on radial sides of the main magnet portions, the magnetic members and the sub-magnet portions, so as to configure magnetic pole units together with the main magnet portions, the magnetic members and the sub-magnet portions, and wherein the biasing member is made up of the support plates.

According to the eighth aspect of the invention, even in the event that a radial gap is generated between the magnetic members and the rotor frame due to the rotor frame being deformed by virtue of centrifugal force to thereby displace the magnetic members radially outwards when the rotor rotates or due to a difference in thermal expansion coefficient between the constituent members, the biasing member follows the displacement of the magnetic members to press the magnetic members in the radial direction of the rotor frame, so as to fix the magnetic members to the rotor frame with a substantially constant holding force at all times.

In addition, the circumferential movement or axial movement due to the magnetic attracting force by the stator of the magnetic members is prevented by virtue of a friction force generated between the magnetic members and the rotor frame by the pressing force exerted on the magnetic members in the way described above, thereby making it possible to fix the magnetic members in a predetermined position. By this, the axial gap motor having stable motor properties can be obtained.

According to the ninth aspect of the invention, the plurality of magnetic members can be pressed individually, whereby even though displacement amounts of the respective magnetic members differ, the magnetic members can be fixed stably in accordance with the respective displacement amounts of the magnetic members.

According to the tenth aspect of the invention, the magnetic members and the sub-magnet portions can be pressed individually by the biasing member, and even though a circumferential gap is generated between the magnetic members and the sub-magnet portions which lie adjacent to each other, the sub-magnet portions are fixed in place without being inclined, whereby the stable motor properties are maintained.

According to the eleventh aspect of the invention, not only can the stable motor properties be maintained, but also the assembling and fixing work of the constituent members to the rotor frame can be facilitated.

Further, according to a twelfth aspect of the invention, there is provided an axial gap motor including:

a rotor (for example, a rotor 11 in an embodiment that will be described later) which can rotate around a rotational axis; and a pair of stators (for example, stators 12 in the embodiment that will be described later) which are disposed in such a manner as to confront the rotor from both sides in a rotational axis direction of the rotor, wherein the rotor includes:

a rotor frame including a plurality of ribs (for example, radial ribs 34 in the embodiment that will be described later) which are disposed at predetermined intervals in a circumferential direction and which extend in a radial direction, and a shaft portion (for example, an inner circumferential side cylindrical portion 35 in the embodiment that will be described later)) and a rim portion (for example, an outer circumferential said cylindrical portion 36 in the embodiment that will be described later) which are provided at inside diameter sides and the outside diameter sides of the plurality of ribs, respectively; and a plurality of magnetic pole units (for example, magnetic units 30 in the embodiment that will be described later) each having a main magnet (for example, a main magnet portion 41 in the embodiment that will be described later) which is magnetized in the rotational axis direction and is disposed between the ribs which lie adjacent to each other in the circumferential direction, a pair of magnetic members (for example, magnetic members 42 in the embodiment that will be described later) which are disposed on both lateral surfaces in the rotational axis direction of the main magnet portion, and a support plate (for example, an outer support plate 44, an inner support plate in the embodiment that will be described later) which holds the main magnet portion and the pair of magnetic members from one radial sides thereof, and each adapted to unitize the main magnet portion and the pair of magnetic members by the support plate.

According to a thirteenth aspect of the invention, there is provided an axial gap motor as set forth in the twelfth aspect, wherein the rotor includes further a plurality of sub-magnet portions (for example, sub-magnet portions 43 in the embodiment that will be described later) which are magnetized in a direction which is orthogonal to the rotational axis direction and the radial direction and are disposed between the magnetic members which lie adjacent to each other in the circumferential direction on both sides in the rotational axis direction of the ribs, wherein the support plate further supports the two sub-magnet portions in such a manner as to hold one of the magnetic members which is disposed on one lateral surface in the rotational axis of the main magnet portion by the two sub-magnet portions therebetween in the circumferential direction, and wherein the main magnet portion, the pair of magnetic members and the two sub-magnet portions configure the magnetic pole unit by the support plate.

According to a fourteenth aspect of the invention, there is provided an axial gap motor as set forth in the twelfth aspect, wherein the support plate includes a pair of support plates for holding the main magnet portion and the pair of magnetic members from both radial sides thereof and one of the support plates has a fitting portion (for example, a projecting portion 44d in the embodiment that will be described later) which fits in one of the shaft portion and the rim portion.

According to a fifteenth aspect of the invention, there is provided an axial gap motor as set forth in the fourteenth aspect, wherein the one support plate has further another fitting portion (for example, a fitting hole 46 in the embodiment that will be described later) which fits on the magnetic member.

According to a sixteenth aspect of the invention, there is provided an axial gap motor as set froth in the fourteenth aspect, wherein a ring (for example, a ring 50 in the embodiment that will be described later) is interposed between the other of the shaft portion and the rim portion and the other support plate.

According to a seventeenth aspect of the invention, there is provided an axial gap motor as set forth in the sixteenth aspect, wherein arc-shaped projecting portions (for example, arc-shaped projecting portions 39 in the embodiment that will be described later) are formed between the ribs on the other of the shaft portion and the rim portion, and wherein the other support plate has a positioning portion (for example, a positioning portion 45*e* in the embodiment that will be described later) which is bent in the radial direction so as to be held by the arc-shaped projecting portion and the ring therebetween.

According to an eighteenth aspect of the invention, there is provided an axial gap motor as set forth in the fourteenth aspect, wherein the pair of support plates each have end face supporting surfaces (for example, end face supporting surfaces 44*b*, 45*b* in the embodiment that will be described later) for supporting radial end faces of the sub-magnet portions and lateral surface supporting surfaces (for example, 44*c*, 45*c* in the embodiment that will be described later) for supporting lateral surfaces of the sub-magnet portions which are different from the radial end faces.

According to a nineteenth aspect of the invention, there is provided an axial gap motor as set forth in the eighteenth aspect, wherein recessed portions (for example, recessed portions 43*a* in the embodiment that will be described later) whose depth is substantially equal to the thickness of the support plate are formed on the lateral surface of the sub-magnet portion in positions where the sub-magnet is supported by the pair of support plates.

According to a twentieth aspect of the invention, there is provided an axial gap motor asset forth in the twelfth aspect, wherein the magnetic pole units which lie adjacent to each other in the circumferential direction are inserted into the rotor frame from directions which are different from each other in the rotational axis direction.

According to the twelfth aspect of the invention, the rotor can be built up easily in a small number of steps, thereby making it possible to provide the axial gap motor inexpensively by suppressing the manufacturing costs.

According to the thirteenth and twentieth aspects of the invention, the Halbach-type axial gap motor made up of a number of constituent components can be built up easily in a small number of steps, thereby making it possible to suppress the manufacturing cost of the rotor. By this, for example, in the case of a Halbach-type axial gap motor with six pairs of poles, although 60 components in total including as constituent components 12 main magnets, 24 sub-magnets and 24 magnetic members are necessary, the assemblage of the rotor can be completed by assembling only 12 magnetic pole units by unitizing the constituent components in the way described in those aspects of the invention.

According to the fourteenth aspect of the invention, the magnetic pole units can not only be located in predetermined positions with respect to the rotor frame but also be fixed in place in an ensured fashion.

According to the fifteenth aspect of the invention, the magnetic members can be held in an ensured fashion by the support plates, thereby making it possible to provide the rotor construction which is stronger and more rigid.

According to the sixteenth aspect of the invention, the magnetic pole units can be fixed to the rotor frame in an ensured fashion by the ring.

According to the seventeenth aspect of the invention, even though an axial force is exerted on the magnetic pole units, the axial shift of the magnetic pole units with respect to the rotor frame can be prevented.

According to the eighteenth aspect of the invention, the sub-magnet portions of the Halbach-type axial gap motor can be held in an ensured fashion by the support plates.

According to the nineteenth aspect of the invention, the sub-magnet portions and the lateral surface supporting surfaces are made level with each other so as to prevent any axial protrusion, thereby making it possible to make a gap between the rotor and the stator minimum so as to generate high torque.

Other features and advantages may be apparent from the following detailed description, the accompanying drawings and the claims.

BRIEF DESCRIPTION OF THE DRAWINGS

FIGS. 9A to 9E are explanatory diagrams which illustrate assembling steps of the rotor shown in FIG. 2.

FIGS. 14A to 14E are explanatory diagrams which illustrate assembling steps of the rotor into which the magnetic member shown in FIG. 11 is incorporated.

DETAILED DESCRIPTION

First Embodiment

Figure 1:
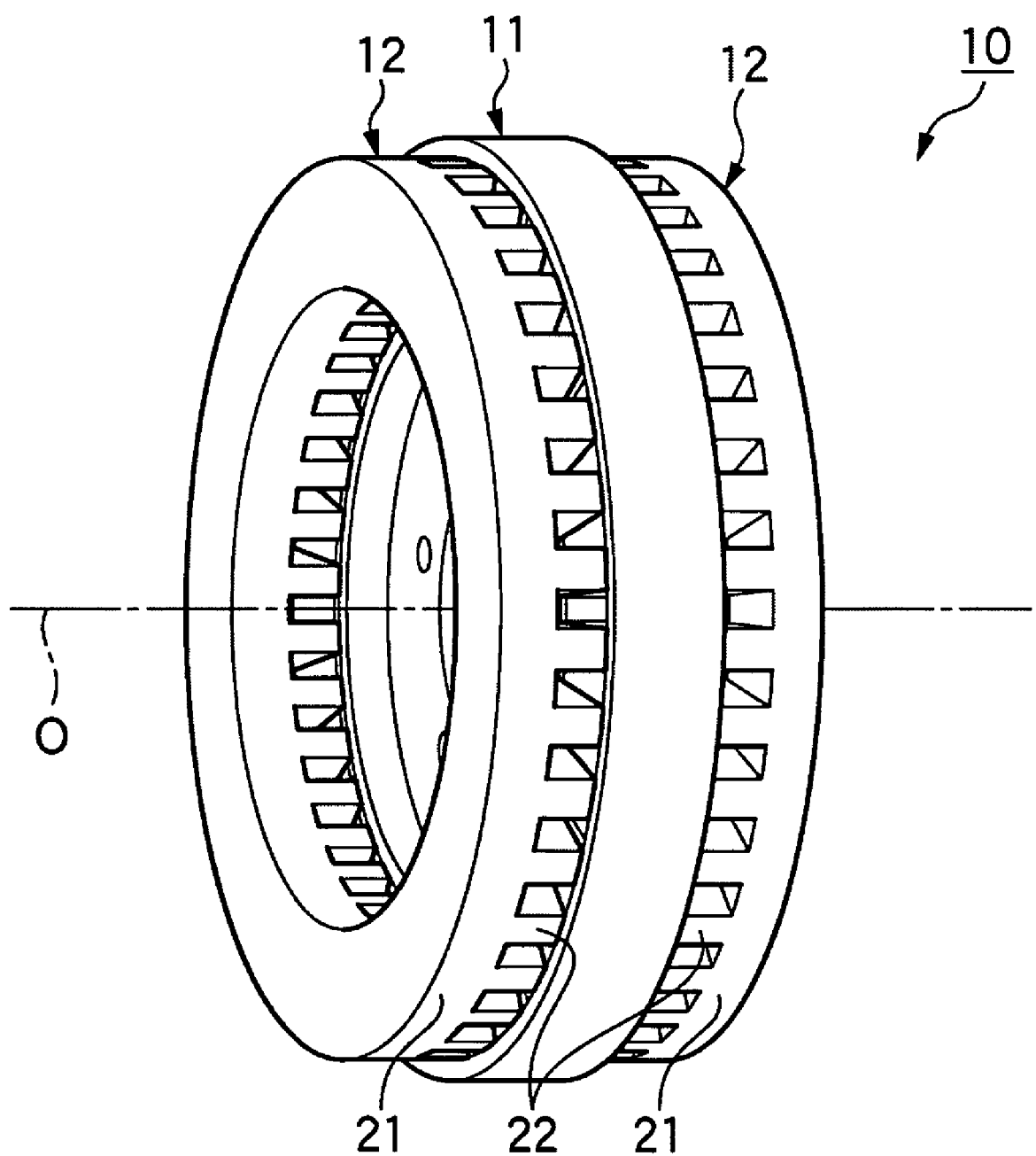
FIG. 1 is an overall perspective view which illustrates an axial gap motor according to the invention.

Hereinafter, embodiments of the invention will be described based on the accompanying drawings. Note that the drawings are to be seen in a direction in which reference numerals shown therein look as being oriented properly.

Firstly, a first embodiment of an axial gap motor 10 according to the invention will be described by reference to FIGS. 1 to 9E.

Figure 2:
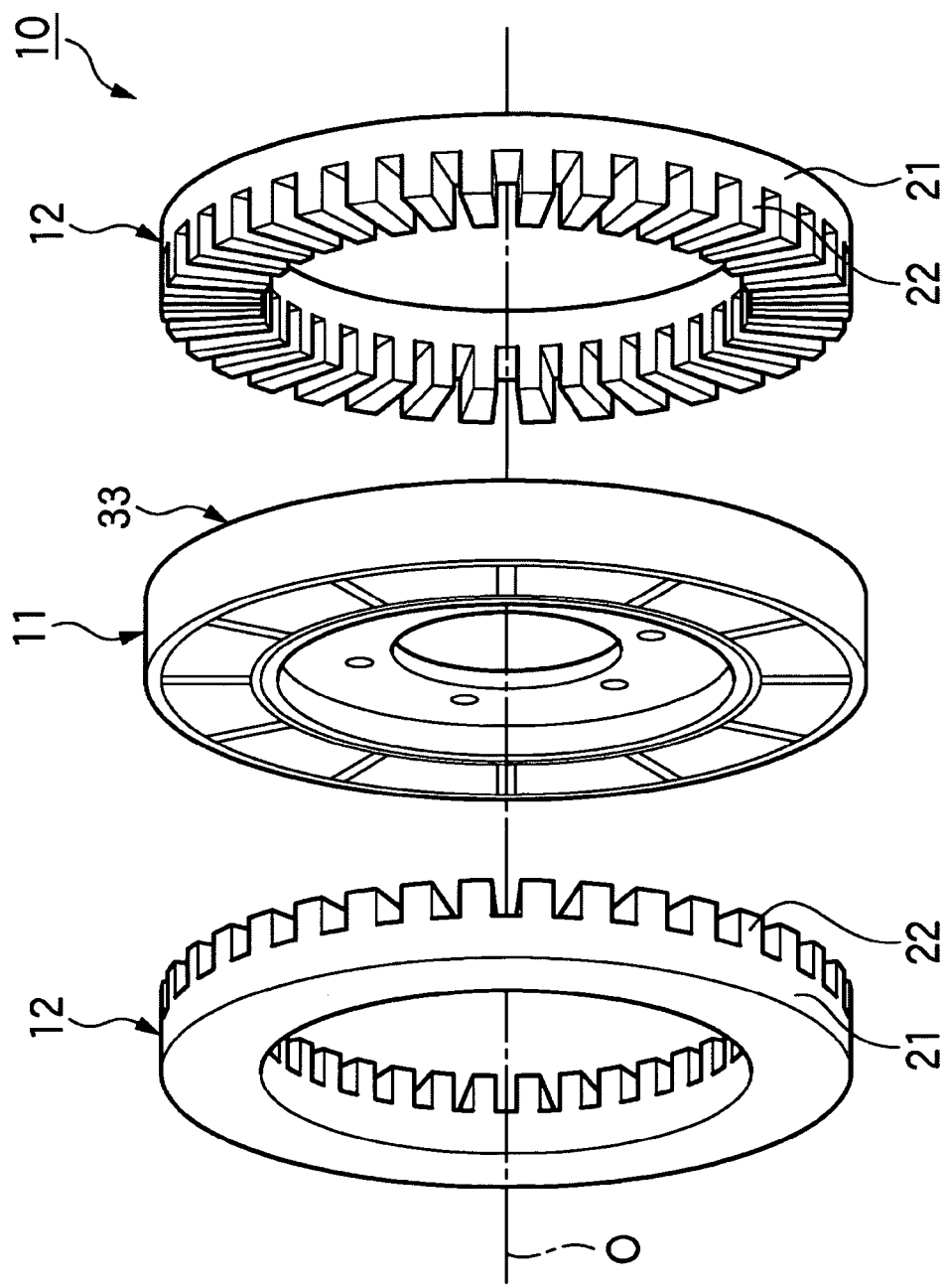
FIG. 2 is an exploded perspective view of the axial gap motor shown in FIG. 1.

The axial-gap motor 10 of this embodiment includes, as is shown in FIGS. 1 and 2, a substantially annular rotor 11 which is provided in such a manner as to rotate a rotational axis O of the axial gap motor 10 and a pair of stators 12, 12 which are disposed to confront the rotor 11 in such a manner as to hold therebetween the rotor 11 from both sides thereof in an axial direction of the rotational axis O (hereinafter, referred to simply as an axial direction) and which each have individual stator windings of a plurality of phases for generating a rotating field to cause the rotor 11 to rotate.

The axial gap motor 10 is installed in a vehicle such as a hybrid vehicle or an electric vehicle as a drive source, and a driving force of the axial gap motor 10 is made to be transmitted to drive road wheels (whose illustration is omitted) of the vehicle via a transmission (whose illustration is omitted) by an output shaft of the axial gap motor 10 being connected to an input shaft of the transmission.

In addition, when the driving force is transmitted to the axial gap motor 10 from the drive road wheels side when the brakes are applied to the vehicle, the axial gap motor 10 functions as a generator so as to generate a so-called regenerative braking force, whereby kinetic energy of a vehicle body is recovered as electric energy (regenerative energy). Further, for example, in a hybrid vehicle, when a crankshaft of an internal combustion engine (whose illustration is omitted) is connected to the rotor 11 of the axial gap motor 10, an output of the internal combustion engine is transmitted to the axial gap motor 10, and the axial gap motor 10 functions as a generator so as to generate electricity generating energy.

The stator 12 includes a substantially annular plate-shaped yoke portion 21, a plurality of teeth 22, ..., 22 which project from positions lying at predetermined intervals in a circumferential direction on a confronting surface of the yoke portion 21 which confronts the rotor 11 towards the rotor 11 along the axial direction, while extending in a radial direction, and stator windings (whose illustration is omitted) which are mounted between appropriate teeth 22, 22.

The stator 12 is of a 6N type, for example, in which six main poles (for example, $U^+, V^+, W^+, U^-, V^-, W^-$) are provided, and the respective $U^-, V^-, W^-$ poles of the other stator 12 are set in such a manner as to confront the respective $U^+, V^+, W^+$ poles of the one stator 12. For example, in the pair of stators 12, 12 which confront each other in the axial direction, three teeth 22, 22, 22 of the one stator 12 which confront one of the $U^+, V^+, W^+$ poles and $U^-, V^-, W^-$ poles and three teeth 22, 22, 22 of the other stator 12 which confront the other of the $U^+, V^+, W^+$ poles and $U^-, V^-, W^-$ poles are set in such a manner as to confront each other in the axial direction, and the energized states of the teeth 22 of the one stator 12 and the teeth 22 of the other stator 12 which confront each other in the axial direction are set in such a manner as to be inverted in terms of electrical angle.

Figure 3:
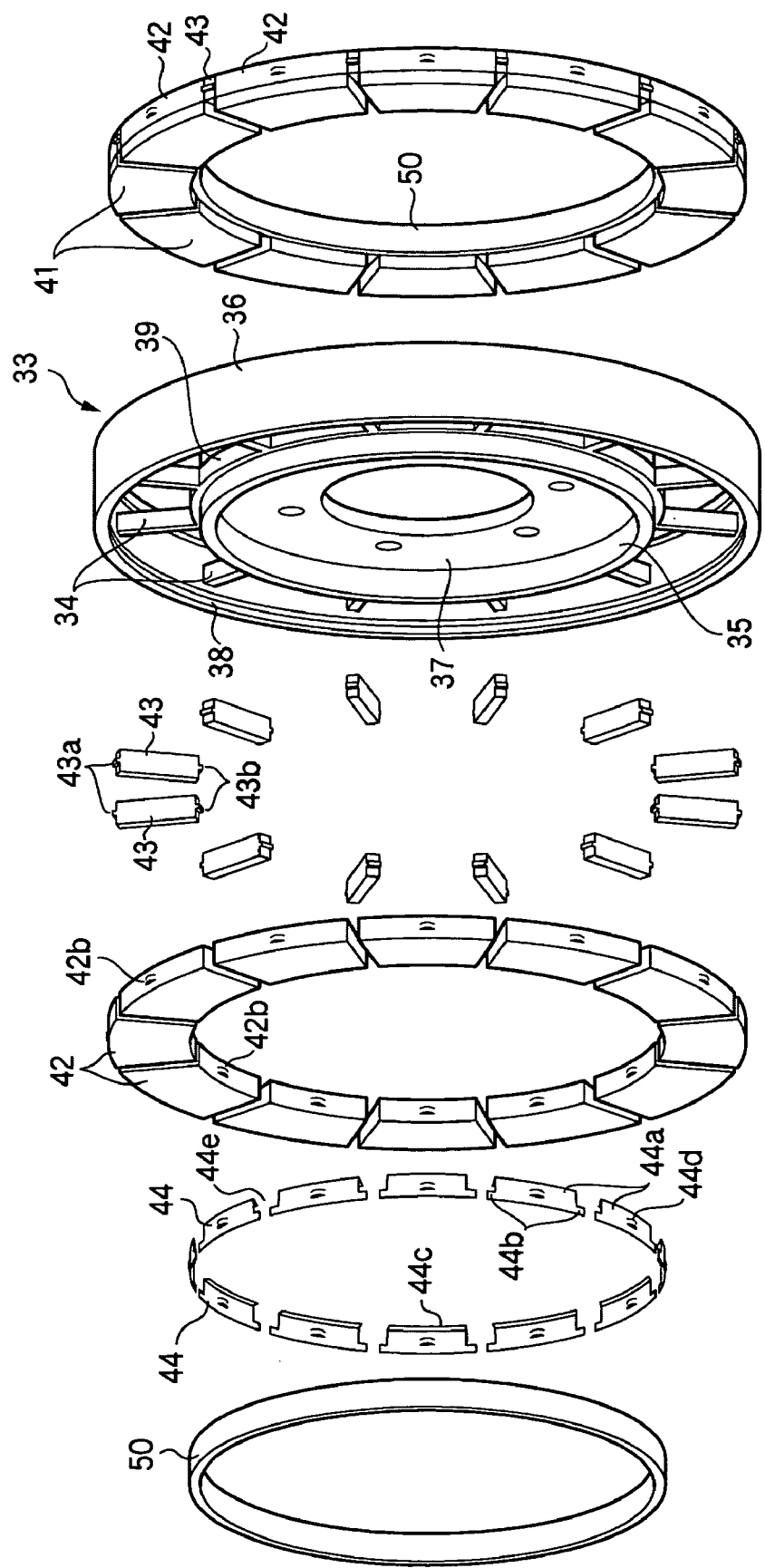
FIG. 3 is an exploded perspective view of a rotor shown in FIG. 2.
Figure 4:
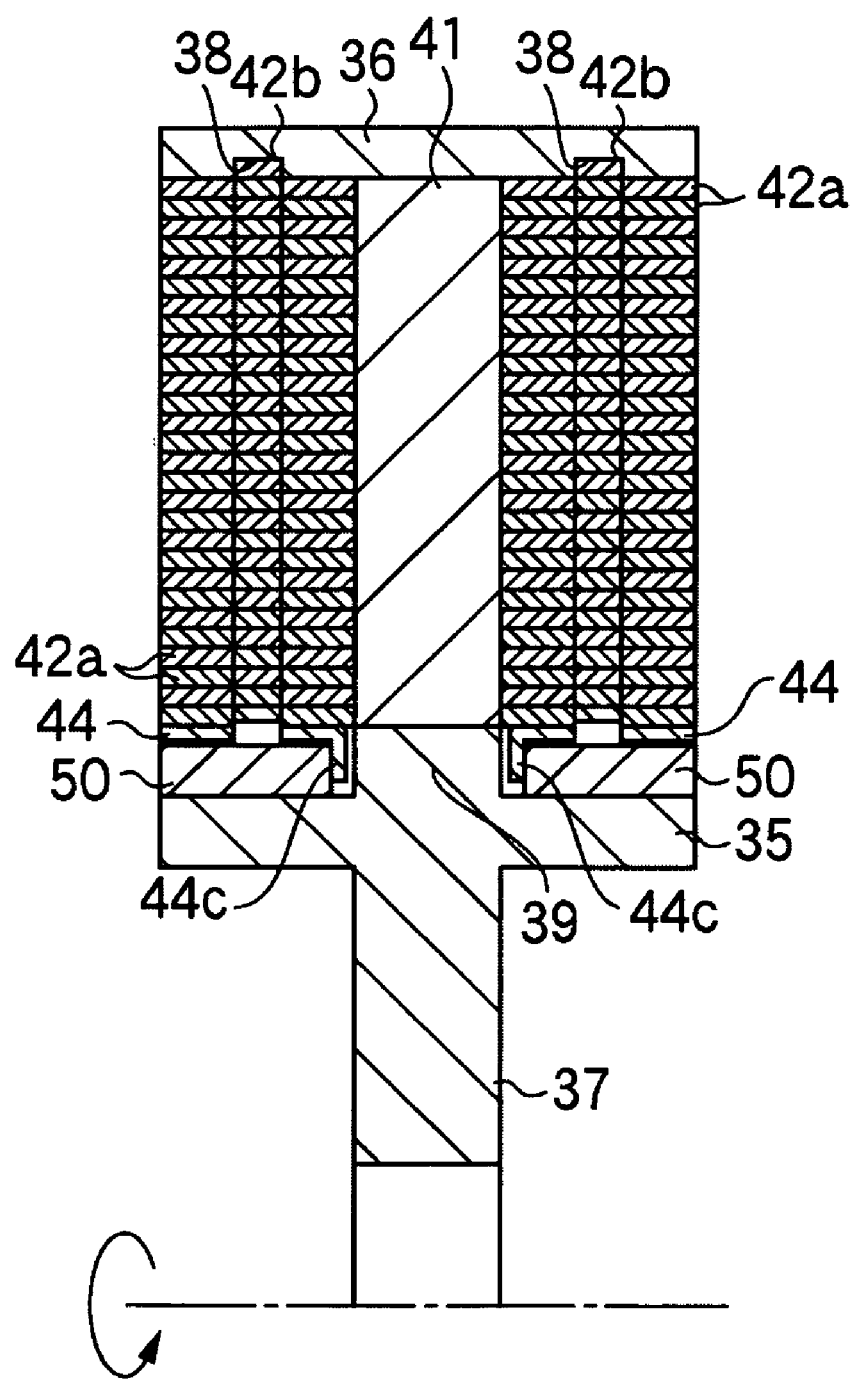
FIG. 4 is a vertical sectional view of the rotor shown in FIG. 2.

As is shown in FIGS. 3 and 4, the rotor 11 is made up of main permanent magnet pieces 41, ..., 41, magnetic members 42, ..., 42, sub-permanent magnet pieces 43, ..., 43, hooking plates 44, ..., 44 and press fit rings 50, and these constituent components are accommodated within a rotor frame 33 in such a manner that the magnetic members 42, the sub-permanent magnet pieces 43, the hooking plates 44 and the press fit ring 50 are disposed on both sides in the axial direction of the main magnet pieces 41 as a center. In addition, in FIG. 3, an assembly into which the main magnet pieces 41, ..., 41, the magnetic members 42, ..., 42, the sub-permanent magnet pieces 43, ..., 43, the hooking plates 44, ..., 44 and the press fit ring 50 are assembled is drawn on a right-hand side of the rotor frame 33, while on a left-hand side thereof, the magnetic members 42, ..., 42, the sub-permanent magnet pieces 43, ..., 43, the hooking plates 44, ..., 44 and the press fit ring 50 are drawn as being exploded.

The rotor frame 33 is made of a non-magnetic material and includes an inner circumferential side cylindrical portion 35 and an outer circumferential side cylindrical portion 36 which are connected together by a plurality of radial ribs 34, ..., 34 which are disposed at predetermined intervals in a circumferential direction, and a connecting portion 37 which is formed into an annular plate shape which projects inwards from a position on an inner circumferential surface of the inner circumferential side cylindrical portion and is connected to an exterior drive shaft (for example, the input shaft of the transmission of the vehicle). In this embodiment, since the inner circumferential side cylindrical portion 35 of the rotor frame 33 is connected to the exterior drive shaft, radially inward sides of the radial ribs 34 configure a shaft portion side, while radially outward sides of the radial ribs 34 configure a rim portion side.

In addition, an annular groove 38 is formed on an inner circumferential surface of the outer circumferential side cylindrical portion 36 of the rotor frame 33, and clamping portions 42b (fitting portions) of the magnetic members 42 and projecting portions 43a (fitting portions) of the sub-permanent magnet pieces 43, which will both be described later on, are made to fit in the annular groove 38 so formed.

Figure 5:
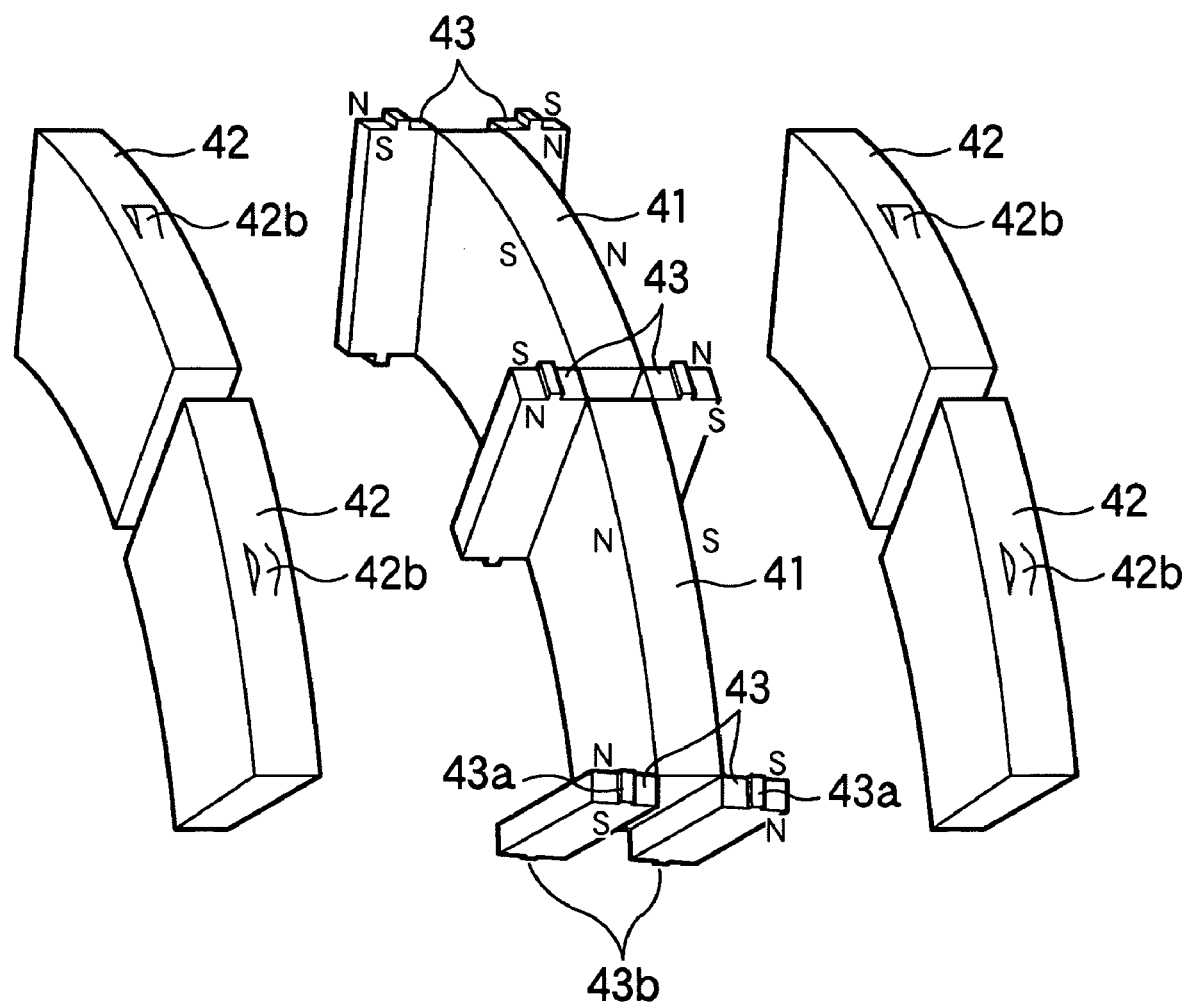
FIG. 5 is an exploded perspective view of a main part of the rotor shown in FIG. 2.

The main permanent magnet pieces 41, . . . , 41 each have a substantially segmental shape and are magnetized in a thickness direction (that is, in the rotational axis O direction), and the main permanent magnet pieces 41, 41 which lie adjacent to each other in a circumferential direction are set, for example, as is shown in FIG. 5, in such a manner that their magnetized directions become different from each other.

In addition, the plurality of main permanent magnet pieces 41, . . . , 41 which are accommodated within the rotor frame 33 are held by the inner circumferential side cylindrical portion 35 and the outer circumferential side cylindrical portion 36 therebetween from both radial sides thereof and are disposed in such a manner as to lie adjacent to each other in the circumferential direction via the radial ribs 34. Namely, within the rotor frame 33, the main permanent magnet piece 41 is held by the two radial ribs 34 from both the circumferential sides thereof.

The sub-permanent magnet pieces 43, . . . , 43 each have a substantially rectangular parallelepiped shape, and projecting portions 43a, 43b which project radially are formed, respectively, on an outer circumferential surface and an inner circumferential surface of each of the sub-permanent magnet pieces 41, . . . , 41. In addition, a pair of sub-permanent magnet pieces 43, 43 which confront each other in the rotational axis O direction are made to hold therebetween the radial rib 34 from both sides thereof in the rotational axis O direction within the rotor frame 33, and the pair of sub-permanent magnet pieces 43, 43 are each magnetized, for example, as is shown in FIG. 5, in a direction which is orthogonal to the rotational axis O direction and a radial direction (a substantially circumferential direction) and are disposed in such a manner that their magnetized directions become different from each other.

In addition, the sub-permanent magnet pieces 43, 43 which lie adjacent to each other in the circumferential direction are made to hold therebetween the magnetic member 42 from both circumferential sides thereof within the rotor frame 33.

A pair of sub-permanent magnet pieces 43, 43 which lie to confront each other via the magnetic member 42 in the circumferential direction are arranged, for example, as is shown in FIG. 5, in such a manner that their magnetized directions become different from each other. In addition, a pair of sub-permanent magnet pieces 43, 43 which are disposed on one side in the rotational axis O direction of the corresponding main permanent magnet piece 41 are disposed in such a manner as to confront each other circumferentially with the same poles which are then the same as the pole of the one side of the corresponding main permanent magnet piece 41 which is magnetized in the rotational axis O direction, while a pair of sub-permanent magnet pieces 43, 43 which are disposed on the other side in the rotational axis O direction of the corresponding main permanent magnet piece 41 are disposed in such a manner as to confront each other circumferentially with the same poles which are then the same as the pole of the other side of the main permanent magnet piece 41 which is magnetized in the rotational axis O direction.

Namely, a pair of sub-permanent magnet pieces 43, 43 which hold, for example, a magnetic member 42 from both sides thereof in the circumferential direction on one side in the rotational axis O direction of a main permanent magnet piece 41 in which one side in the rotational axis O direction is referred to as an N pole and the other side is referred to as an S pole are disposed in such a manner that their N poles confront each other in the circumferential direction, while a pair of sub-permanent magnet pieces 43, 43 which hold a magnetic member 42 from both sides thereof in the circumferential direction on the other side in the rotational axis O direction of the main permanent magnet piece 41 are disposed in such a manner that their S poles confront each other in the circumferential direction. By this configuration, respective magnetic fluxes of the main permanent magnet piece 41 and the sub-permanent magnet pieces 43, 43 are caused to converge by virtue of the magnetic flux lens effect resulting from a so-called Halbach arrangement of permanent magnets, whereby effective magnetic fluxes which intersect the respective stators 12, 12 are made to be increased relatively.

Figure 6A:
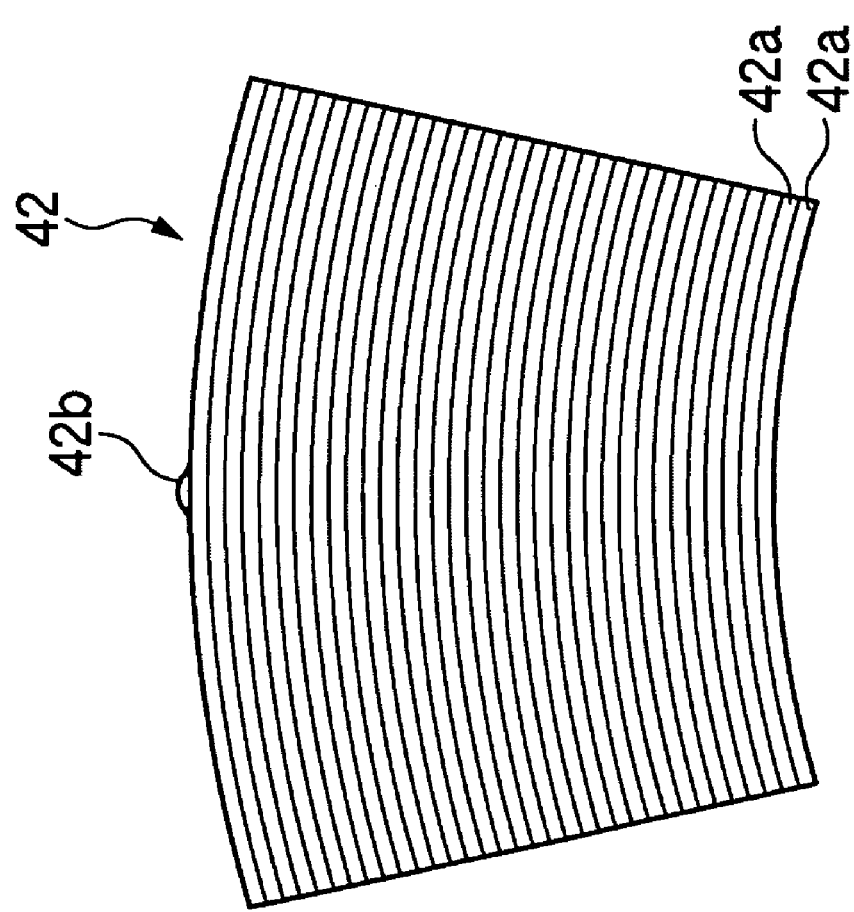
FIG. 6A is a front view of a magnetic member.
Figure 6B:
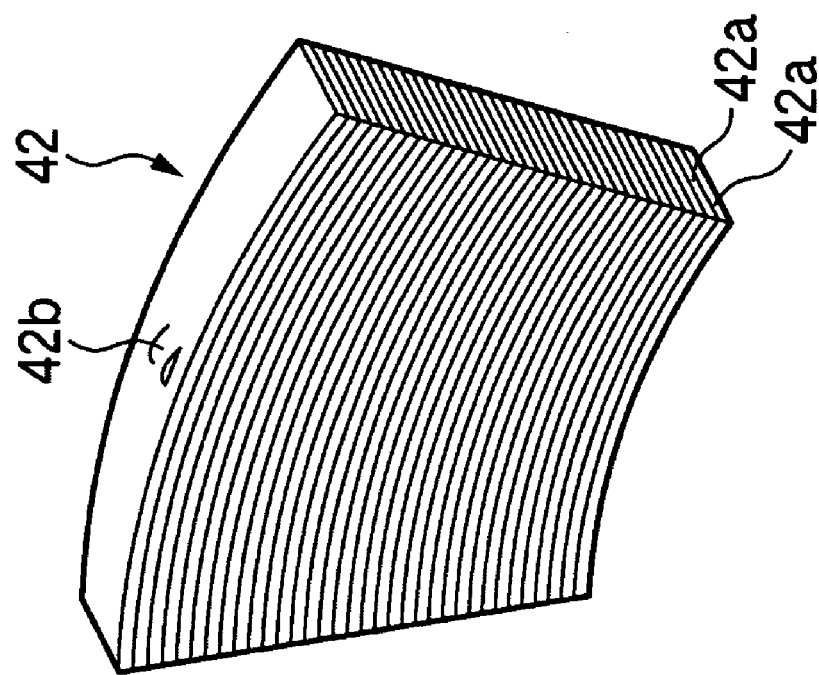
FIG. 6B is a perspective view of the magnetic member.

The magnetic member 42 has a substantially segmental shape and has a configuration in which a plurality of electromagnetic steel sheets 42a which are stacked in a radial direction as is shown in FIGS. 4, 6A, 6B. In addition, a clamping portion 42b which is curved from an inner circumferential side towards an outer circumferential side is formed at a substantially central portion of each of the electromagnetic steel sheets 42a so stacked. By this clamping portion 42b so formed, a recessed portion is formed on an inner circumferential surface of each electromagnetic steel sheet 42a and a projecting portion is formed on an outer circumferential surface thereof, whereby when the plurality of electromagnetic steel sheets 42 are stacked together, the projecting portion on the outer circumferential surface of one electromagnetic steel sheet 42 fits in the recessed portion on the inner circumferential surface of another electromagnetic steel sheet 42 which lies adjacent thereto, so that the two adjacent electromagnetic steel sheets are positioned axially relative to each other.

Figure 7A:
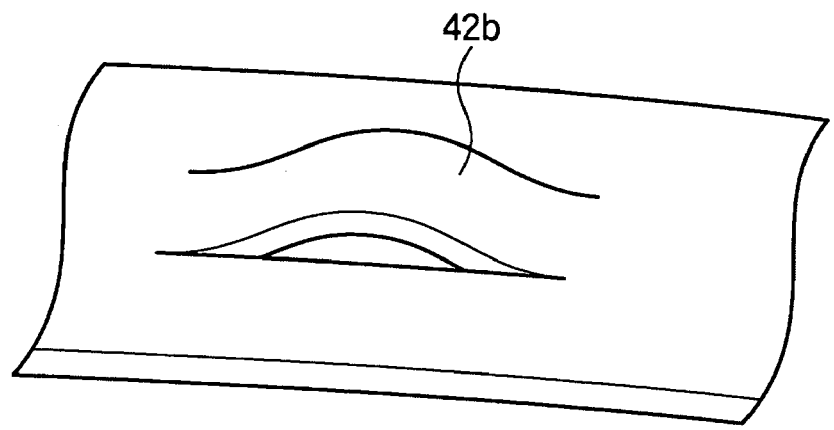
FIG. 7A to 7C are partial perspective views which illustrate examples of clamping portions of an electromagnetic steel sheet.
Figure 7B:
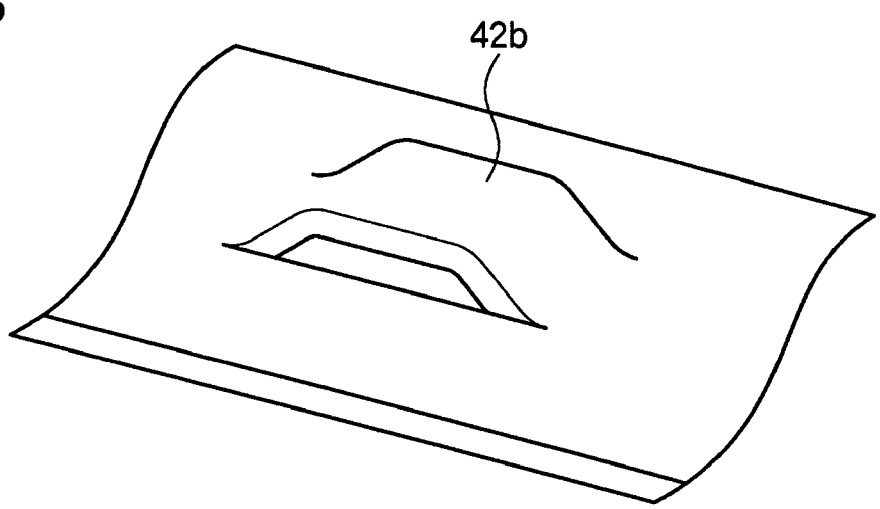
Figure 7C:
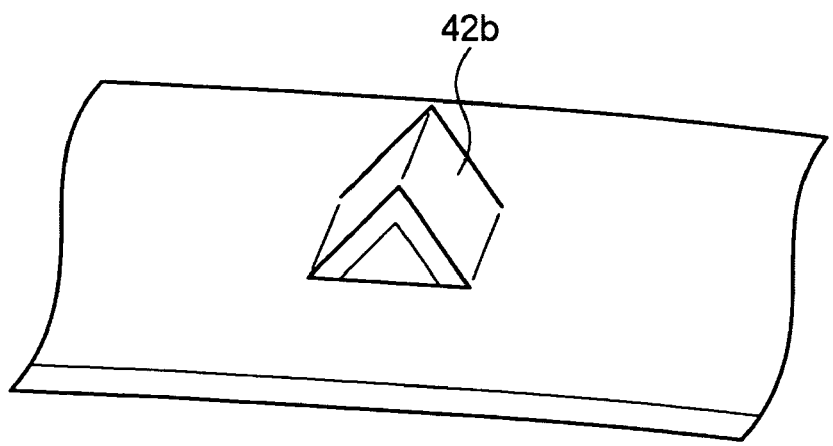
Figure 8B:
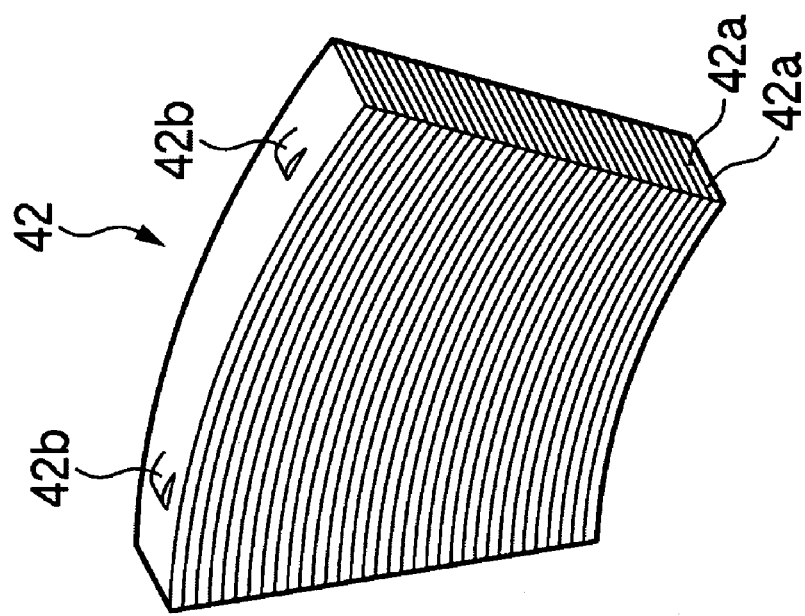
FIG. 8B is a perspective view of the modified example to the magnetic member.
Figure 8A:
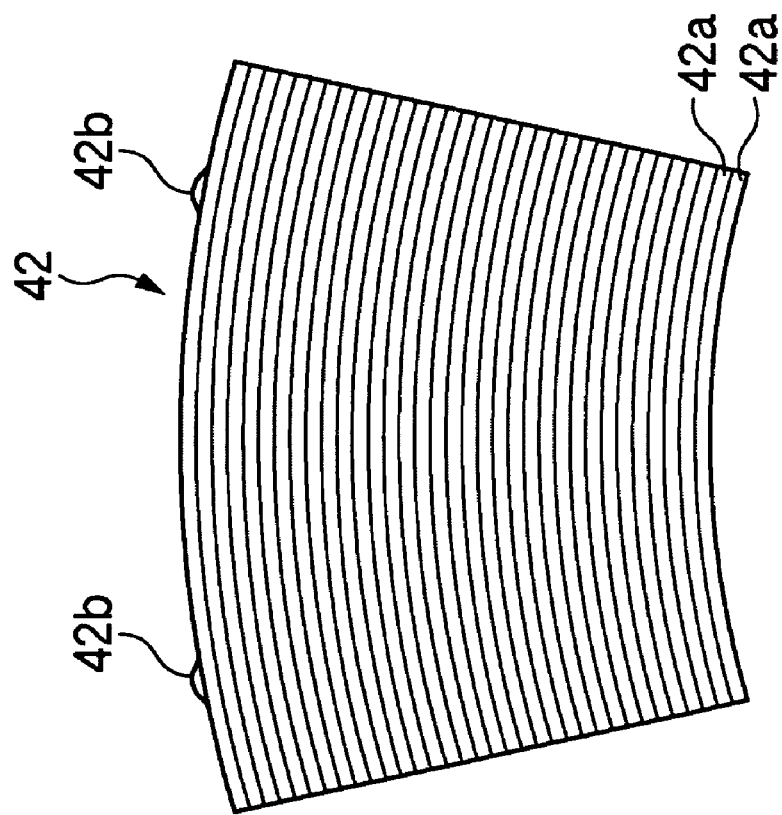
FIG. 8A is a front view of a modified example to the magnetic member.

The shape of the clamping portion 42b as viewed from a side thereof may be a substantially arc-like shape as is shown in FIG. 7A, a substantially trapezoidal shape as is shown in FIG. 7B or a substantially triangular shape as is shown in FIG. 7C, and hence, an arbitrary shape can be adopted therefor.

In addition, the number of clamping portions that are to be formed on each electromagnetic steel sheet 42a is not limited to one, and hence, two or more clamping portions 42b (in FIGS. 8A, 8B, two at portions in the vicinity of both ends of an electromagnetic steel sheet 42a) may be formed on each electromagnetic steel sheet 42a.

The hooking plate 44 is formed of a non-magnetic material such as a stainless steel sheet and includes, as is shown in FIGS. 9A to 9E, an inner circumferential fastening portion 44a which is adapted to be brought into abutment with an inner circumferential surface of the magnetic member 42, sub-magnet supporting surfaces 44b which are provided at an axial edge of the inner circumferential fastening portion 44a in such a manner as to extend from respective circumferential ends of the inner circumferential fastening portion 44a so as to be brought into abutment with parts of inner circumferential surfaces of the corresponding sub-magnet pieces 43 and a bent portion 44c which is provided at the other axial edge of the inner circumferential fastening portion 44a in such a manner as to be bent to an inside diameter side. A pair of fitting projecting portions 44d are formed on the inner circumferential fastening portion 44a in positions corresponding to recessed portions of the clamping portions 42b formed on the inner circumferential surface of the magnetic member 42 in such a manner as to fit in the recessed portions.

The press fit ring 50 is formed of a non-magnetic material such as a stainless steel sheet and is configured to fill a gap between the hooking plates 44 and the inner circumferential side cylindrical portion 35 so as not only to bias the magnetic members 42 towards the outer circumferential side cylindrical portion 36 but also to be brought into engagement with the bent portions 44c of the hooking plates 44 so as to position the hooking plates 44 with respect to the axial direction.

Following this, referring to FIGS. 9A to 9E, an assembling method of the rotor 11 will be described. Note that in FIGS. 9A to 9E, since the rotor 11 is symmetrical on its left- and right-hand sides in the axial direction, only one side (a left-hand side in the figures) in the axial direction thereof is shown and the other side (a right-hand side in the figures) thereof is omitted.

As is shown in FIG. 9A, the individual magnetic members 42 are mounted in the rotor frame 33 in which the main permanent magnet pieces 41 are mounted in spaces which are surrounded by arc-shaped projecting portions 39 of the inner circumferential side cylindrical portion 35 and the outer circumferential side cylindrical portion 36 from both sides in the radial direction and by the radial ribs 34 lying adjacent to each other in the circumferential direction in such a manner as to confront the corresponding main permanent magnet pieces 41 in the axial direction. As this occurs, the clamping portions 42b of the electromagnetic steel sheets 42a which are situated at a radially outermost side are caused to fit in the annular groove 38 formed on the inner circumferential surface of the outer circumferential side cylindrical portion 36 so that the magnetic members 42 are positioned with respect to the axial direction.

Next, as is shown in FIG. 9B, the sub-permanent magnet pieces 43 are mounted in spaces which are defined by the magnetic members 42, 42 which lie adjacent to each other in the circumferential direction and are closed by the radial ribs 34 on one of sides in the axial direction. As this occurs, the projecting portions 43a of the sub-permanent magnet pieces 43 are caused to fit in the annular groove 38 formed on the inner circumferential surface of the outer circumferential side cylindrical portion 36, so as to position the sub-permanent magnet pieces 43 with respect to the axial direction.

Following this, as is shown in FIG. 9C, the hooking plates 44 are inserted into spaces defined by the inner circumferential surfaces of the magnetic members 42 and the inner circumferential side cylindrical portion 35, and the fitting projecting portions 44d on the hooking plates 44 are caused to fit in the recessed portions on the clamping portions 42b which are formed on the inner circumferential surfaces of the magnetic members 42. As this occurs, the sub-magnet supporting surfaces 44b, 44b of the adjacent hooking plates support the inner circumferential surfaces of the sub-permanent magnet pieces 43, and the projecting portions 43b of the sub-permanent magnet pieces 43 are inserted into spaces 44e which are defined on the other edge sides in the axial direction of the sub-magnet supporting surfaces 44b, 44b.

Lastly, as is shown in FIG. 9D, the press fit ring 50 is press fitted into a gap defined between the hooking plates 44 and the inner circumferential side cylindrical portion 35, and an axial distal end portion of the press fit ring 50 is brought into engagement with the bent portions 44c of the hooking plates 44 so as to be fixed in place thereat (refer to FIG. 4). By this series of steps, the rotor 11 shown in FIG. 9E is built up.

Thus, as has been described heretofore, according to the axial gap motor 10 according to the embodiment, since the clamping portions 42b on the electromagnetic steel sheets 42a which are situated at the radially outermost side are allowed to fit in the annular groove 38 formed on the inner circumferential surface of the outer circumferential side cylindrical portion 36 of the rotor frame 33, the magnetic members 42 are positioned properly with respect to the axial direction. By this configuration, even in the event that a magnetic attracting force by the stators 12 are exerted on the magnetic members 42, there is no such situation that the magnetic members 42 are caused to fall from the rotor frame 33. In addition, since the magnetic members 42 are biased towards the outer circumferential side cylindrical portion 36 via the hooking plates 44 by virtue of the elastic force of the press fit ring 50, the magnetic members 42 can be held within the rotor frame 33 in a more ensured fashion. Additionally, since the fitting projecting portions 44d of the hooking plates 44 fit in the recessed portions of the clamping portions 42b which are formed on the inner circumferential surfaces of the magnetic members 42 and the axial distal end portion of the press fit ring 50 is brought into engagement with the bent portions 44c of the hooking plates 44, the magnetic members 42 are also positioned properly with respect to the axial direction on its inside diameter sides, whereby even in the event that the magnetic attracting force by the stators 12 are exerted on the magnetic members 42, there is no such situation that the magnetic members 42 are caused to fall from the rotor frame 33.

In addition, since the projecting portions 43a are provided on the outer circumferential surfaces of the sub-permanent magnet pieces 43 in such a manner that the projecting portions 43a fit in the annular groove 38 formed on the inner circumferential surface of the outer circumferential side cylindrical portion 36 of the rotor frame 33, not only the magnetic members 42 but also the sub-permanent magnet pieces 43 can be held within the rotor frame 33 in an ensured fashion. Additionally, since the projecting portions 43b are provided on the inner circumferential surfaces of the sub-permanent magnet pieces 43 in such a manner that the projecting portions 43b are brought into engagement with the spaces 44e which are defined on the other sides in the axial direction of the adjacent sub-magnet supporting surfaces 44b, 44b of the hooking plates 44 and the axial distal end portion of the press fit ring 50 is brought into engagement with the bent portions 44c of the hooking plates 44, the sub-permanent magnet pieces 43 are also positioned properly with respect to the axial direction on the inside diameter sides thereof. Therefore, even in the event that the magnetic attracting force by the stators 12 is exerted on the sub-permanent magnet pieces 43, there is no such situation that the sub-permanent magnet pieces 43 are caused to fall from the rotor frame 33.

Figure 10:
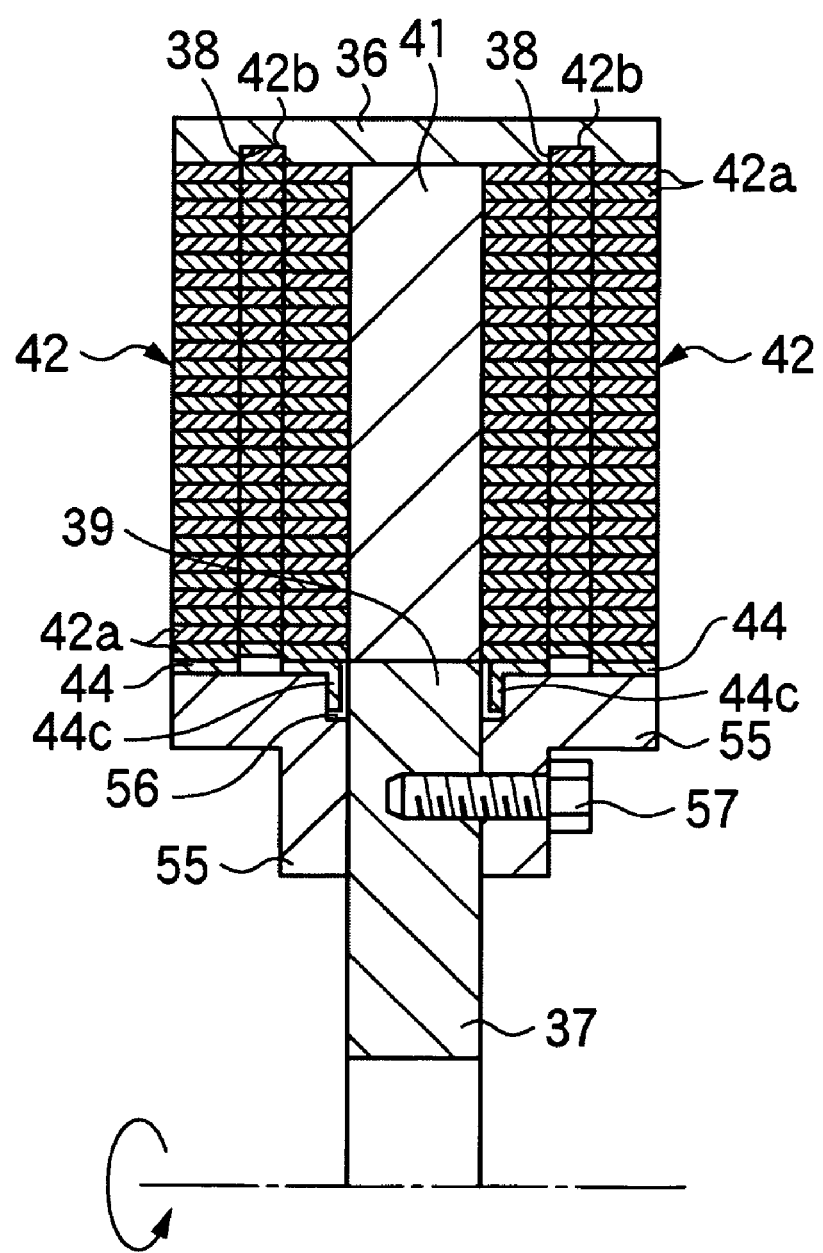
FIG. 10 is a vertical sectional view showing a modified example to the rotor shown in FIG. 2.
Figure 11:
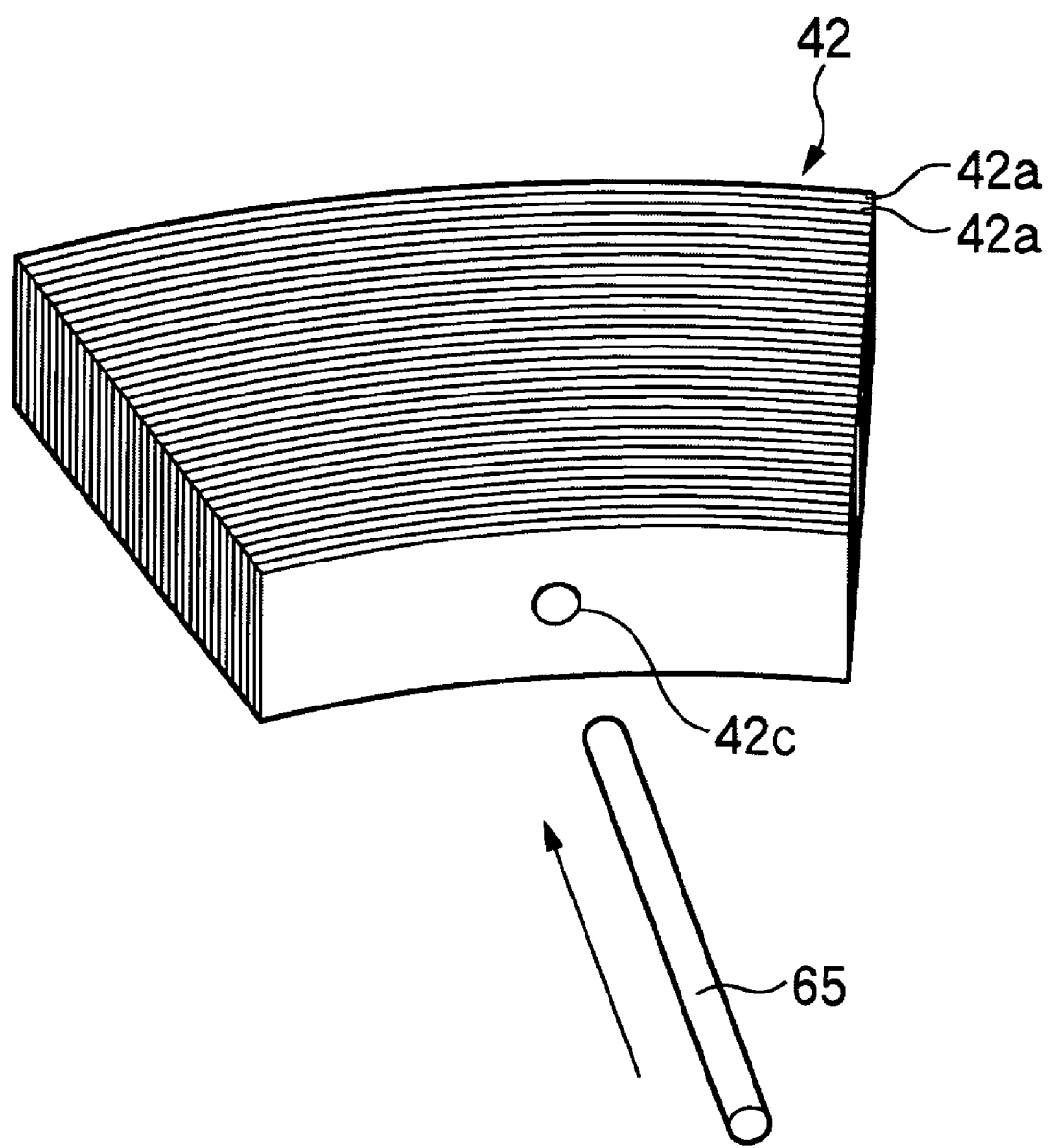
FIG. 11 is an explanatory diagram which illustrates a magnetic member of an axial gap motor according to a second embodiment of the invention.
Figure 12:
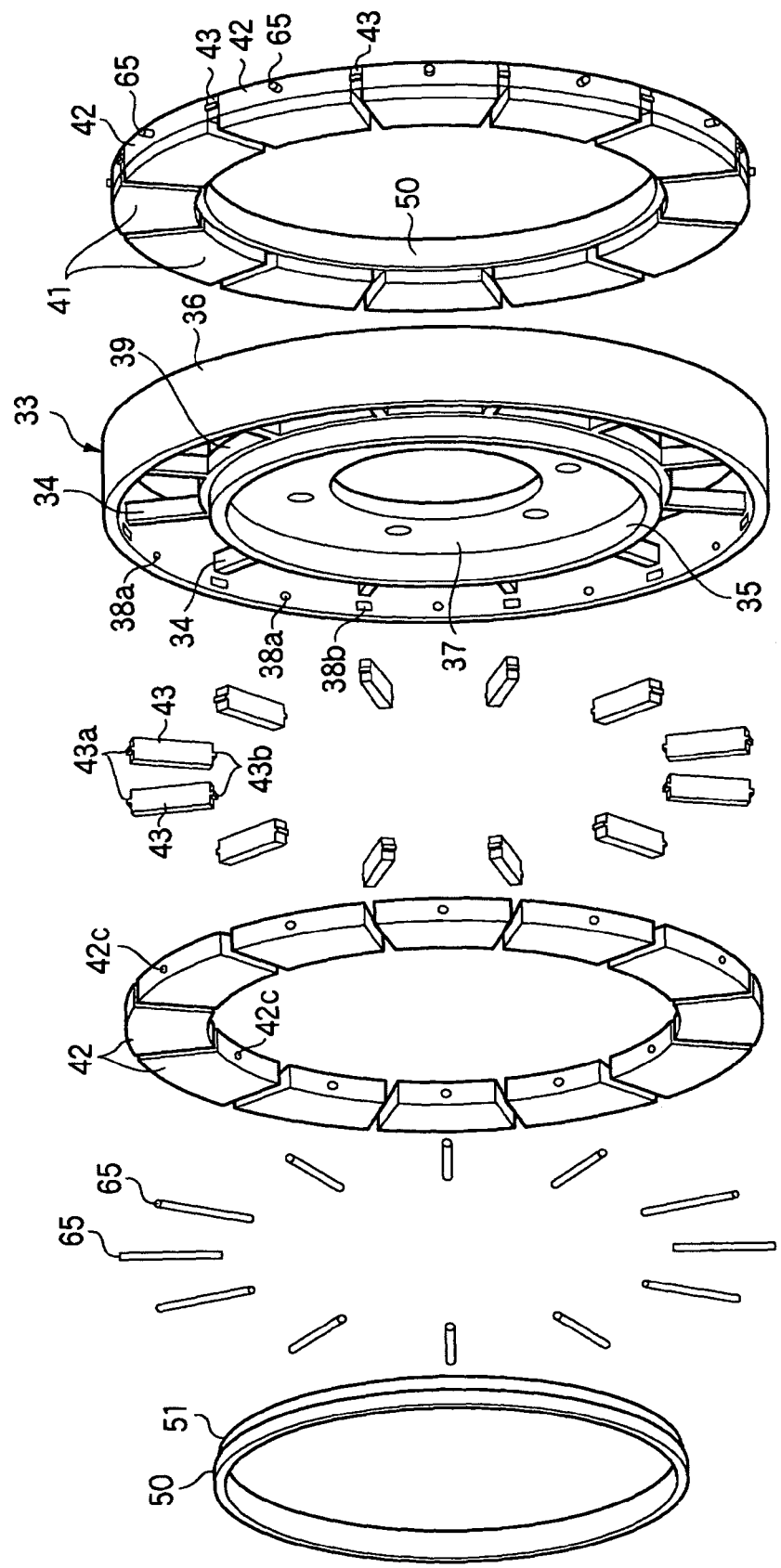
FIG. 12 is an exploded perspective view of a rotor into which the magnetic member shown in FIG. 11 is incorporated.
Figure 13:
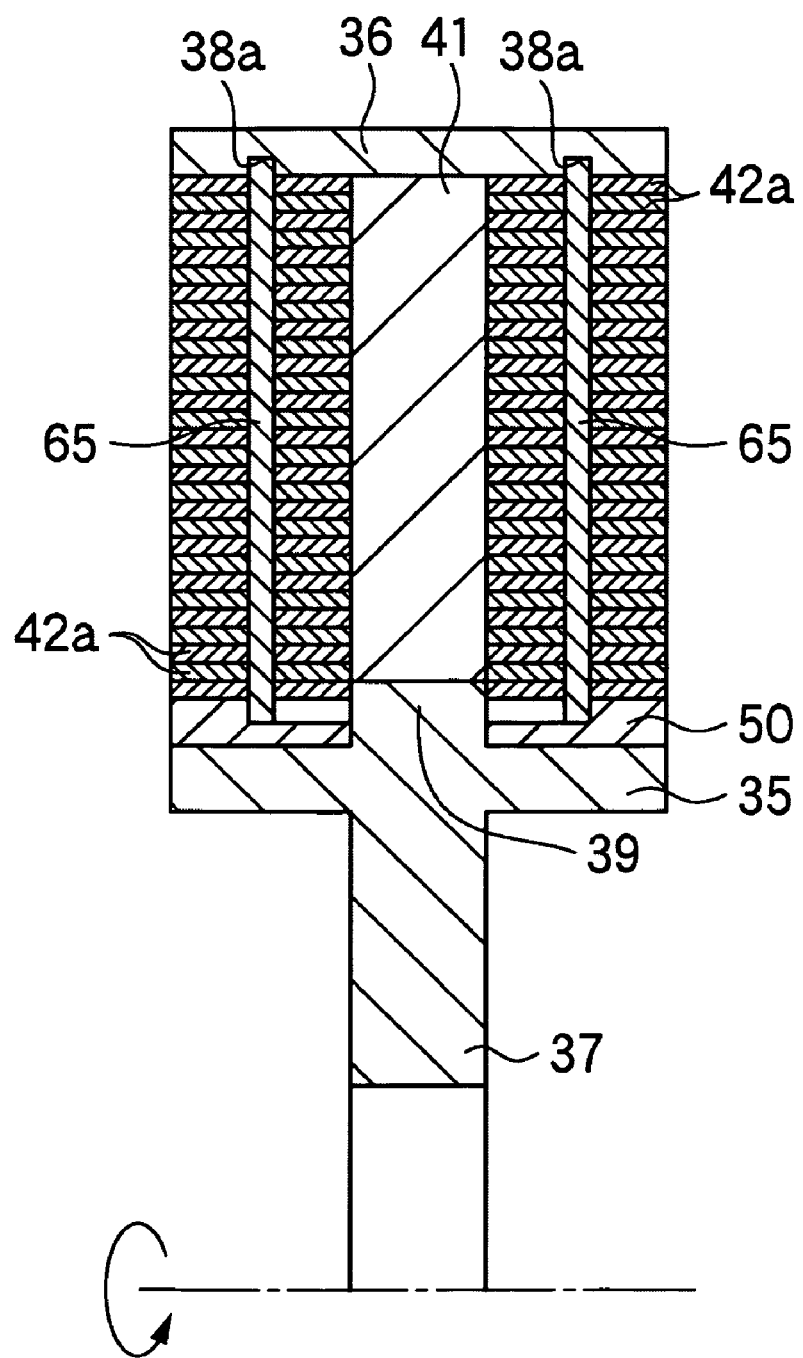
FIG. 13 is a vertical sectional view of the rotor into which the magnetic member shown in FIG. 11 is incorporated.

In addition, as a modified example to the first embodiment, as is shown in FIG. 10, the rotor 11 may be configured in such a manner that the inner circumferential side cylindrical portion (the shaft portion) of the rotor frame 33 is made into separate members and that the separate members are fixed with bolts 57 so that the hooking plates 44 are fixed thereto. Namely, there is provided a rotor 11 which includes a pair of ring members 55 each having an L-shaped section which are provided separately from the connecting portion 37. A fastening recessed portion 56 is formed into a ring-like shape along an outer circumferential corner portion of each of the ring members 55 for accommodating the bent portions 44c therein.

In this rotor 11, since axial distal end portions of the fastening recessed portions 56 are brought into engagement with the bent portions 44c of the hooking plates 44, the magnetic members 42 are positioned properly with respect to the axial direction, and as with the first embodiment, even in the event that the magnetic attracting force by the stators 12 is exerted on the magnetic members 42, there is no such situation that the magnetic members 42 are caused to fall from the rotor frame 33.

In addition, the recessed portions and the projecting portions are formed by the clamping portions 42b, respectively, on the inner circumferential surface and outer circumferential surface of the individual electromagnetic steel sheets 42a, so that when the plurality of electromagnetic steel sheets 42a are stacked together, the projecting portions on the outer circumferential surfaces of the electromagnetic steel sheets 42a fit in the recessed portions on the inner circumferential surfaces of the adjacent electromagnetic steel sheets 42a whereby the electromagnetic steel sheets 42a are positioned properly with respect to the axial direction by the adjacent electromagnetic steel sheets 42a or each other. Therefore, even in the event that the adhesion between the electromagnetic steel sheets is reduced due to an increase in temperature or deterioration with age, by the clamping portions on the individual electromagnetic steel sheets being caused to mesh with those of the electromagnetic steel sheets lying thereabove and therebelow, a drawback can be prevented that the magnetic members are offset, broken or unfastened. Note that in addition to the formation of the clamping portions 42b, the magnetic members 42 and the rotor frame 33 may be bonded together by an adhesive, and the electromagnetic steel sheets 42 themselves may be bonded together by an adhesive.

Second Embodiment

Next, an axial gap motor according to a second embodiment of the invention will be described by reference to FIGS. 11 to 14E. Note that the axial gap motor of the second embodiment differs from the axial gap motor of the first embodiment in the construction of an electromagnetic steel sheet. Because of this, like reference numerals or corresponding reference numerals will be given to like or corresponding portions to those of the first embodiment, and the description thereof will be simplified or omitted.

As is shown in FIGS. 11 to 14E, a magnetic member 42 of an axial gap motor of the second embodiment has a substantially fan-like or segmental shape and has a configuration in which a plurality of electromagnetic steel sheets 42a are stacked together in a radial direction. In addition, a through hole 42c is formed at a substantially central portion of each electromagnetic steel sheet 42a in such a manner as to penetrate from an inner circumferential surface side to an outer circumferential surface side or vice versa, and the adjacent electromagnetic steel sheets 42a are positioned with respect to each other by a through pin 65 which passes through the through holes 42c.

The through pin 65 is made of a magnetic material and is formed slightly longer than a radial length of the magnetic member 42, so that when it is inserted into the magnetic member 42, the through pin 65 is made to project both from the inner circumferential side and the outer circumferential side of the magnetic member.

Pin holes 38a are formed in an inner circumferential surface of a outer circumferential side cylindrical portion 36 of a rotor frame 33, so that distal ends of the through pins 65 which project from the magnetic members 42 to outer circumferential sides thereof are made to fit in the pin holes 38a so formed.

In addition, projection fitting holes 38b into which projecting portions 43a of sub-permanent, magnet pieces 43 are allowed to fit are formed in the inner circumferential surface of the outer circumferential side cylindrical portion 36 in such a manner as to lie at substantially intermediate portions between the adjacent pin holes 38a. In addition, although an annular groove 38 which accommodates the through pins 65 and the projecting portions 43a may be formed as in the first embodiment, by providing the pin holes 38a and the projection fitting holes 38a in place of the annular groove 38, the magnetic members 42 and the sub-permanent magnet pieces 43 can be positioned with respect to a circumferential direction as well as an axial direction.

Note that the number of through holes 42c which are formed in each electromagnetic steel sheet 42a is not limited to one, and hence, two or more through holes 42c may be formed in each electromagnetic steel sheet 42a, and the through pin 65 may be inserted into each of the through holes so formed.

An assembling method of the rotor 11 will be described by reference to FIGS. 14A to 14E. Note that in FIGS. 14A to 14E, since the rotor 11 is symmetrical on its left- and right-hand sides in the axial direction, only one side (a left-hand side in the figures) in the axial direction thereof is shown and the other side (a right-hand side in the figures) thereof is omitted.

Firstly, as is shown in FIG. 14A, the through pins 65 are inserted into the through holes 42c in the magnetic members 42. Following this, the magnetic members 42 into which the through pins 65 are inserted are mounted in the rotor frame 33 as is shown in FIG. 14B in which main permanent magnet pieces 41 are mounted in spaces which are surrounded by arc-shaped projecting portions 39 of an inner circumferential side cylindrical portion 35 and the outer circumferential side cylindrical portion 36 from both sides in the radial direction and by radial ribs 34 lying adjacent to each other in the circumferential direction in such a manner as to confront the corresponding main permanent magnet pieces 41 in the axial direction. As this occurs, distal end portions of the through pins 65 which project radially outwards from the magnetic members 42 are caused to fit in the pin holes 38a formed in the inner circumferential surface of the outer circumferential side cylindrical portion 36, so that the magnetic members 42 are positioned with respect to the axial direction and the circumferential direction.

Next, as is shown in FIG. 14C, the sub-permanent magnet pieces 43 are mounted in spaces which are defined by the magnetic members 42, 42 which lie adjacent to each other in the circumferential direction and are closed by the radial ribs 34 on one of sides in the axial direction. As this occurs, the projecting portions 43a of the sub-permanent magnet pieces 43 are caused to fit in the projection fitting holes 38b formed in the inner circumferential surface of the outer circumferential side cylindrical portion 36, so that the sub-permanent magnet pieces 43 are positioned with respect to the axial direction.

Following this, as is shown in FIG. 14D, a press fit ring 50, on which a hooking portion 51 is formed where the through pins 65 which project from the inner circumferential sides of the magnetic members 42 and the projecting portions 43b on the sub-permanent magnet pieces 43 are hooked, is inserted into a space defined by inner circumferential surfaces of the magnetic members 42 and the inner circumferential side cylindrical portion 35, so that the through pins 65 which project from the inner circumferential sides of the magnetic members 42 and the projecting portions 43b on the sub-permanent magnet pieces 43 are hooked on the hooking portion 51 of the press fit ring 50 so as to be fixed thereat. By this, the rotor 11 is built up as is shown in FIG. 14E.

Thus, as has been described heretofore, according to the axial gap motor 10 according to this embodiment, since the distal end portions of the through pins 65 which project from the outside diameter side fit in the pin holes 38a formed in the inner circumferential surface of the outer circumferential side cylindrical portion 36 of the rotor frame 33, the magnetic members 42 are positioned with respect to both the axial direction and the circumferential direction. Because of this, even in the event that a magnetic attracting force by the stators 12 is exerted on the magnetic members 42, there is no such situation that the magnetic members 42 are caused to fall from the rotor frame 33. In addition, since the hooking portion 51 of the press fit ring 50 is brought into engagement with the through pins 65 which projects from the inner circumferential surfaces of the magnetic members 42, the magnetic members 42 are also positioned with respect to the axial direction on the inside diameter side. Because of this, even in the event that the magnetic attracting force by the stators 12 is exerted on the magnetic members 42, there is no such situation that the magnetic members 42 are caused to fall from the rotor frame 33.

In addition, since the projecting portions 43a are provided on the outer circumferential surfaces of the sub-permanent magnet pieces 43 in such a manner that the projecting portions 43a fit in the projection fitting holes 38b formed in the inner circumferential surface of the outer circumferential side cylindrical portion 36 of the rotor frame 33, not only the magnetic members 42 but also the sub-permanent magnet pieces 43 can be held within the rotor frame 33 in an ensured fashion. Additionally, since the projecting portions 43a are provided on the inner circumferential surfaces of the sub-permanent magnet pieces 43 in such a manner that the projecting portions 43a are brought into engagement with the hooking portion 51 of the press fit ring 50, the sub-permanent magnet pieces 43 are also positioned with respect to the axial direction on the inside diameter sides thereof. Because of this, even in the event that the magnetic attracting force by the stators 12 is exerted on the sub-permanent magnet pieces 43, there is no such situation that the sub-permanent magnet pieces 43 are caused to fall from the rotor frame 33.

Note that also in this embodiment, as with the first embodiment, the inner circumferential side cylindrical portion (the shaft portion) of the rotor frame 33 may be made into separate members, and these separate members are bolted so as to fix the through pins 65 and the projecting portions 43b of the sub-permanent magnet pieces 43.

In addition, the invention is not limited to the embodiments that have been described heretofore and hence, can be modified or improved as required. Additionally, in this embodiment, although the fitting portions which are adapted to fit in the shaft portion or the rim portion of the rotor frame may be provided on either the outside diameter sides or the inside diameter sides of the magnetic members, since when the rotor rotates, a centrifugal force is exerted on the magnetic members radially outwards, in order to support the magnetic members in a stable fashion, the outside diameter sides of the magnetic members are preferably caused to fit in the rim portion of the rotor frame. In addition, the axial gap motor of the invention is not limited to the Halbach motor, and hence, non-magnetic elements can be installed in place of the sub-permanent magnet pieces. Further, the stators do not have to be disposed on both sides of the rotor, and hence, the stator may only have to be disposed on at least one side thereof.

Third Embodiment

Next, referring to FIGS. 15 to 18, an axial gap motor according to a third embodiment will be described. In addition, since the construction of a stator of the axial gap motor of the third embodiment is the same as that of the stator of the axial gap motor of the first embodiment, the description thereof will be omitted here.

Figure 15:
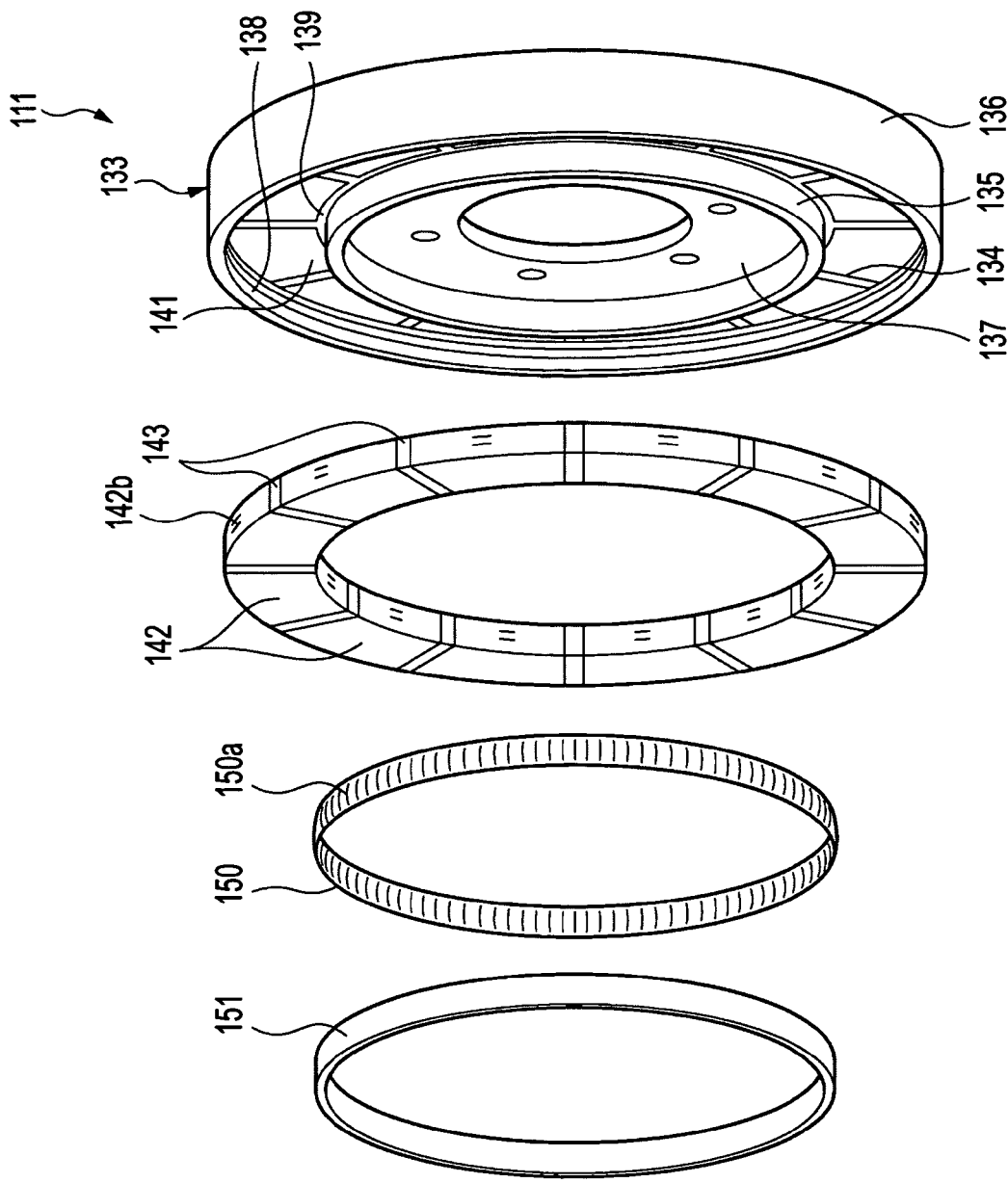
FIG. 15 is an exploded perspective view of a rotor of an axial gap motor according to a third embodiment of the invention, which shows only a left half part thereof.
Figure 16:
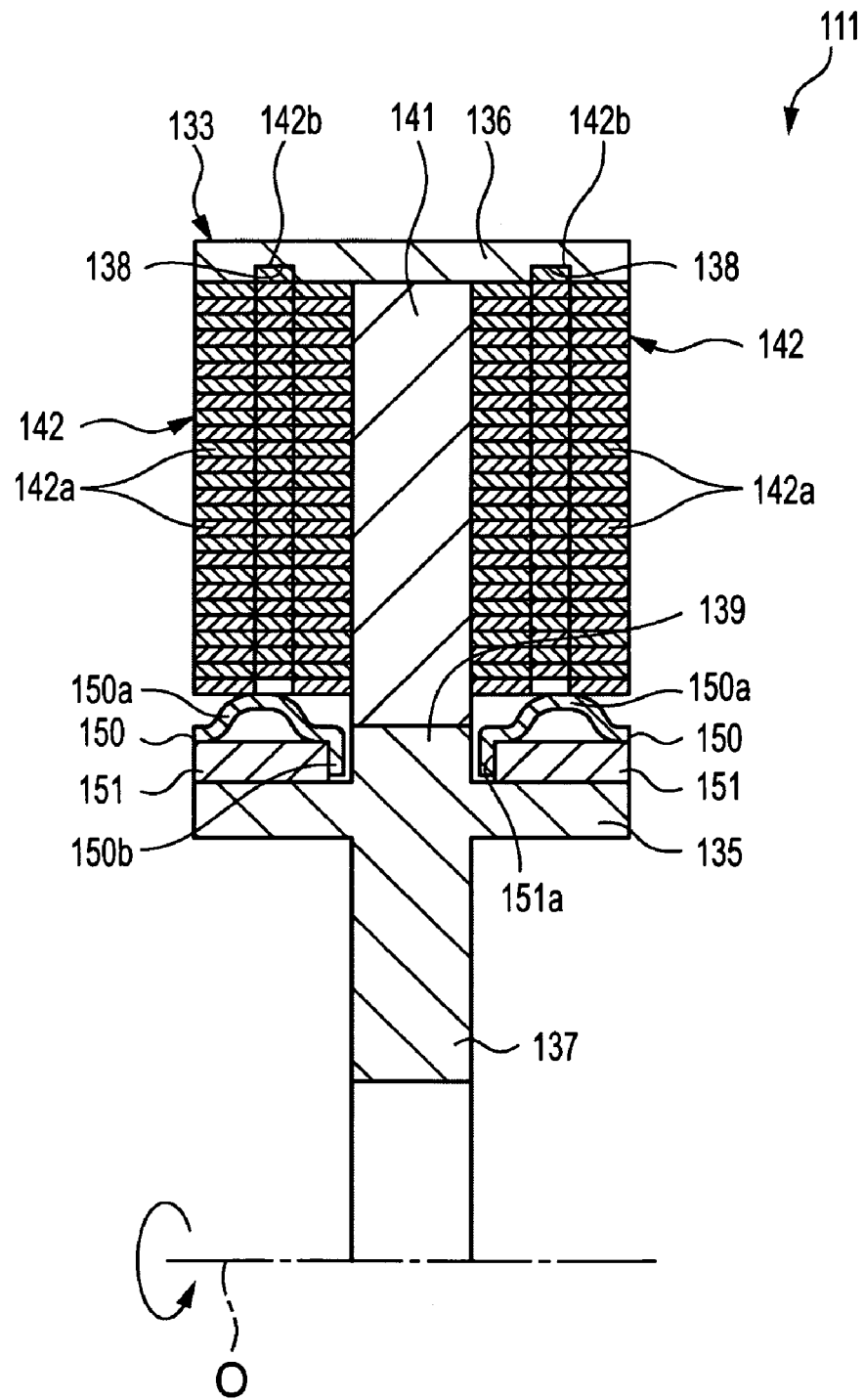
FIG. 16 is a vertical sectional view of the rotor of the axial gap motor according to the third embodiment of the invention.

As is shown in FIGS. 15 and 16, a rotor 111 includes a rotor frame 133 which is made of a non-magnetic material, a plurality of main magnet portions 141 which are accommodated in the rotor frame 133, a plurality of magnetic members 142, a plurality of sub-magnet portions 143, biasing rings 150 which configure biasing members, and press fit rings 151.

The rotor frame 133 is made of a non-magnetic material such as stainless steel or aluminum and includes a plurality of radial ribs 134, . . . 134 which are disposed at predetermined intervals in a circumferential direction and which extend in a radial direction, an inner circumferential side cylindrical portion 135 and an outer circumferential side cylindrical portion 136 which are connected together by the radial ribs 134, . . . , 134, and a connecting portion 137 which is formed into an annular plate-like shape which projects inwards from a position on an inner circumferential surface of the inner circumferential side cylindrical portion 135 and which is connected to an exterior drive shaft (for example, an input shaft of a transmission of a vehicle). In addition, in this embodiment, since the inner circumferential side cylindrical portion 135 is connected to the exterior drive shaft, the inner circumferential side cylindrical portion 135 configures a shaft portion, while the outer circumferential side cylindrical portion 136 configures a rim portion.

Annular grooves 138 are formed on an inner circumferential surface of the outer circumferential cylindrical portion 136 in such a manner as to lie on both axial sides of the radial ribs 134. In addition, arc-shaped projecting portions 139 are formed on an outer circumferential surface of the inner circumferential side cylindrical portion 135 in such a manner as to lie between the adjacent radial ribs 134, 134.

The main magnet portions 141 are magnetized in a thickness direction (that is, in the axial direction), each have a substantially fan-like or segmental shape and are disposed individually between the ribs 134 which lie adjacent to each other in the circumferential direction of the rotor frame 133. By this configuration, the main magnet portions 141 are individually accommodated in substantially segmental spaces which are defined by the outer circumferential side cylindrical portion 136, the inner circumferential side cylindrical portion 135 and the radial ribs 134, 134. As this occurs, the main magnet portions 141, 141 which lie adjacent to each other in the circumferential direction are set in such a manner that their magnetized directions become different.

The pairs of magnetic members 142 are accommodated between the outer circumferential side cylindrical portion 136 and the inner circumferential side cylindrical portion 135 of the rotor frame 133 in such a manner as to hold therebetween the main magnet portions 141 from both sides in the thickness direction (that is, the axial direction) thereof.

The magnetic member 142 has a configuration in which a plurality of electromagnetic steel sheets 142a are stacked together in the radial direction, and a substantially arc-shaped recess portion (not shown) and a substantially arc-shaped projecting portion 142b are formed, respectively, on an inner circumferential surface and an outer circumferential surface of each electromagnetic steel sheet 142a at a substantially central portion thereof. These recessed portions and projecting portions 142b are formed when the electromagnetic steel sheets 142a are clamped piece by piece by a press, and when the plurality of electromagnetic steel sheets 142a are stacked together, the projecting portions 142b on the outer circumferential surfaces of the electromagnetic steel sheets 124a are caused to fit in the recessed portions on the inner circumferential surfaces of the adjacent electromagnetic steel sheets 142a, whereby the magnetic members 142 are positioned properly relative to each other.

The magnetic members 142, which are made up of the plurality of electromagnetic steel sheets 142a which are stacked in the way described above, are accommodated within the rotor frame 133 in such a manner that the projecting portions 142b on the electromagnetic steel sheets 142a which are situated radially outermost fit in the annular grooves 138 of the outer circumferential side cylindrical portion 136 (rim portion) on the rotor frame 133.

In addition, in addition to the configuration in which the magnetic member 142 is made up of the electromagnetic steel sheets 142a which are stacked together, the magnetic member 142 can be made up of a sintered member that is made by forming and calcining powder such as iron powder. In this case, too, a projecting portion 142b is formed on an outer circumferential surface, and a recessed portion is formed on an inner circumferential surface of the magnetic member 142. In addition, the projecting portion 142b is caused to fit in the annular groove 138 on the rotor frame 133, and the magnetic member 142 is accommodated within the rotor frame 133.

The sub-magnet portions 143 are magnetized in a direction which is orthogonal to the axial direction and the radial direction (that is, a substantially circumferential direction) and are accommodated between the outer circumferential cylindrical portion 136 and the inner circumferential cylindrical portion 135 of the rotor frame 133 while being disposed between the magnetic members 142 which lie adjacent to each other in the circumferential direction on both sides in a rotational axis direction of the ribs 134.

As materials for the respective constituent components of the rotor 11 in the embodiment, for example, a stainless steel (SUS304) is used for the rotor frame 133, a silicon steel sheet is used for the magnetic member 142, and a neodymium iron boron magnet is used for the main magnet portion 141 and the sub-magnet portion 143. In addition, an epoxy adhesive is used as an adhesive for fixing the magnetic members 142, the main magnet portions 141 and the sub-magnet portions 143 to the rotor frame 133. In addition, respective thermal expansion coefficients α of the materials are as follows: in the stainless steel (SUS304), $\alpha=17.3\times10^{-6}$, in the silicon steel sheet, $\alpha=12.0\times10^{-6}$, in the neodymium iron boron magnet, $\alpha=5.5$ to $5.7\times10^{-6}$ in the magnetized direction and $\alpha=-3$ to $0.5\times10^{-6}$ in a direction orthogonal to the magnetized direction, and in the epoxy adhesive, $\alpha=55$ to $65\times10^{6}$.

Figure 17:
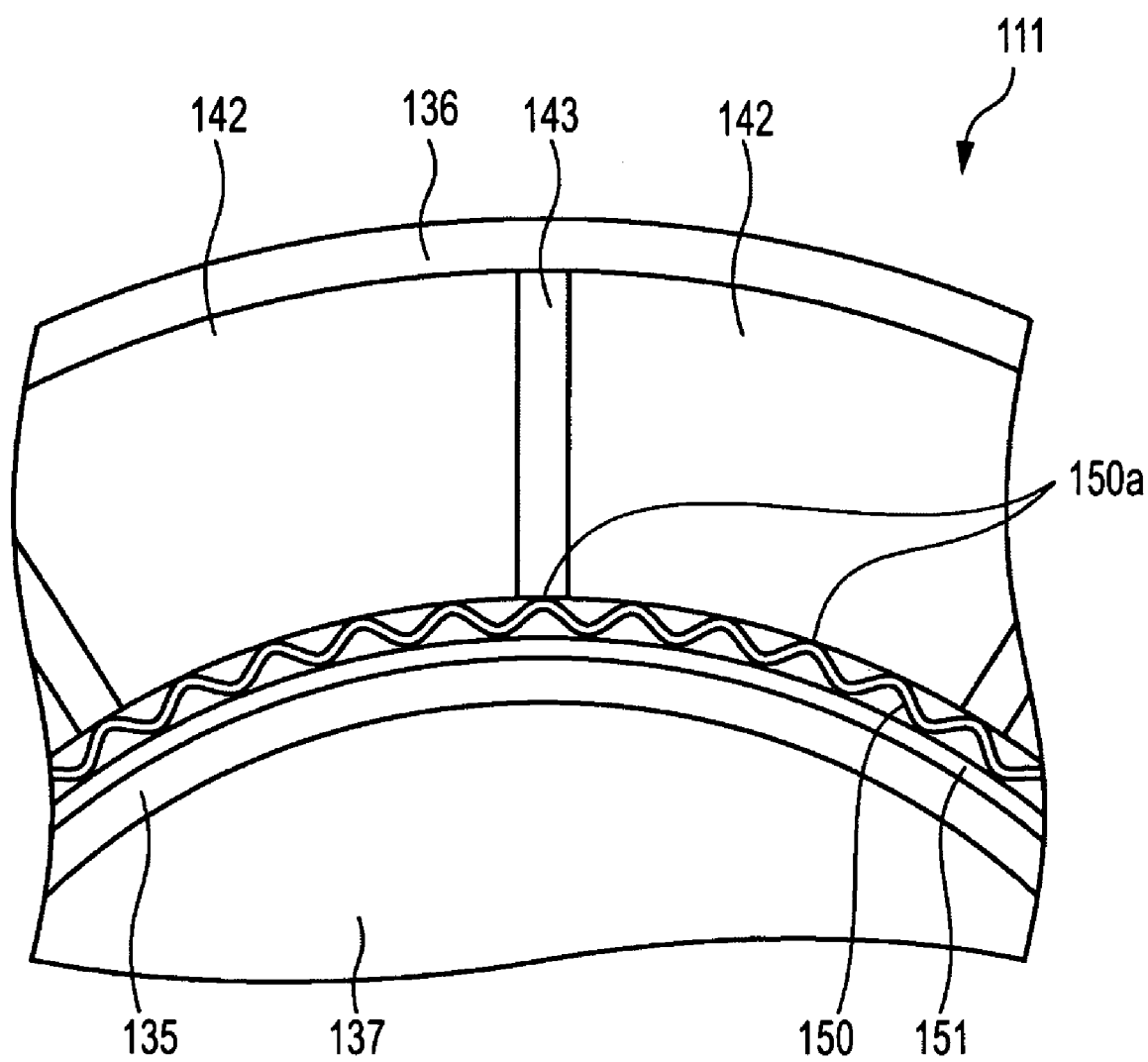
FIG. 17 is an enlarged side view of a main part of the rotor of the axial gap motor according to the third embodiment of the invention.
Figure 18:
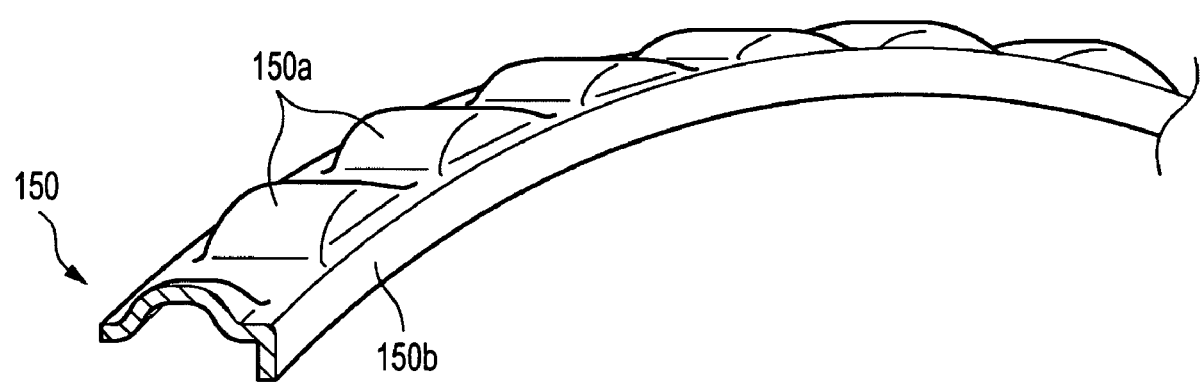
FIG. 18 is a partial enlarged perspective view of a biasing ring which is shown as being partially cutaway.

As is shown in FIGS. 17 and 18, the biasing ring 150 has a number of projecting portions 150a which are formed in such a manner as to project radially outwards as viewed from a side thereof, and a small annular portion 150b, which has a collar-like shape, is formed by bending an axial edge of the biasing ring 150 radially inwards. The biasing ring 150 is made up of a spring member which is made of a non-magnetic material, for example. By this, the short circuit of magnetic fluxes of the magnets can be suppressed to a minimum level, thereby making it possible to suppress the loss of generated torque. In addition, the biasing ring 150 may be a wavy ring having a number of projecting portions 150a by being bent alternately radially outwards and inwards.

When building up the rotor 111, as is shown in FIGS. 16 and 17, while the main magnet portions 141, 141 which lie adjacent to each other in the circumferential direction are arranged in such a manner that their magnetized directions become different, the main magnet portions 141 are individually accommodated within substantially segmental spaces which are defined by the outer circumferential side cylindrical portion 136, the inner circumferential side cylindrical portion 135 and the radial ribs 134, 134, and thereafter, the magnetic members 142, which are each made up of the plurality of electromagnetic steel sheets 142a which are stacked together, are disposed in such a manner as to lie on both the sides in the axial direction of the main magnet portions 141 with the projecting portions 142b on the magnetic members 142 caused to fit in the annular grooves 138 on the rotor frame 133. Following this, the sub-magnet portions 143 are disposed individually in the spaces defined between the magnetic members 142 which lie adjacent to each other in the circumferential direction. Then, the biasing rings 150 are caused to fit loosely on the inner circumferential side cylindrical portion 135 from both the sides of the rotor frame 133 in such a manner that the small annular portions 150b are individually oriented axially inwards, and further, the press fit rings 151 are press fitted between the biasing rings 150 and the inner circumferential side cylindrical portion 135.

By this press fitting of the press fitting rings 151, the biasing rings 150 are forcibly expanded radially outwards, whereby the projecting portions 150a of the biasing rings 150 are individually brought into abutment with the inner circumferential surfaces of the magnetic members 142 and the sub-magnet portions 143. The magnetic members 142 an the sub-magnet portions 143 are pressed radially outwards by virtue of the spring force of the biasing rings 150 and are then pressed against the outer circumferential side cylindrical portion 136 of the rotor frame 133 to thereby be fixed thereto. At the same time as this occurs, the small annular portions 150b of the biasing rings 150 are held by the arc-shaped projecting portions 139 of the rotor frame 133 and lateral surfaces of the press fit rings 151, whereby the biasing rings 150 are prevented from being dislocated in the axial direction.

Thus, as has been described heretofore, according to the axial gap motor 110 of this embodiment, even in the event that when the rotor 111 rotates, the rotor frame 133 is deformed by virtue of the centrifugal force generated then, whereby the magnetic members 142 and the sub-magnet portions 143 are displaced radially outwards, or even in the event that there is generated a difference or change among the constituent members due to a change in length of the constituent members as a result of the difference in thermal expansion coefficient there among, the biasing rings 150 follow the displacement and change and press independently the magnetic members 142 and the sub-magnet portions 143 against the outer circumferential side cylindrical portion 136 of the rotor frame 133 so that the magnetic members 142 and the sub-magnet portions 143 are fixed to the rotor frame 133 with a substantially constant holding force at all times.

In addition, since the biasing ring 150 is disposed between the magnetic members 142 and the sub-magnet portions 143 and the inner circumferential side cylindrical portion 135 of the rotor frame 133, the magnetic members 142 and the sub-magnet portions 143 are pressed individually by the biasing ring 150. In the embodiment shown in FIG. 17, the magnetic member 142 and the sub-magnet portion 143 are pressed independently by four projecting portions 150a and one projecting portion 150a of the biasing ring 150, respectively. By this, even in the event that the deformation amounts and displacement amounts of the magnetic members 142 and the sub-magnet portions 143 are different from each other due to the difference in thermal expansion coefficient, the individual magnetic members 142 and sub-magnet portions 143 are pressed against the rotor frame 133 in an ensured fashion so as to be fixed thereto.

In addition, this pressing force generates a friction force between the magnetic members 142 and the sub-magnet portions 143 and the rotor frame 133, and the friction force so generated prevents the circumferential movement and axial movement, the latter movement resulting from the magnetic attracting force by the stators 12, of the magnetic members 142 and the sub-magnet portions 143. By this, the motor properties of the axial gap motor 110 become stable.

Figure 19:
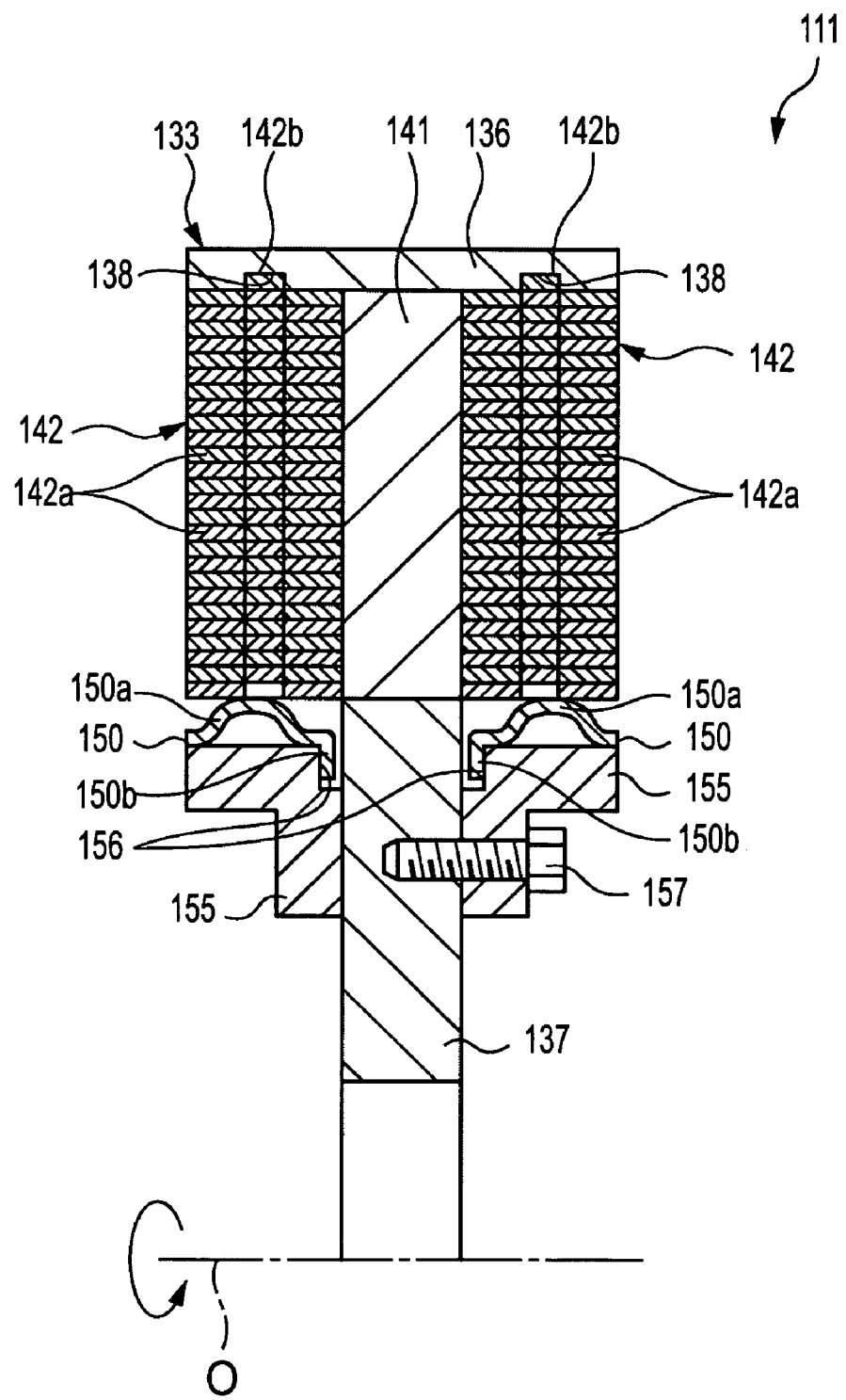
FIG. 19 is a vertical sectional view of a modified example to the rotor of the third embodiment.

In addition, as a modified example to the third embodiment, as is shown in FIG. 19, the rotor 11 may be configured in such a manner that the inner circumferential side cylindrical portion (the shaft portion) of the rotor frame 133 is made into separate members and that the separate members are fastened with bolts. Namely, there is provided a rotor 111 which includes a pair of ring members 155 which each have an L-shaped section and which are provided separately from a connecting portion 137. A fastening recessed portion 156 is formed into a ring-like shape along an outer circumferential corner portion of each of the ring members 155 for accommodating a small annular portion 150b of the biasing ring 150.

Consequently, in this rotor 111, as with the third embodiment, main magnet portions 141, magnetic members 142, sub-magnet portions 143 and biasing rings 150 are assembled to the rotor frame 133. Then, the ring members 155 are brought into abutment with inner circumferential surfaces of the biasing rings 150 and are then fixed to the connecting portion 137 with bolts 157. By this, the small annular portions 150b of the biasing rings 150 are held by the connecting portion 137 and the ring members 155 therebetween, the dislocation of the biasing rings 150 being thereby prevented.

Fourth Embodiment

Next, an axial gap motor according to a fourth embodiment of the invention will be described by reference to FIGS. 20 to 23B. Note that the axial gap motor of the fourth embodiment is such that main magnet portions, magnetic members and sub-magnet portions of a rotor are made into magnetic pole units by support plates which are disposed on radial sides and which configure biasing members. The other features of this embodiment are the same as those of the rotor of the third embodiment, and therefore, like reference numerals or corresponding reference numerals will be given to like or corresponding portions to those of the third embodiment, and the description thereof will be simplified or omitted.

Figure 20:
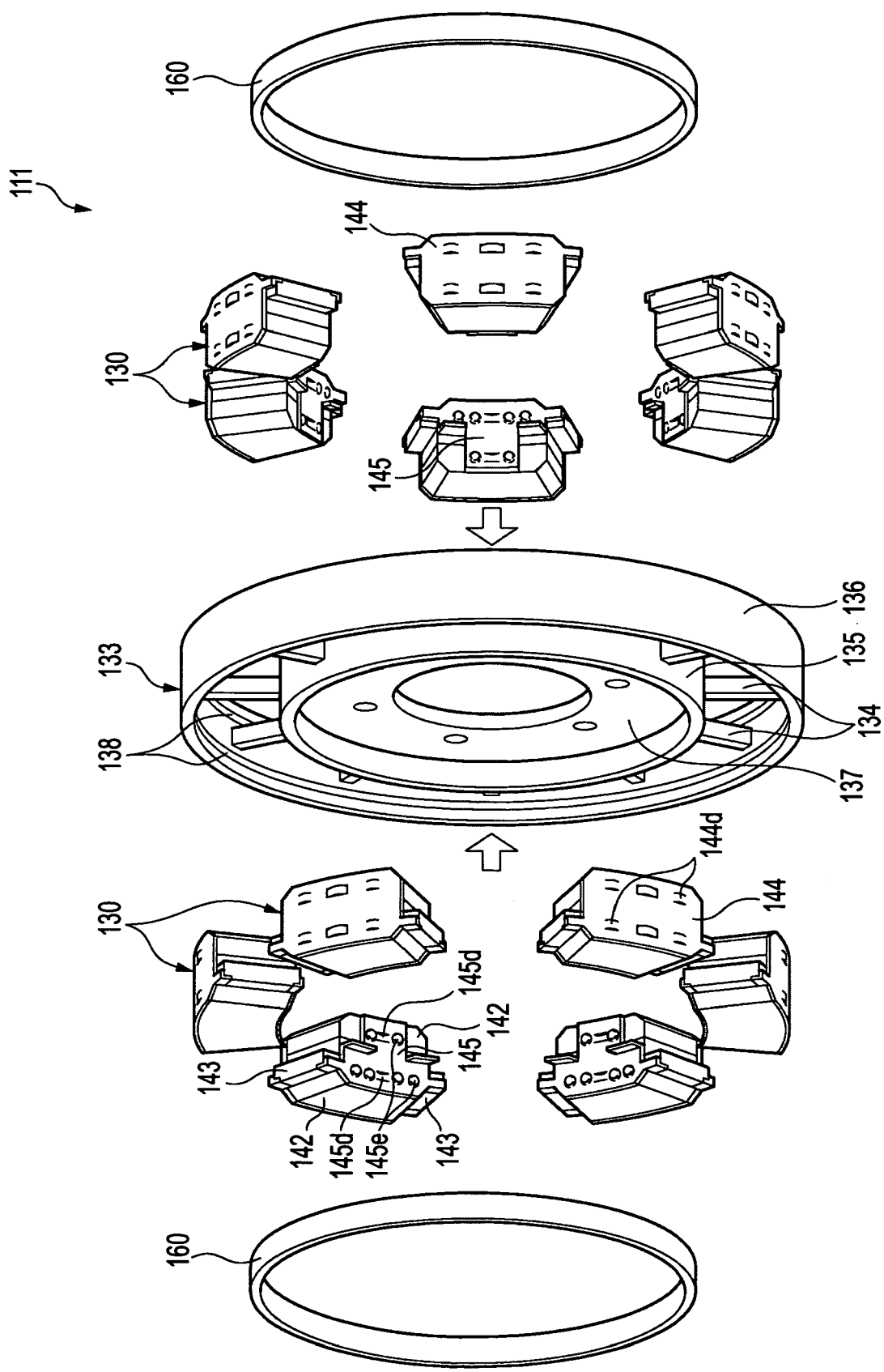
FIG. 20 is an exploded perspective view of a rotor according to a fourth embodiment of the invention.
Figure 21:
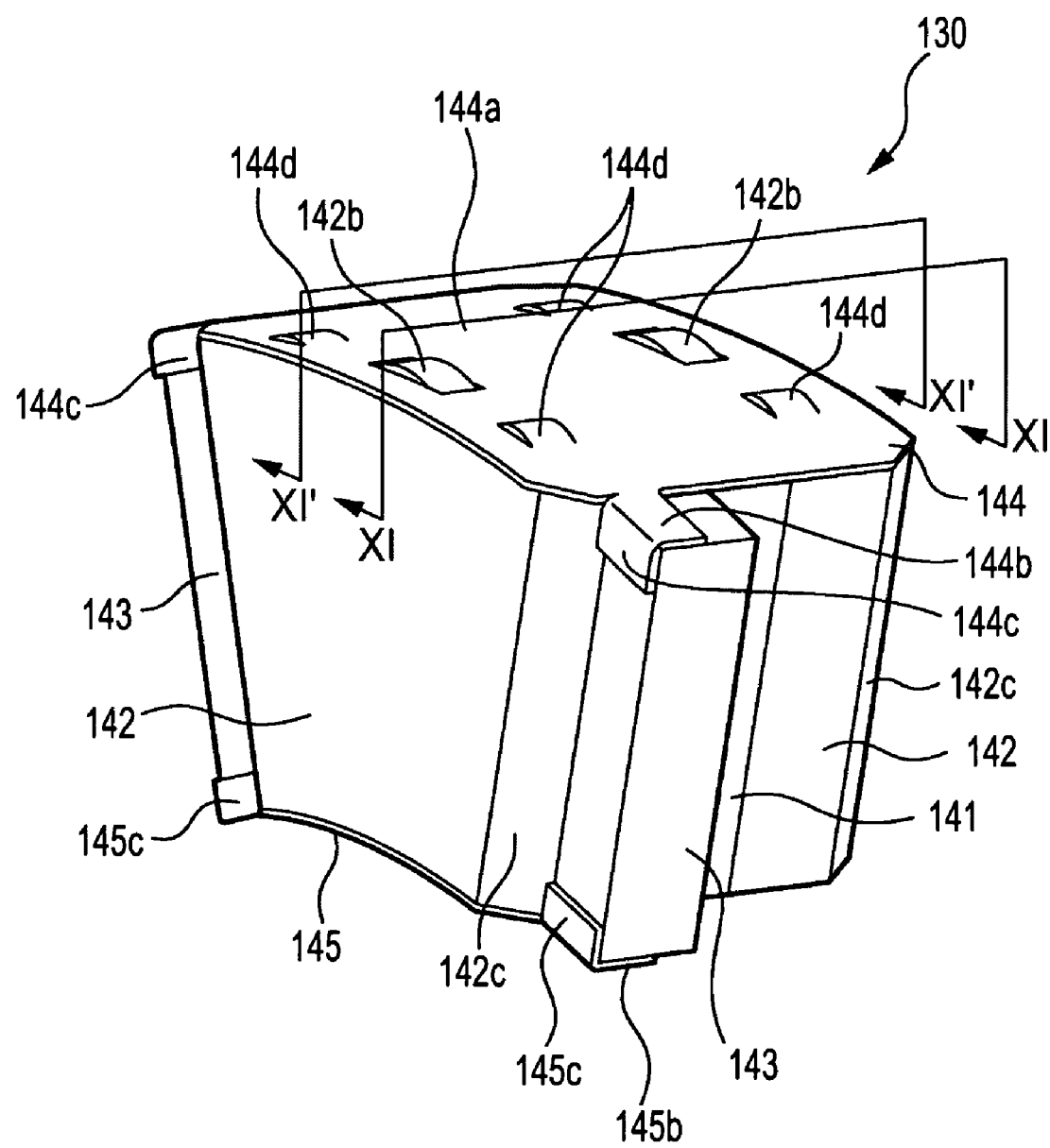
FIG. 21 is an enlarged perspective view of a magnetic pole unit shown in FIG. 20.
Figure 22:
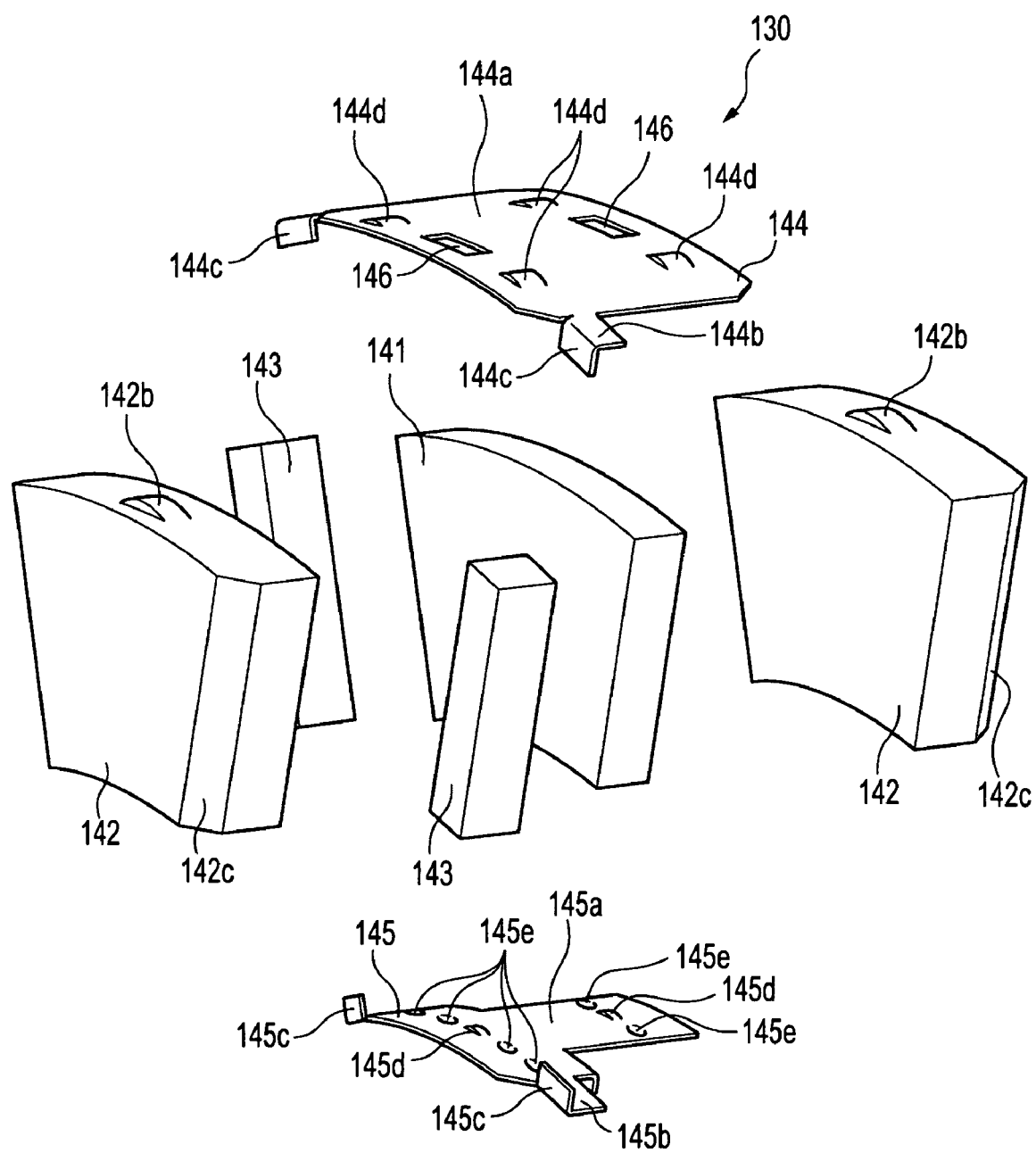
FIG. 22 is an exploded perspective view of the magnetic pole unit shown in FIG. 21.

As is shown in FIG. 20, a rotor 111 of the fourth embodiment includes a plurality of (12 in the embodiment shown in the figures) magnetic pole units 130 and a rotor frame 133 which is made of a non-magnetic material, and the magnetic pole units 130 are accommodated within the rotor frame 133.

Although the rotor frame 113 includes, as in the third embodiment, a plurality of radial ribs 134, . . . , 134, an inner circumferential side cylindrical portion 135 and an outer circumferential side cylindrical portion 136, and a connecting portion 137, being different from the inner circumferential side cylindrical portion 135 in the third embodiment, the inner circumferential side cylindrical portion 135 has an outside diameter which is uniform along an axial direction without any arc-shaped projecting portion on an outer circumferential surface thereof.

As with the third embodiment, the magnetic pole unit 130 includes a main magnet portion 141, a pair of magnetic members 142 and two sub-magnet portions 143, and the main magnet portion 141, the pair of magnetic members 142 and the two sub-magnet portions 143 are held together from radial sides (an outer circumferential side and an inner circumferential side) thereof by an outer support plate 144 and an inner support plate 145 so as to be assembled into a unit.

Axial outer radial corner portions of the magnetic member 142 are each chamfered so as to be formed into a chamfered portion 142c. This chamfered portion 142c is formed so that the magnetic member 142 continues to an axial lateral surface of the sub-magnet portion 143 without any difference in level existing therebetween, and this configuration has an advantage of reducing cogging torque and torque ripple.

In addition, the outer support plate 144 is formed of a non-magnetic material such as a stainless steel sheet and includes a substantially rectangular outer circumferential fastening portion 144a which is adapted to be brought into abutment with outer circumferential surfaces of the main magnet portion 141 and the pair of magnetic members 142, end face supporting surfaces 144b which are provided at an axial edge of the outer circumferential fastening portion 144a in such a manner as to extend from both circumferential sides of the outer circumferential fastening portion 144a, and lateral surface supporting surfaces 144c which are formed by being bent radially inwards from the end face supporting surfaces 144b. The end face supporting surfaces 144b support the outer circumferential surfaces of the sub-magnet portions 143, and the lateral surface supporting surfaces 144c support the axial lateral surfaces of the sub-magnet portions 143.

A pair of fitting holes 146, which are adapted to fit on projecting portions 142b of the magnetic members 142, are formed on the outer circumferential fastening portion 144a of the outer support plate 144 in positions which correspond to the projecting portions 142b. In addition, four projecting portions 144d, which are cut to rise radially outwards, are formed at both axial end portions of the outer circumferential fastening portion 144a, and when the magnetic pole unit 130 is assembled to the rotor frame 133, the projections 144d are caused to fit in the annular groove 38 formed on the outer circumferential side cylindrical portion 136 so that the magnetic pole unit 130 is positioned properly.

As with the outer support plate 144, the inner support plate 145 is formed of a non-magnetic material such as a stainless sheet and includes a substantially T-shaped inner circumferential fastening portion 145a which is adapted to be brought into abutment with inner circumferential surfaces of the main magnet portion 141 and the pair of magnetic members 142, end face supporting surfaces 145b which are provided at an axial edge of the inner circumferential fastening portion 145a in such a manner as to extend from both circumferential sides of the inner circumferential fastening portion 145a, and lateral surface supporting surfaces 145c which are formed by being bent radially outwards from the end face supporting surfaces 145b. A pair of fitting projecting portions 145d, which are adapted to fit in recessed portions which are formed on inner circumferential surfaces of the magnetic members 142, are formed on the inner circumferential fastening portion 145a in positions which correspond to the recessed portions so formed.

In addition, a plurality of (six in total in the embodiment shown in the figures) projecting portions 145e, which are formed in such a manner as to project radially inwards, are formed on substantially the same circumferences as those of the fitting projecting portions 145d in the axial direction, in other words, in positions which correspond to the inner circumferential surfaces of the magnetic members 142. Specifically, two projecting portions 145e are formed in positions which correspond to an inner circumferential surface of one of the pair of magnetic members 142, and four projecting portions 145e are formed in positions which correspond to an inner circumferential surface of the other magnetic member 142. These projecting portions 145e each have elasticity, and the inner support plate 145 functions as a biasing member.

The main magnet portion 141, the pair of magnetic members 142 and the two sub-magnet portions 143 are held together from both the radial sides thereof by the outer support plate 144 and the inner support plate 145 and is unitized into the magnetic pole unit 130. Namely, in the outer support plate 144, the projecting portions 142b on the pair of magnetic members 142, which hold therebetween the main magnet portion 141 from both the sides thereof, are caused to fit in the fitting holes 146 therein, and the end faces and the lateral surfaces of the two sub-magnet portions 143 are brought into abutment with the end face supporting surfaces 144b and the lateral surface supporting surfaces 144c thereof, and further, in this state, the inner support plate 145 is brought into abutment with the inner circumferential surfaces sides of the main magnet portion 141, the pair of magnetic members 142 and the two sub-magnet portions 143, so as to hold these constituent members therebetween. As this occurs, the pair of fitting projecting portions 145d on the inner support plate 145 are caused to fit individually in the recessed portions of the pair of magnetic members 142 so as to position the pair of magnetic members 142 properly.

In addition, in this embodiment, although the main magnet portion 141, the pair of magnetic members 142 and the two sub-magnet portions 143 are fixed together by the outer support plate 144 and the inner support plate 145 and by way of bonding, for example, the outer support plate 144 may be fixed together with the pair of magnetic members 142 at the same time as the pair of magnetic members 142 are clamped.

Figure 23A:
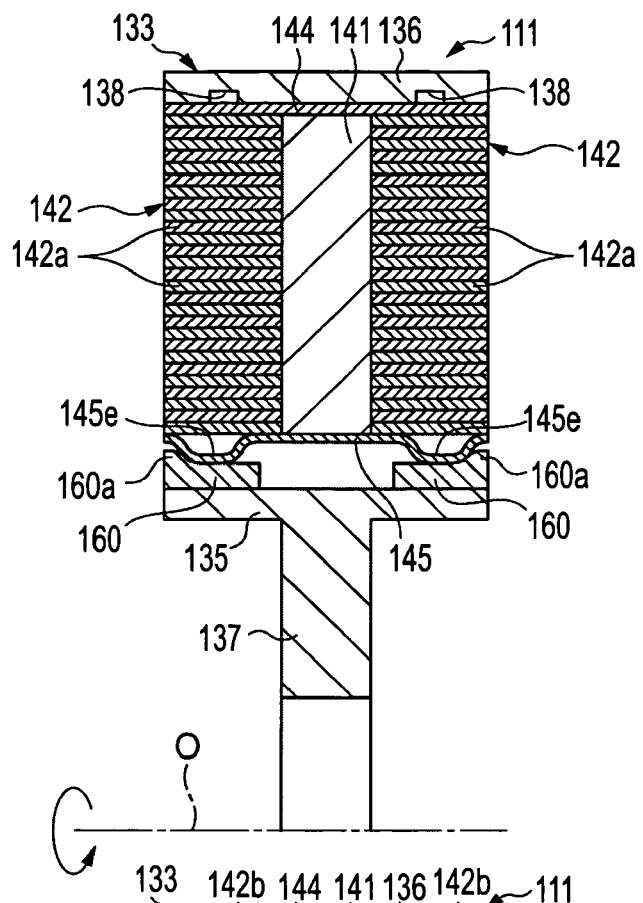
FIG. 23A is a vertical sectional view of the rotor shown in FIG. 20 taken in a position on a magnetic pole unit along the line XI-XI in FIG. 21.
Figure 23B:
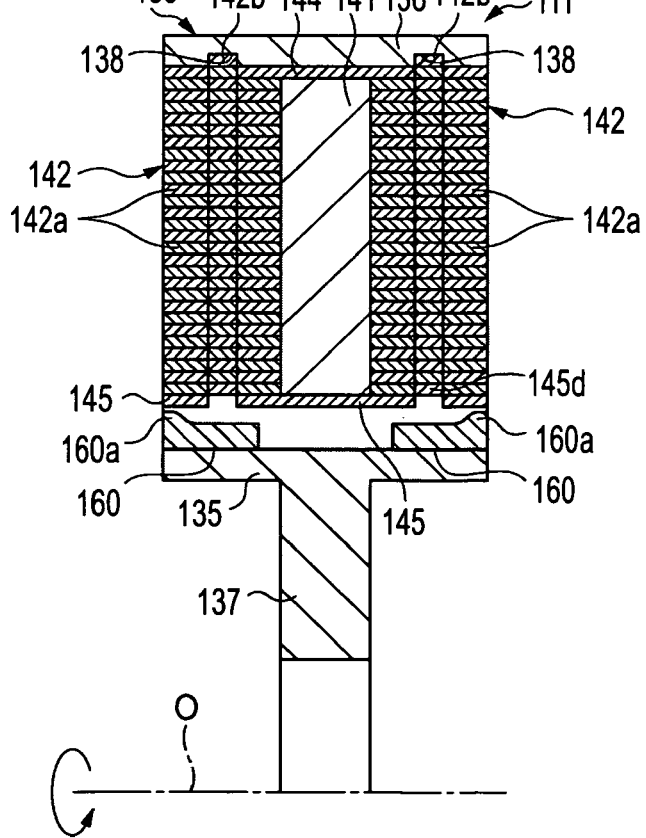
FIG. 23B is a vertical sectional view of the rotor shown in FIG. 20 taken in a position on the magnetic pole unit along the line XI'-XI' in FIG. 21.

As is shown in FIGS. 20, 23A and 23B, the plurality of magnetic pole units 130 each built up in the way described above are assembled into the rotor frame 133 in such a manner that the magnetic pole units 130 which lie adjacent to each other in the circumferential direction are inserted into the rotor frame 133 from directions which are different from each other with respect to the axial direction. As this occurs, the main magnet portions 141, 141 which lie adjacent to each other in the circumferential direction are set in such a manner that their magnetized directions are different from each other.

Specifically, the magnetic pole unit 130 is inserted sideways into a space defined by the outer circumferential side cylindrical portion 136, the inner circumferential side cylindrical portion 135 and the radial ribs 134, 134, and the projecting portions 144d of the outer support plate 144 and the projecting portions 142b of the magnetic members 142 are brought into engagement with the annular grooves 138 on the outer circumferential side cylindrical portion 136 so that the outer support plate 144 is brought into abutment with the inner circumferential surface of the outer circumferential side cylindrical portion 136.

By this, the main magnet portion 141 is held from both the radial sides thereof by the inner radial side cylindrical portion 135 and the outer circumferential side cylindrical portion 136 therebetween and is held from both the circumferential sides thereof by the two radial ribs 134 therebetween. In addition, the two sub-magnet portions 143 are held from both the radial sides thereof by the inner circumferential side cylindrical portion 135 and the outer circumferential side cylindrical portion 136 therebetween and are positioned on one of axial sides of the radial ribs 134.

Following this, a press fit ring 160 is inserted between the inner support plates 145 and the inner circumferential side cylindrical portion 135 from the axial direction and is press fitted thereinto while elastically deforming the projecting portions 145e of the inner support plates 145. A large diameter engagement portion 160a is formed at an axial edge of the press fit ring 160, and this engagement portion 160a is brought into abutment with the projecting portions 145e from an axially outward direction, whereby the magnetic pole units 130 are positioned with respect to the axial direction.

By this, the magnetic pole unit 130 is pressed against the outer circumferential side cylindrical portion 136 of the rotor frame 133 by virtue of the elastic force of the projecting portions 145e of the inner support plate 145 to thereby be fixed thereto, whereby the individual magnetic members 142 and sub-magnet portions 143 can be pressed against and fixed to the rotor frame 133 in an ensured fashion.

In addition, since the main magnet portion 141, the pair of magnetic members 142 and the two sub-magnet portions 143 are unitized into the magnetic pole unit 130 by the support plates 144, 145, the assemblage of those constituent components to the rotor frame 133 can be facilitated.

The other configurations and advantages of the axial gap motor of this embodiment are identical to those of the axial gap motor of the third embodiment.

Note that the invention is not limited to the embodiment and the modified example thereto but can be modified or improved as required.

For example, while in the invention, the one biasing ring is described as the biasing member, the biasing member may be made up of a leaf spring which is divided into a plurality of arc-shaped members.

In addition, although the biasing member of the invention only has to be disposed between the shaft portion and the rim portion of the rotor frame, since the centrifugal force exerted on the magnetic members is exerted radially outwards, the biasing member is preferably disposed between the magnetic members and the shaft portion of the rotor frame, so as to press the magnetic members towards the rim portion of the rotor frame.

Further, while in the invention, the biasing ring 150 is made to be formed in such a manner that the plurality of projecting portions 150a project radially outwards from the cylindrical portion, the biasing ring 150 may be formed in such a manner that the projecting portions 150a project radially inwards.

Fifth Embodiment

Next, referring to FIGS. 24 to 27, a fifth embodiment of an axial gap motor according to the invention will be described. Note that since the construction of a stator of the axial gap motor of the fifth embodiment is the same as that of the stator of the axial gap motor of the first embodiment, the description thereof will be omitted here.

Figure 24:
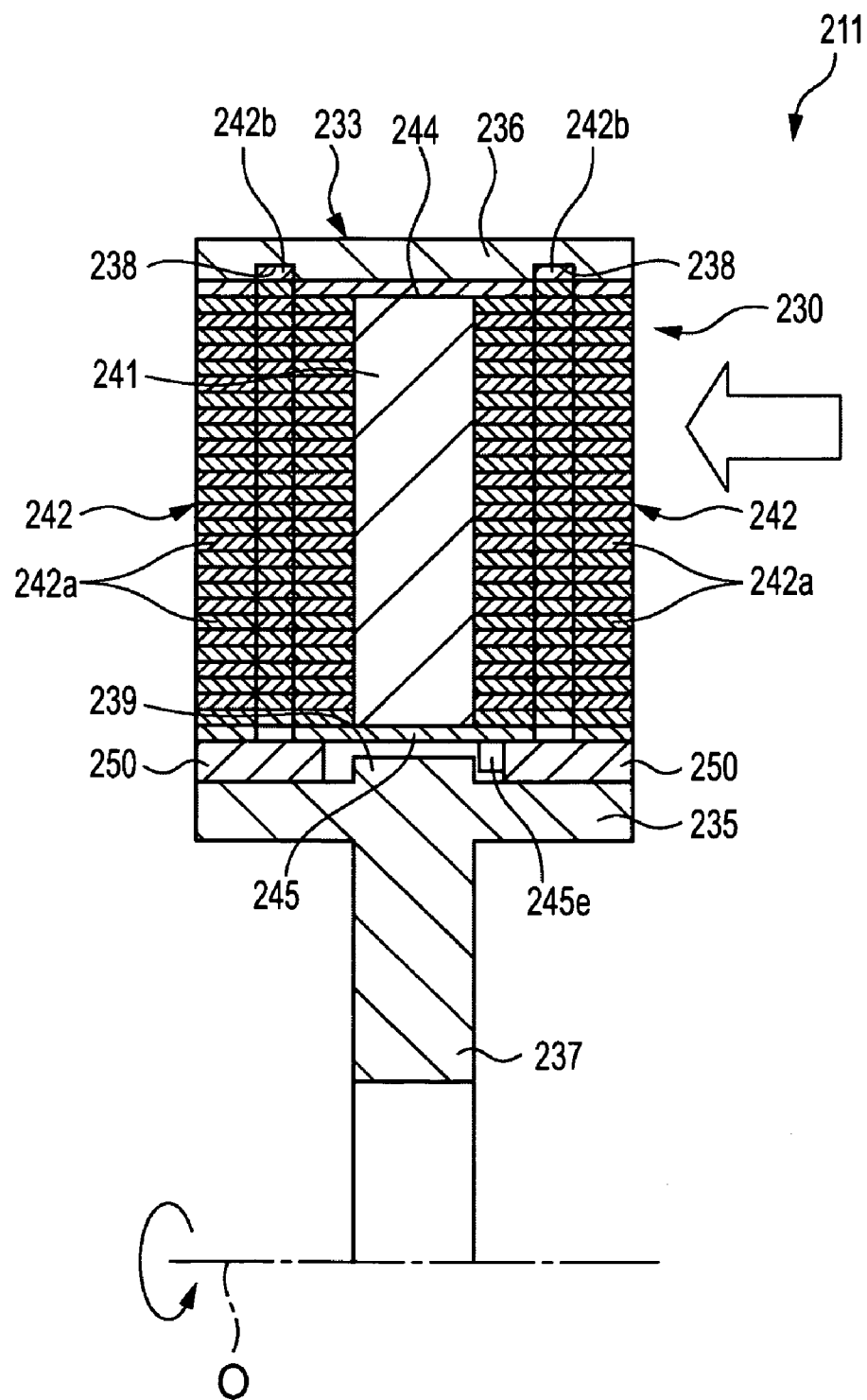
FIG. 24 is a vertical sectional view of a rotor of an axial gap motor according to a fifth embodiment of the invention.
Figure 25:
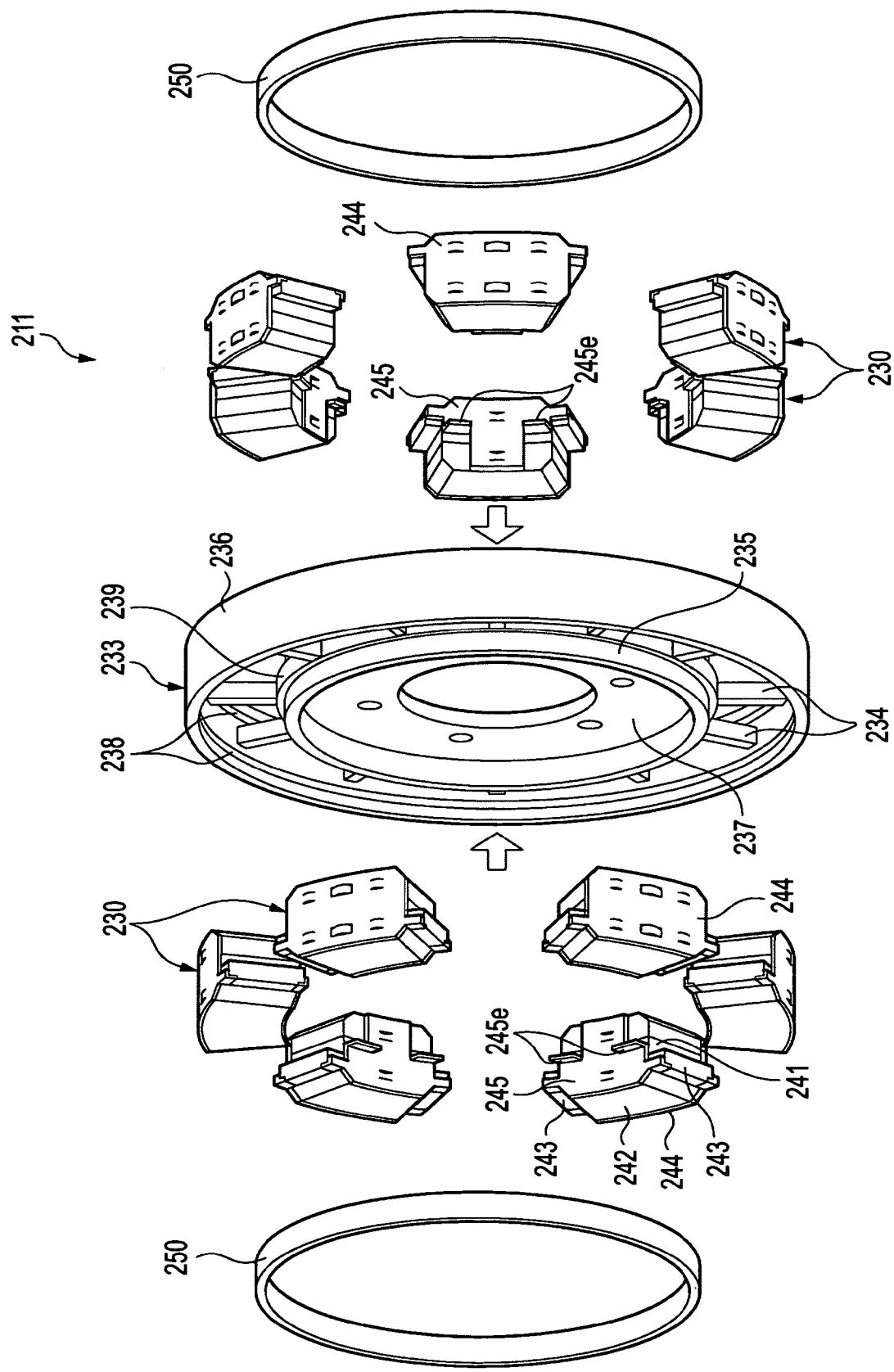
FIG. 25 is an exploded perspective view of the rotor of the axial gap motor according to the fifth embodiment of the invention.

As is shown in FIGS. 24 and 25, a rotor 211 includes a plurality of (12 in the embodiment shown in the figures) magnetic pole units 230 and a rotor frame 233 which is made of a non-magnetic material, and the magnetic pole units 230 are accommodated within the rotor frame 233.

As is shown in FIGS. 24 and 25, the rotor frame 233 is made of a non-magnetic material such as stainless steel or aluminum and includes a plurality of radial ribs 234, . . . 234 which are disposed at predetermined intervals in a circumferential direction and which extend in a radial direction, an inner circumferential side cylindrical portion 235 and an outer circumferential side cylindrical portion 236 which are connected together by the radial ribs 234, . . . , 234, and a connecting portion 237 which is formed into an annular plate-like shape which projects inwards from a position on an inner circumferential surface of the inner circumferential side cylindrical portion 235 and which is connected to an exterior drive shaft (for example, an input shaft of a transmission of a vehicle). In addition, in this embodiment, since the inner circumferential side cylindrical portion 235 is connected to the exterior drive shaft, the inner circumferential side cylindrical portion 135 configures a shaft portion, while the outer circumferential side cylindrical portion 236 configures a rim portion.

Annular grooves 238 are formed on an inner circumferential surface of the outer circumferential cylindrical portion 236 in such a manner as to lie on both axial sides of the radial ribs 234. In addition, arc-shaped projecting portions 239 are formed on an outer circumferential surface of the inner circumferential side cylindrical portion 235 in such a manner as to lie between the adjacent radial ribs 234, 234.

Figure 26:
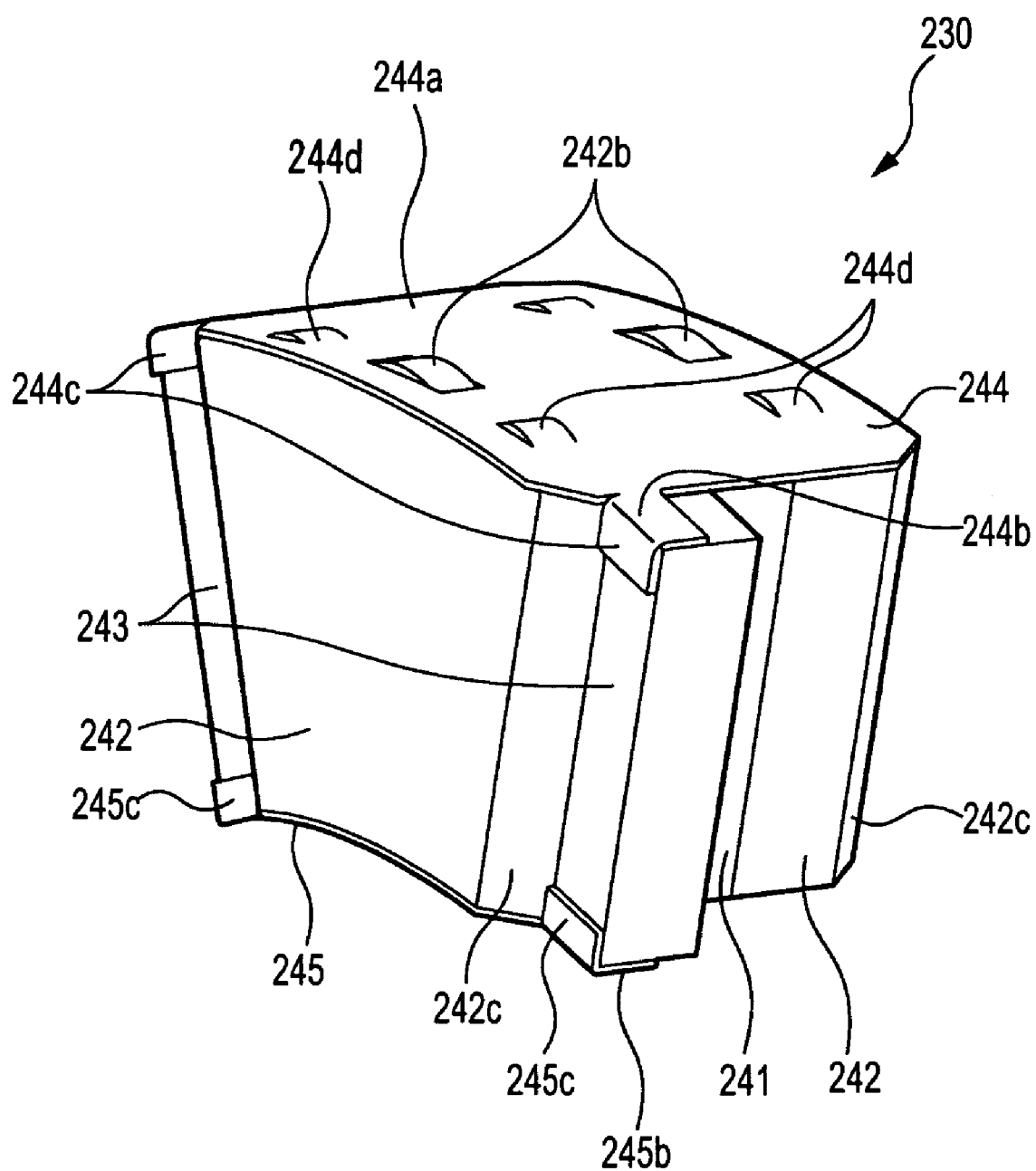
FIG. 26 is an enlarged perspective view of a magnetic pole unit shown in FIG. 25.
Figure 27:
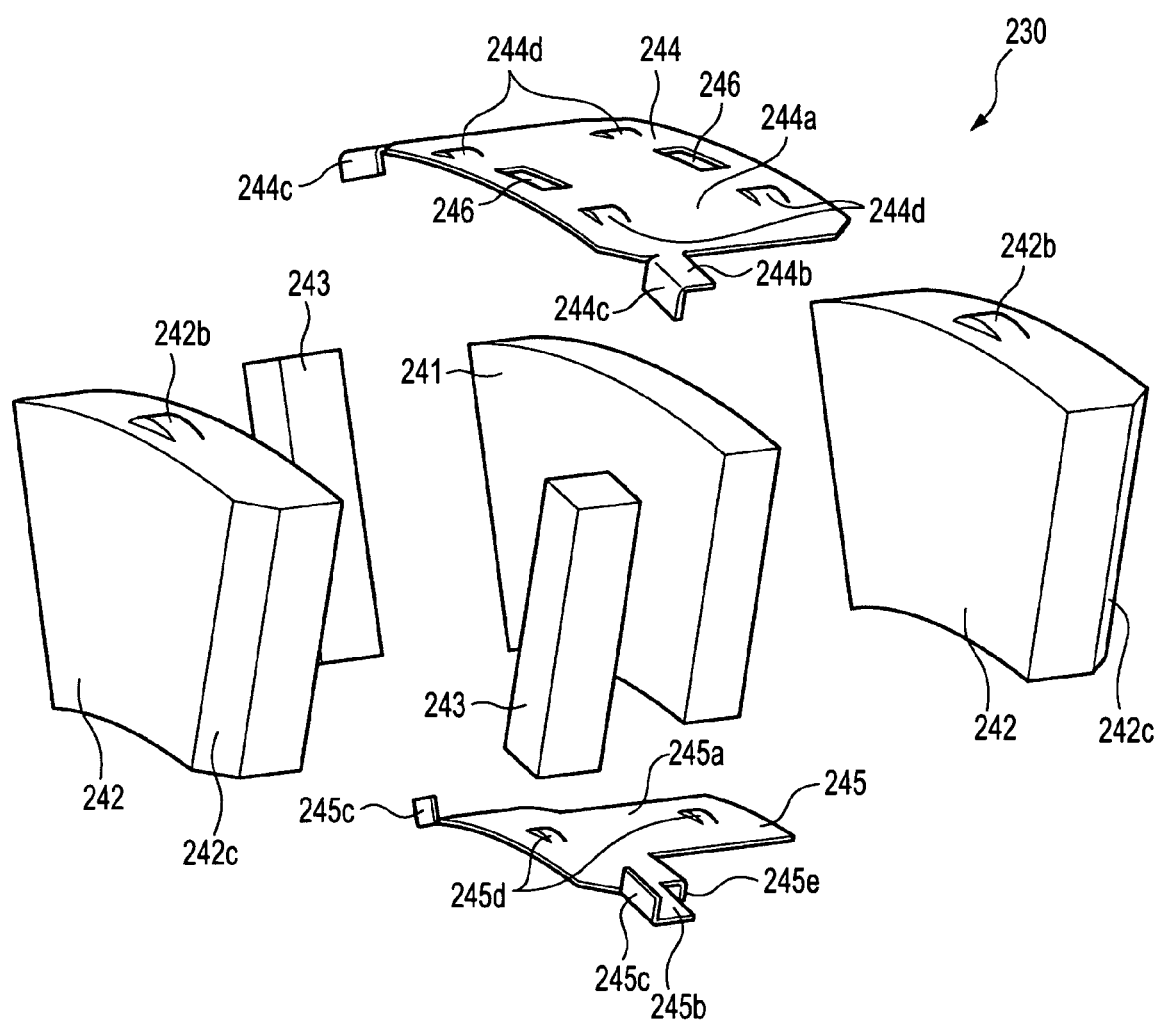
FIG. 27 is an exploded perspective view of the magnetic pole unit shown in FIG. 26.

Referring to FIGS. 26 and 27, as well, the magnetic pole unit 230 includes a substantially fan-shaped or segmental main magnet portion 241 which is magnetized in a thickness direction (that is, an axial direction), a pair of magnetic members 242 which hold the main magnet portion 241 from both sides in the thickness direction thereof, and two sub-magnet portions 243 which are disposed on both circumferential sides of the magnetic member 242 and are magnetized in a direction which is orthogonal to the axial direction and a radial direction (that is, a substantially circumferential direction), and the main magnet portion 241, the pair of magnetic members 242 and the two sub-magnet portions 243 are held from radial sides (outer circumferential sides and inner circumferential sides) thereof by an outer support plate 244 and an inner support plate 245 which configure a pair of support plates so as to be unitized for assemblage.

The magnetic member 242 has a configuration in which a plurality of electromagnetic steel sheets 242a are stacked together in the radial direction, and a substantially arc-shaped recess portion (not shown) and a substantially arc-shaped projecting portion 242b are formed, respectively, on an inner circumferential surface and an outer circumferential surface of each electromagnetic steel sheet 242a at a substantially central portion thereof. These recessed portions and projecting portions 242b are formed when the electromagnetic steel sheets 242a are clamped piece by piece by a press, and when the plurality of electromagnetic steel sheets 242a are stacked together, the projecting portions 242b on the outer circumferential surfaces of the electromagnetic steel sheets 242a are caused to fit in the recessed portions on the inner circumferential surfaces of the adjacent electromagnetic steel sheets 242a, whereby the magnetic members 242 are positioned properly relative to each other.

Axial outer radial corner portions of the magnetic member 242 are each chamfered so as to be formed into a chamfered portion 242c. This chamfered portion 242c is formed so that the magnetic member 242 continues to an axial lateral surface of the sub-magnet portion 243 without any difference in level existing therebetween, and this configuration has an advantage of reducing cogging torque and torque ripple. In addition, in addition to the configuration in which the magnetic member 242 is made up of the electromagnetic steel sheets 242a which are stacked together, the magnetic member 242 can be made up of a sintered member that is made by forming and calcining powder such as iron powder. In this case, too, a projecting portion 242b is formed on an outer circumferential surface, and a recessed portion is formed on an inner circumferential surface of the magnetic member 242.

The outer support plate 244 is formed of a non-magnetic material such as a stainless steel sheet and includes a substantially rectangular outer circumferential fastening portion 244a which is adapted to be brought into abutment with outer circumferential surfaces of the main magnet portion 241 and the pair of magnetic members 242, end face supporting surfaces 244b which are provided at an axial edge of the outer circumferential fastening portion 244a in such a manner as to extend from both circumferential sides of the outer circumferential fastening portion 244a, and lateral surface supporting surfaces 244c which are formed by being bent radially inwards from the end face supporting surfaces 244b. The end face supporting surfaces 244b support the outer circumferential surfaces of the sub-magnet portions 243, and the lateral surface supporting surfaces 244c support the axial lateral surfaces of the sub-magnet portions 243.

A pair of fitting holes 246, which are adapted to fit on projecting portions 242b of the magnetic members 242, are formed on the outer circumferential fastening portion 244a of the outer support plate 244 in positions which correspond to the projecting portions 242b. In addition, four projecting portions 244d, which are cut to rise radially outwards, are formed at both axial end portions of the outer circumferential fastening portion 244a, and when the magnetic pole unit 230 is assembled to the rotor frame 233, the projections 244d are caused to fit in the annular groove 238 formed on the outer circumferential side cylindrical portion 236 so that the magnetic pole unit 230 is positioned properly.

As with the outer support plate 244, the inner support plate 245 is formed of a non-magnetic material such as a stainless sheet and includes a substantially T-shaped inner circumferential fastening portion 245a which is adapted to be brought into abutment with inner circumferential surfaces of the main magnet portion 241 and the pair of magnetic members 242, end face supporting surfaces 245b which are provided at an axial edge of the inner circumferential fastening portion 245a in such a manner as to extend from both circumferential sides of the inner circumferential fastening portion 245a, and lateral surface supporting surfaces 245c which are formed by being bent radially outwards from the end face supporting surfaces 245b. A pair of fitting projecting portions 245d, which are adapted to fit in recessed portions which are formed on inner circumferential surfaces of the magnetic members 242, are formed on the inner circumferential fastening portion 245a in positions which correspond to the recessed portions so formed. In addition, positioning portions 245e, which are formed by being bent radially inwards, are provided at a root portion of the inner fastening portion 245a which is formed into the substantially T-shape.

The main magnet portion 241, the pair of magnetic members 242 and the two sub-magnet portions 243 are held together from both the radial sides thereof by the outer support plate 244 and the inner support plate 245 and is unitized into the magnetic pole unit 230. Namely, in the outer support plate 244, the projecting portions 242b on the pair of magnetic members 242, which hold therebetween the main magnet portion 241 from both the sides thereof, are caused to fit in the fitting holes 246 therein, and the end faces and the lateral surfaces of the two sub-magnet portions 243 are brought into abutment with the end face supporting surfaces 244b and the lateral surface supporting surfaces 244c thereof, and further, in this state, the inner support plate 245 is brought into abutment with the inner circumferential surfaces sides of the main magnet portion 241, the pair of magnetic members 242 and the two sub-magnet portions 243, so as to hold these constituent members therebetween. As this occurs, the pair of fitting projecting portions 245d on the inner support plate 245 are caused to fit individually in the recessed portions of the pair of magnetic members 242 so as to position the pair of magnetic members 242 properly.

In addition, in this embodiment, although the main magnet portion 241, the pair of magnetic members 242 and the two sub-magnet portions 243 are fixed together by the outer support plate 244 and the inner support plate 245 and by way of bonding, for example, the outer support plate 244 may be fixed together with the pair of magnetic members 242 at the same time as the pair of magnetic members 242 are clamped.

As is shown in FIGS. 24 and 25, the plurality of magnetic pole units 230 each built up in the way described above are assembled into the rotor frame 233 in such a manner that the magnetic pole units 230 which lie adjacent to each other in the circumferential direction are inserted into the rotor frame 233 from directions which are different from each other with respect to the axial direction. As this occurs, the main magnet portions 241, 241 which lie adjacent to each other in the circumferential direction are set in such a manner that their magnetized directions are different from each other.

Specifically, the magnetic pole unit 230 is inserted sideways into a space defined by the outer circumferential side cylindrical portion 236, the inner circumferential side cylindrical portion 235 and the radial ribs 234, 234, and the projecting portions 244d of the outer support plate 244 and the projecting portions 242b of the magnetic members 242 are brought into engagement with the annular grooves 238 on the outer circumferential side cylindrical portion 236 so that the outer support plate 244 is brought into abutment with the inner circumferential surface of the outer circumferential side cylindrical portion 236.

By this, the main magnet portion 241 is held from both the radial sides thereof by the inner radial side cylindrical portion 235 and the outer circumferential side cylindrical portion 236 therebetween and is held from both the circumferential sides thereof by the two radial ribs 234 therebetween. In addition, the two sub-magnet portions 243 are held from both the radial sides thereof by the inner circumferential side cylindrical portion 235 and the outer circumferential side cylindrical portion 236 therebetween and are positioned on one of axial sides of the radial ribs 234.

Following this, a ring 250 is press fitted between the inner support plates 245 and the inner circumferential side cylindrical portion 235, and the positioning portions 245e of the inner support plates 245 are held by the arc-shaped projecting portions 239 and the ring 250. By this, the magnetic pole unit 230 is prevented from being dislocated from the rotor frame 233 against an axial force exerted on the magnetic pole unit 230. In addition, although magnetic attracting forces are exerted on the magnetic pole unit 230 from a pair of stators 212, 212 which are disposed on both sides thereof, in the event that the magnetic pole unit 230 is located in an intermediate position between the pair of stators 212, 212, the attracting forces exerted thereon from both the sides thereof are in a balanced state. Consequently, the rotor frame 233 has a sufficient strength against centrifugal force generated when the rotor 211 rotates, so as to be located in the intermediate position between the pair of stators 212, 212.

Thus, as has been described heretofore, according to the axial gap motor 210 according to the embodiment, since the magnetic pole unit 230 is such that the main magnet portion 241, the pair of magnetic members 242 which are disposed on both the lateral surfaces of the main magnet portion 241 and the two sub-magnet portions 243 which are each disposed between the magnetic members 242 which lie adjacent to each other in the circumferential direction are held by the support plates 244, 245 in such a manner as to be unitized, the Halbach-type axial gap motor 210 which is made up of a number of constituent components can easily be built up in a small number of steps. In addition, by the reduction in assembling steps, the production cost of the rotor 211 can be suppressed so as to provide the axial gap motor 210 inexpensively. By this, for example, in the case of the Halbach-type axial gap motor 210 with six pairs of poles, 12 main magnet portions 241, 24 sub-magnet portions 243, and 24 magnetic members 242, which are all constituent components of the rotor 241, are formed into a unit, whereby the rotor 211 can be built up by assembling 12 magnetic pole units 230.

Figure 28:
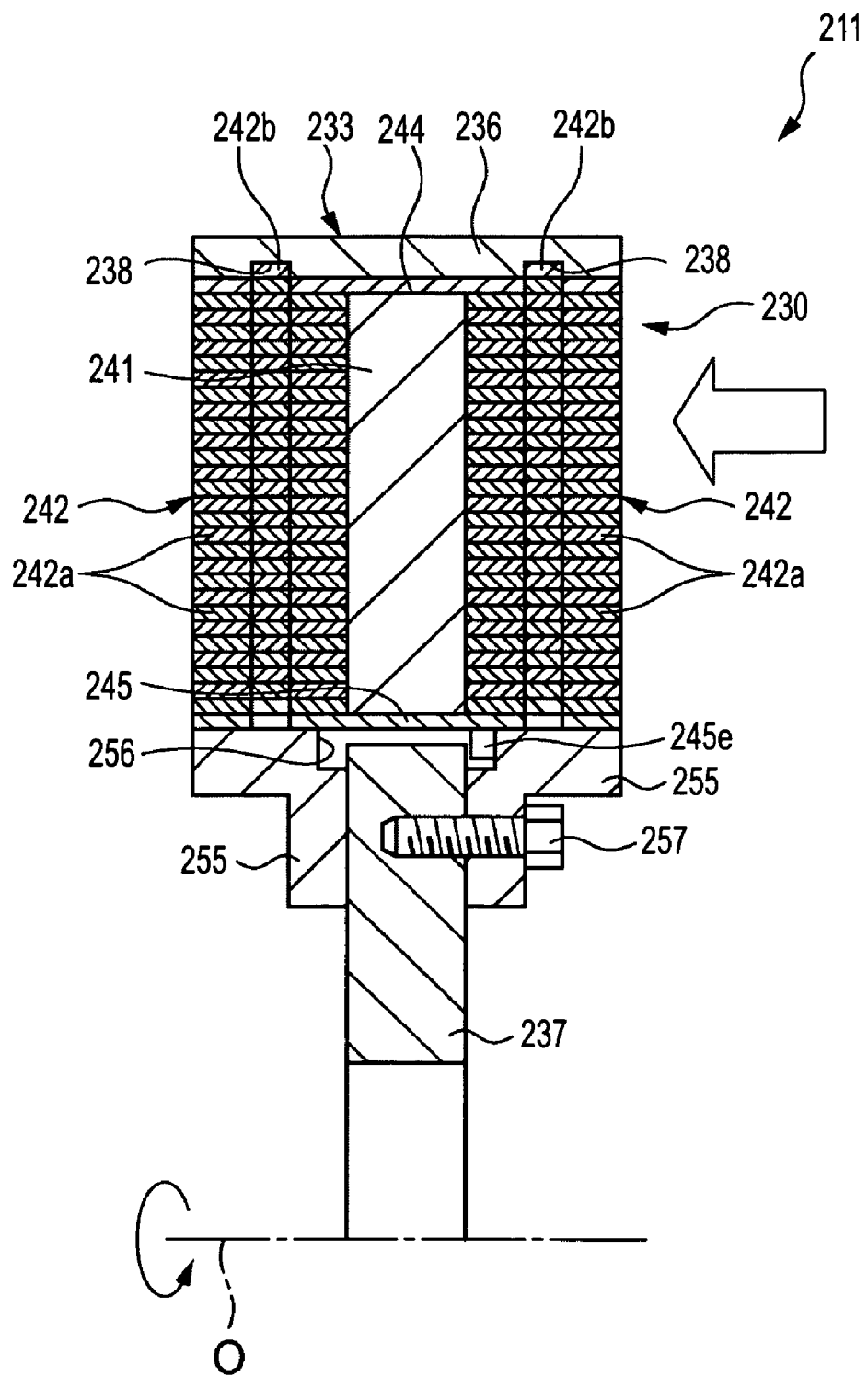
FIG. 28 is a vertical sectional view of a rotor of a first modified example off the fifth embodiment.

In addition, as a first modified example to the fifth embodiment, as is shown in FIG. 28, the rotor 211 may be configured in such a manner that the inner circumferential side cylindrical portion (the shaft portion) of the rotor frame 233 is made into separate members and that the separate members are bolted so that the magnetic pole units are fixed thereto. Namely, there is provided a rotor 211 which includes a pair of ring members 255 which each have an L-shaped section and which are provided separately from a connecting portion 237. A fastening recessed portion 256 for accommodating a positioning portion 245e is formed into a ring-like shape along an outer circumferential corner portion of each of the ring members 255.

Consequently, in this rotor 211, as with the fifth embodiment, a magnetic pole unit 230 is inserted into a rotor frame 233 with magnetic projecting portions 244d of an outer support plate 244 and projecting portions 242b of magnetic members 242 being brought into engagement with annular grooves 238 formed on an outer circumferential side cylindrical portion 236. Then, the ring members 255 are brought into abutment with inner circumferential surfaces of inner support plates 245, and the ring members 255 are fixed to the connecting portion 237 with bolts 257. By this, the positioning portions 245e of the inner support plates 245 are held by the connecting portion 237 and the ring members 255, whereby the magnetic pole units 230 are fixed to the rotor frame 233.

Figure 29A:
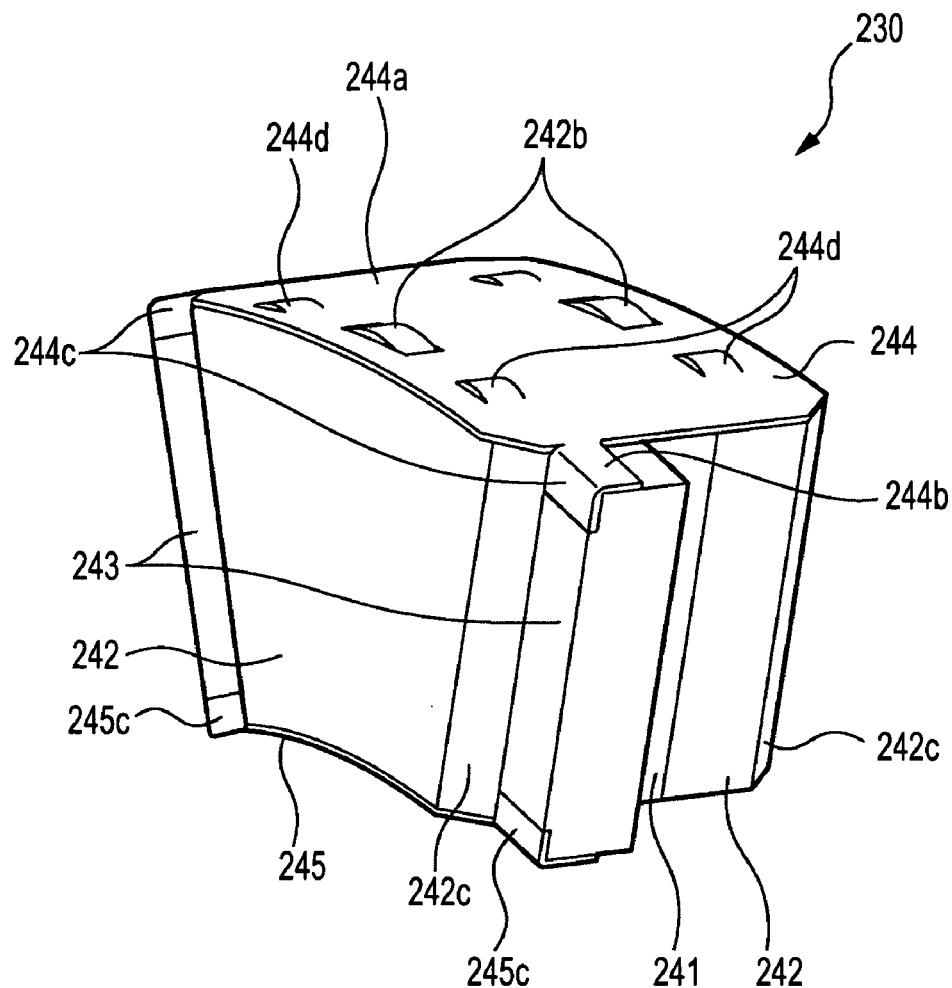
FIGS. 29A to 29B are exploded perspective views of a magnetic pole unit of a second modified example of the fifth embodiment.
Figure 29B:
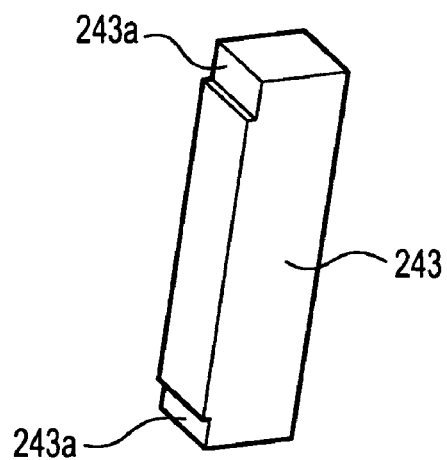

In addition, as a second modified example to the fifth embodiment, as is shown in FIGS. 29A, 29B, in a sub-magnet portion 243, recessed portions 243a whose depth is substantially the same as the thickness of support plates 244, 245 may be formed at both axial outer ends thereof. By this, since the sub-magnet portion 243 is held by lateral surface supporting surfaces 244c, 245c, an axial lateral surface of the sub-magnet portion 243 and axial lateral surfaces of the lateral surface supporting surfaces 244c, 245c become level with each other, whereby there is no such situation that the lateral surface supporting surfaces 244c, 245c projects from the sub-magnet portion 243. By this, a gap between the rotor 211 and a stator 212 is reduced so as to generate a high torque.

Sixth Embodiment

Next, referring to FIGS. 30 to 32, an axial gap motor according to a sixth embodiment of the invention will be described. Note that the axial gap motor of the sixth embodiment differs from the axial gap motor of the fifth embodiment in the construction of a positioning portion of an inner support plate. Because of this, like reference numerals or corresponding reference numerals will be given to like or corresponding portions to those of the fifth embodiment, and the description thereof will be simplified or omitted here.

Figure 30:
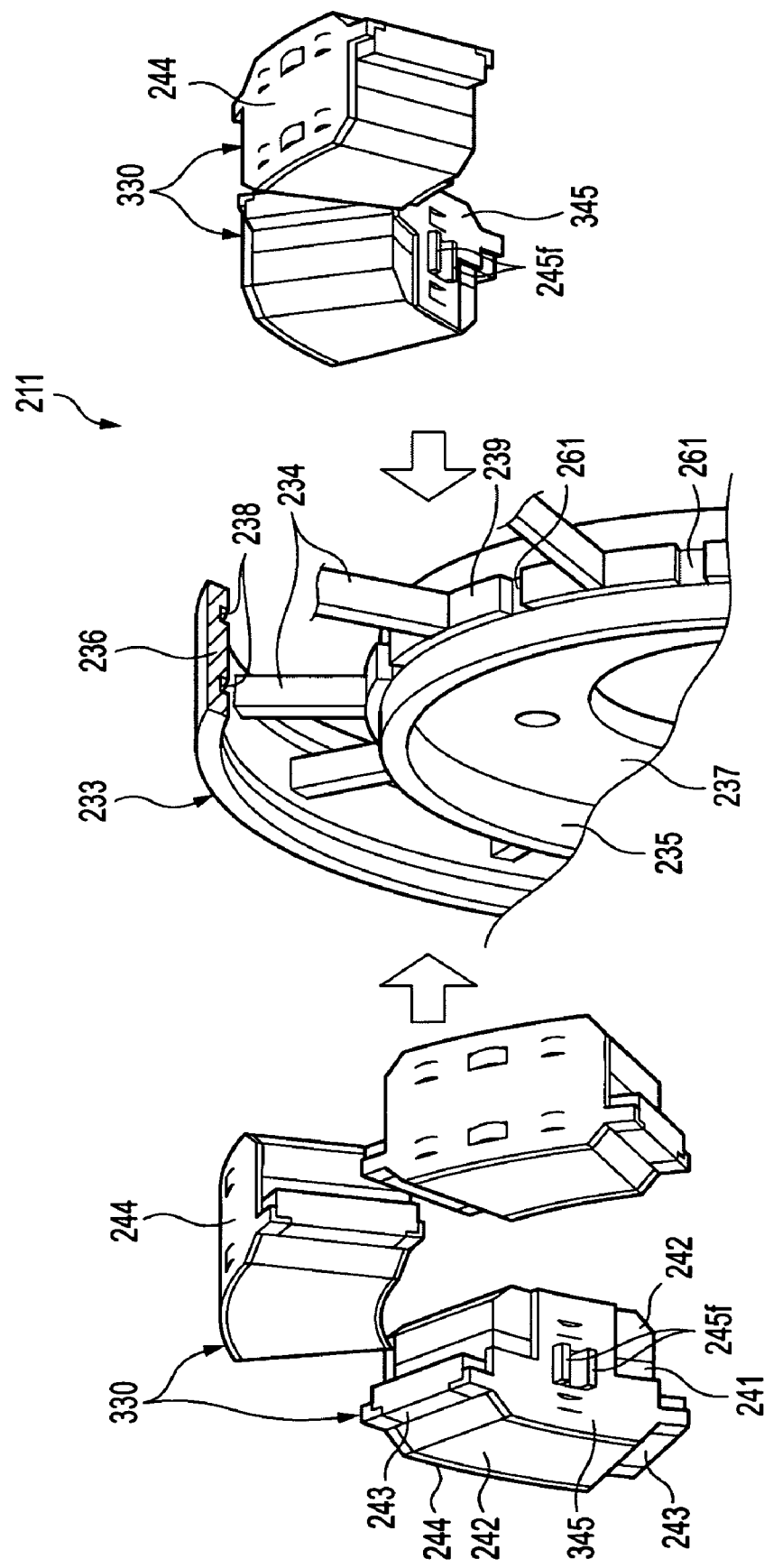
FIG. 30 is a partially cutaway exploded perspective view which illustrates an axial gap motor according to a sixth embodiment of the invention.
Figure 31:
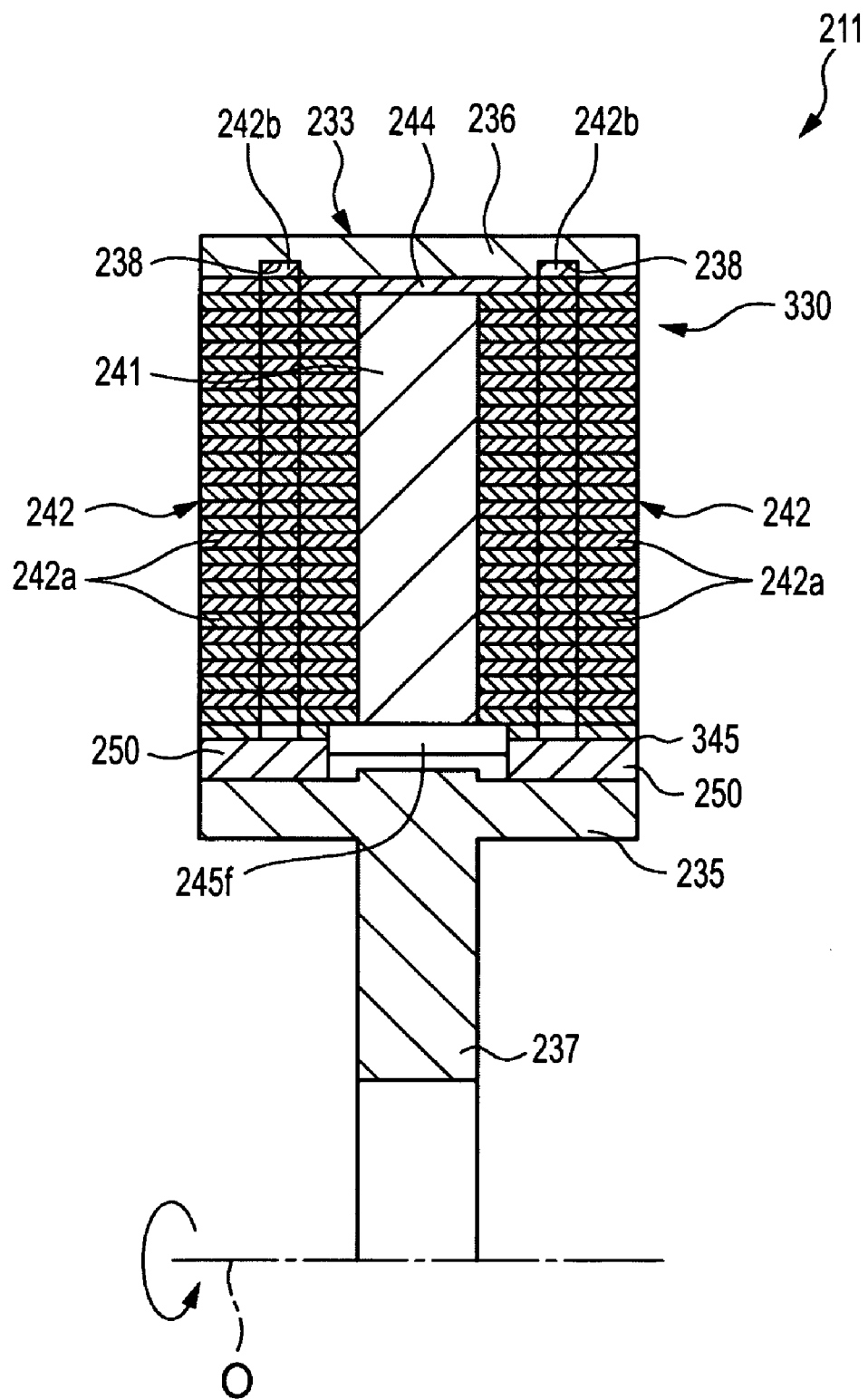
FIG. 31 is a vertical sectional view of a rotor shown in FIG. 30.
Figure 32:
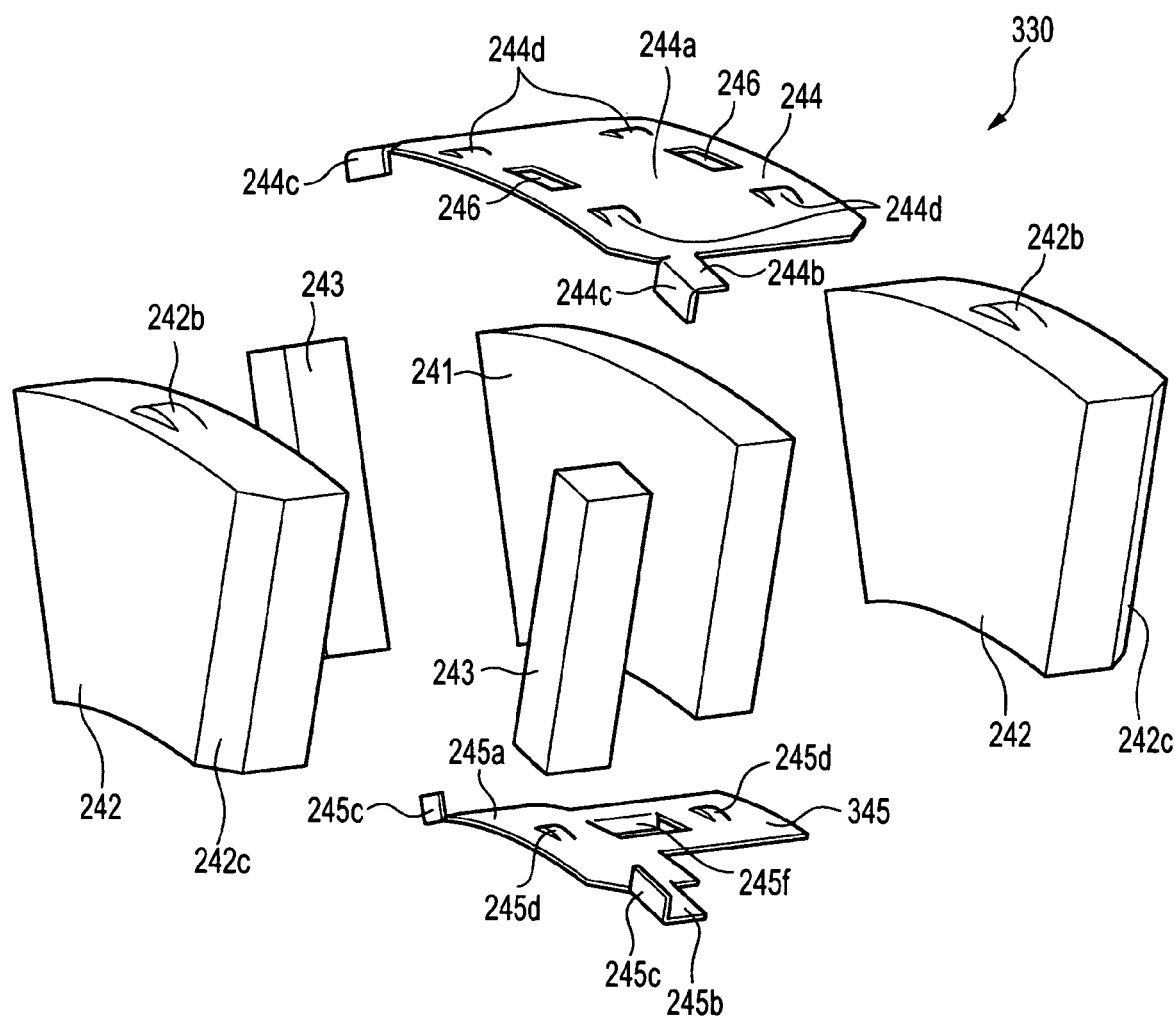
FIG. 32 is an exploded perspective view of a magnetic pole unit shown in FIG. 30.

As is shown in FIGS. 30 to 32, a rotor 211 of the axial gap motor of the sixth embodiment includes a plurality of (12 in the embodiment illustrated in the figures) magnetic pole units 330 and a rotor frame 233 which is made of a non-magnetic material, and the magnetic pole units 330 are accommodated within the rotor frame 233. The magnetic pole unit 330 is made up of a main magnet portion 241, a pair of magnetic members 242 and two sub-magnet portions 243 which are held together by an outer support plate 244 and an inner support plate 345.

On an arc-shaped projecting portion 239 which is provided on an inner circumferential side cylindrical portion 235 of the rotor frame 233, an axial groove 261 is formed in such a manner as to penetrate therethrough in an axial direction at a substantially intermediate portion between radial ribs 234, 234 which lie adjacent to each other. In addition, on the inner support plate 345, a pair of rib-like positioning portions 245f, which are cut to rise radially inwards, are provided in a position on an inner circumferential fastening portion 245a which corresponds to the main magnet portion 241, that is, in such a manner as to correspond to the axial groove 261 of the arc-shaped projecting portion 239. These positioning portions 245f extend along an axial direction while being arranged in such a manner that their thickness direction is oriented in a circumferential direction.

As is shown in FIG. 31, the magnetic pole unit 330 which has the inner support plate 345 configured in the way described above is inserted between an outer circumferential side cylindrical portion 236 and the inner circumferential side cylindrical portion 235 of the rotor frame 233 in such a state that the positioning portions 245f are fitted in the axial groove 261, and by press fitting a pair of rings 250 between the inner support plates 345 and the inner circumferential side cylindrical portion 235 from both axial sides of the rotor frame 233, the positioning portions 245f of the inner support plates 345 are held by the pair of rings 250 therebetween. By this, the magnetic pole units 330 are fixed to the rotor frame 233.

In addition, the other configurations and functions the axial gap motor of this embodiment are similar to those of the axial gap motor of the fifth embodiment.

Seventh Embodiment

Next, a seventh embodiment of an axial gap motor of the invention will be described based on FIGS. 33 and 34. While in the axial gap motors of the fifth and sixth embodiments, the Halbach-type motor including the sub-magnet portions is described, in the axial gap motor of the seventh embodiment, there is provided no sub-magnet portion, and a magnetic pole unit is made up of a main magnet portion, a pair of magnetic members which are disposed on both lateral surfaces of the main magnet portion, and inner and outer support plates. Note that since the other portions are similar to those of the axial gap motor of the fifth embodiment of the invention, like reference numerals or corresponding reference numerals will be given to like or corresponding portions to those of the fifth embodiment, and the description thereof will be simplified or omitted here.

Figure 33:
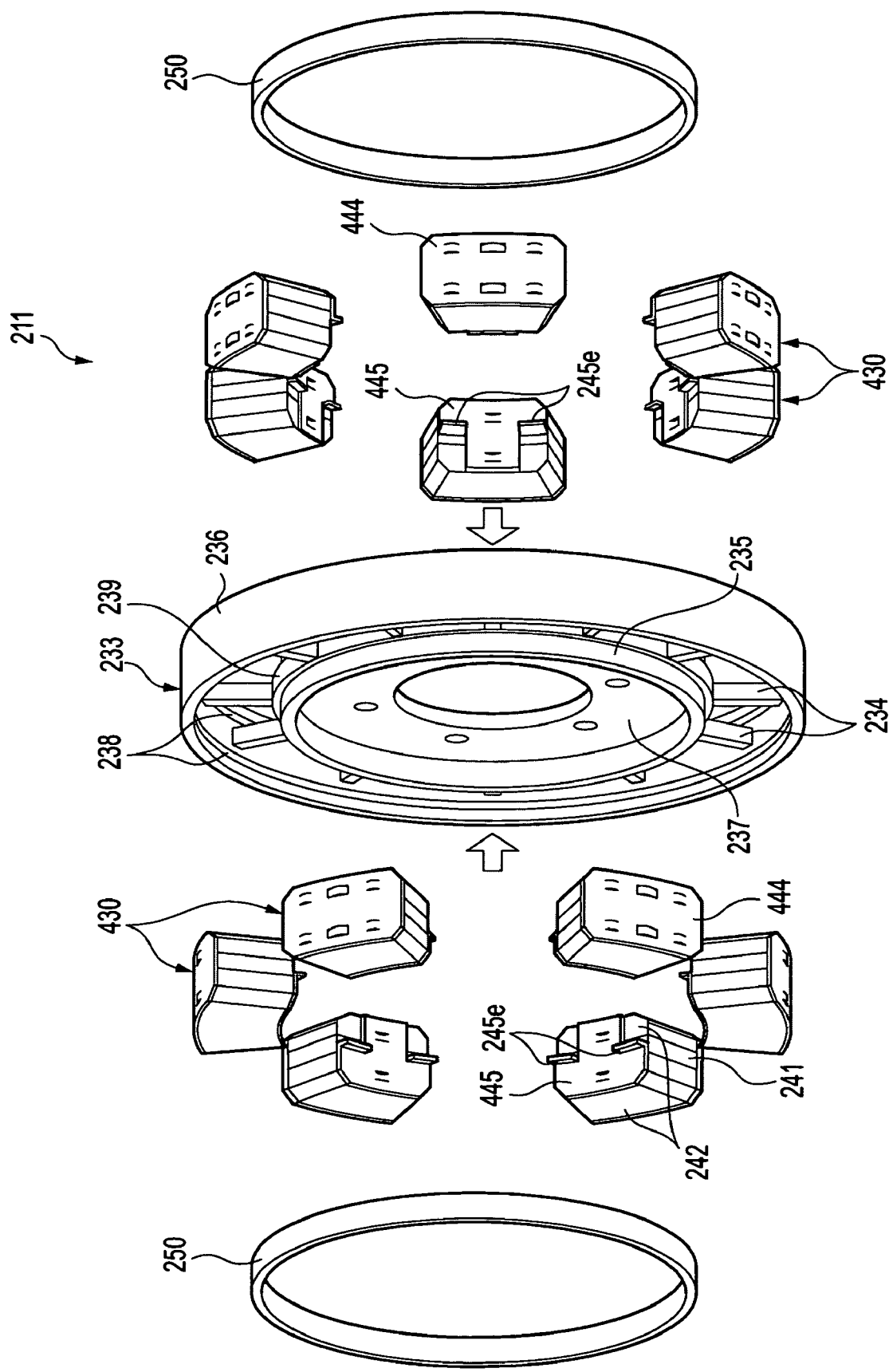
FIG. 33 is an exploded perspective view which illustrates an axial gap motor according to a seventh embodiment of the invention.
Figure 34:
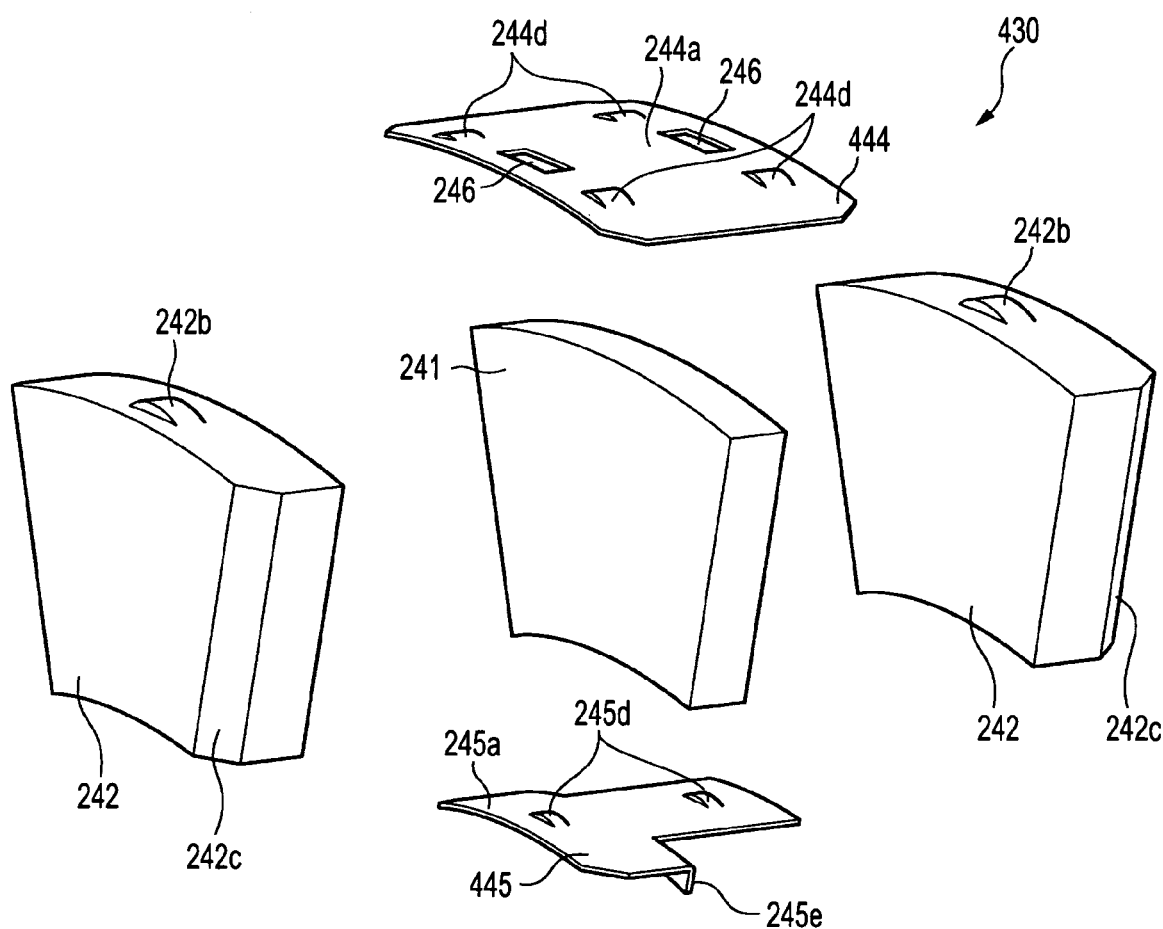
FIG. 34 is an exploded perspective view of a magnetic pole unit shown in FIG. 33.

As is shown in FIGS. 33 and 34, a magnetic pole unit 430 of this embodiment includes a substantially fan-shaped or segmental main magnet portion 241 which is magnetized in an axial direction and a pair of magnetic members 242 which hold the main magnet portion 241 from both sides in a thickness direction thereof. The main magnet portion 241 and the pair of magnetic members 242 are held from radial sides (an outer circumferential side and an inner circumferential side) thereof by an outer support plate 444 and an inner support plate 445 in such a manner as to be assembled into a unit.

Compared with the outer support plate 244 and the inner support plate 245 of the fifth embodiment which are shown in FIG. 27, the outer support plate 444 and the inner support plate 454 are formed into configurations in which neither end face supporting surfaces 244b, 245b nor lateral surface supporting surfaces 244c, 245c are provided.

Namely, the outer support plate 444 is formed of a non-magnetic material such as a stainless steel sheet and includes a substantially rectangular outer fastening portion 244a which is brought into abutment with outer circumferential surfaces of the main magnet portion 241 and the pair of magnetic members 242. On this outer circumferential fastening portion 244a, a pair of fitting holes 246 which fit on projecting portions 24b of the magnetic members 242 and four projecting portions 244d which are cut to rise radially outwards so as to fit in annular grooves 238 on a rotor frame 233 are formed at axial edge portions.

In addition, the inner support plate 445 is formed of a non-magnetic material such as a stainless steel sheet and includes a substantially T-shaped inner circumferential fastening portion 245a which is brought into abutment with inner circumferential surfaces of the main magnet portion 241 and the pair of magnetic members 242. On this inner circumferential fastening portion 245a, a pair of fitting projecting portions 245d are formed in such a manner as to fit in corresponding recessed portions which are formed on the inner circumferential surface of the magnetic members 242. In addition, positioning portions 245e which are formed by being bent radially inwards are provided at a root portion of the inner circumferential fastening portion 245a which is formed into the substantially T-shape.

As is shown in FIG. 33, the magnetic pole units 430 which are configured in the way described above are inserted into the rotor frame 233 in such a manner that the magnetic pole units 230 which lie adjacent to each other in the circumferential direction are inserted from directions which are different from each other with respect to the axial direction, and rings 250 are press fitted between the inner support plates 445 and the inner circumferential side cylindrical portion 235 from the axial direction. By this, the positioning portions 245e of the inner support plates 445 are held by arc-shaped projecting portions 239 and the rings 50, whereby the magnetic pole units 430 are fixed in place in the rotor frame 233.

The other configurations and functions of the axial gap motor of this embodiment are similar to those of the axial gap motor 210 of the fifth embodiment.

Eighth Embodiment

Next, referring to FIGS. 35 and 36, an axial gap motor according to an eighth embodiment of the invention will be described. Note that the axial gap motor of the eighth embodiment is similar to the axial gap motor of the seventh embodiment except that a positioning construction of an inner support plate of a magnetic pole unit is similar to that of the magnetic pole unit of the sixth embodiment. Because of this, like reference numerals or corresponding reference numerals will be given to like or corresponding portions to those of the seventh embodiment, and the description thereof will be simplified or omitted here.

Figure 35:
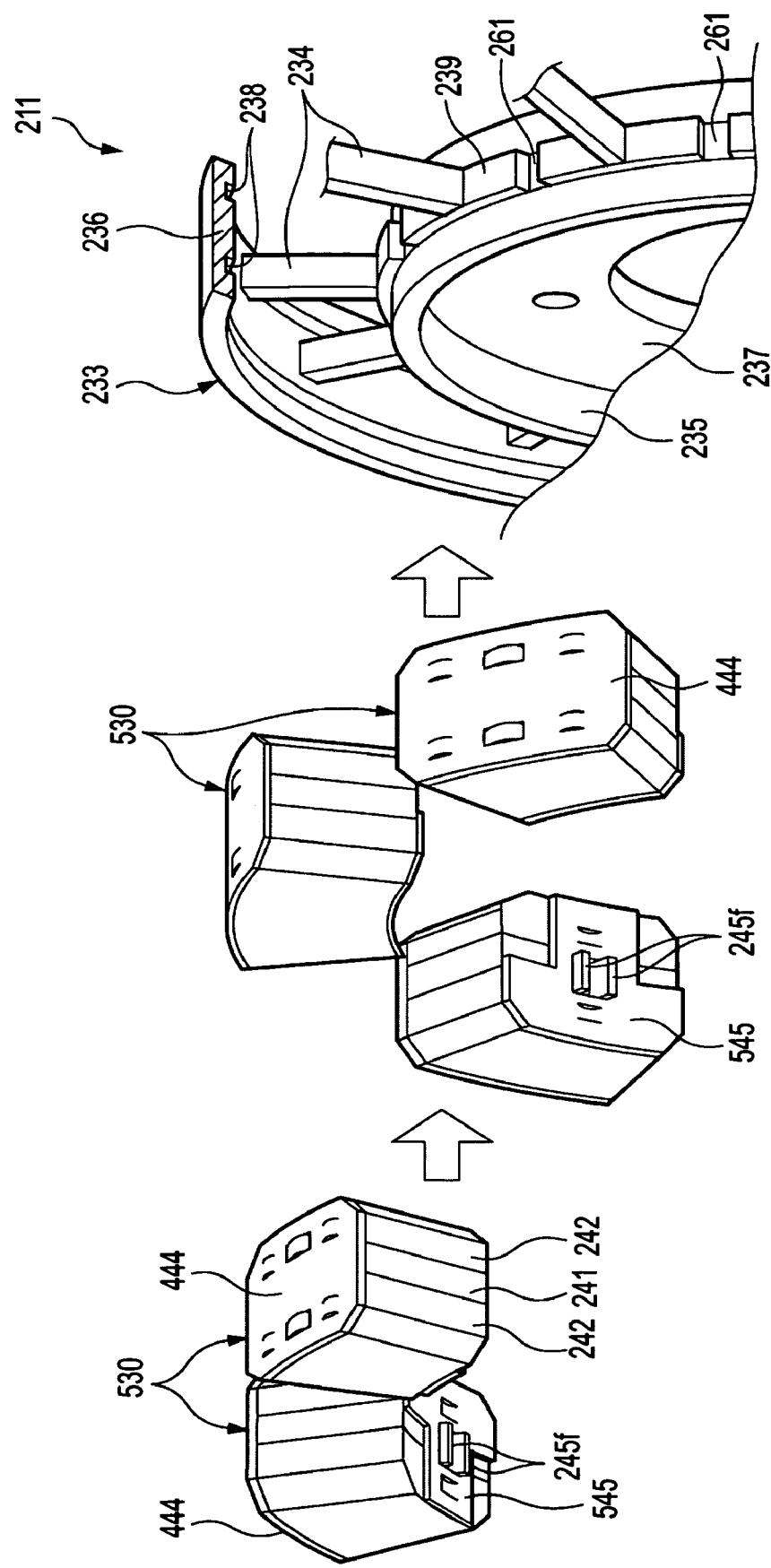
FIG. 35 is a partially cutaway exploded perspective view which illustrates an axial gap motor according to an eighth embodiment of the invention.
Figure 36:
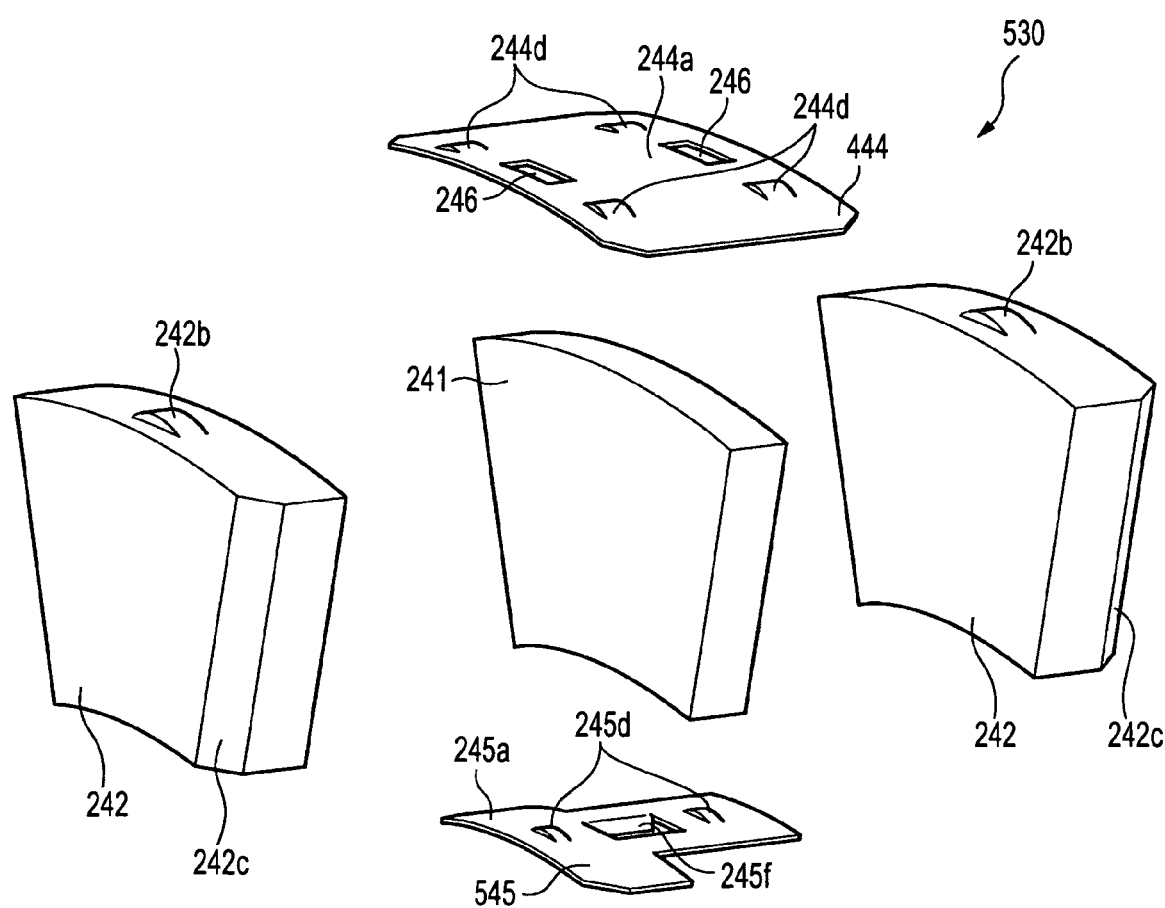
FIG. 36 is an exploded perspective view of a magnetic pole unit shown in FIG. 35.

As is shown in FIGS. 35 and 36, as with the seventh embodiment, a magnetic pole unit 530 of this embodiment is made up by holding a main magnet portion 241 and a pair of magnetic members 242 from both radial sides (an outer circumferential side and an inner circumferential side) thereof by an outer support plate 444 and an inner support plate 545.

On an arc-shaped projecting portion 239 which is provided on an inner circumferential side cylindrical portion 235 of the rotor frame 233, an axial groove 261 is formed in such a manner as to penetrate therethrough in an axial direction at a substantially intermediate portion between radial ribs 234, 234 which lie adjacent to each other. In addition, on the inner support plate 545 which hold the main magnet portion 241 and the pair of magnetic members 242 from both the radial sides thereof together with the outer support plate 444, a pair of positioning portions 245f, which are cut to rise radially inwards and are arranged in such a manner that their thickness direction is oriented in the circumferential direction, are provided in a position which corresponds to the axial groove 261 of the arc-shaped projecting portion 239.

The magnetic pole unit 530 is inserted between the outer circumferential side cylindrical portion 236 and the inner circumferential side cylindrical portion 235 of the rotor frame 233 with the positioning portions 245f fitted in the axial groove 261, and pair of rings 250 are press fitted from both axial sides of the rotor frame 233, whereby the positioning portions 245f are held by the pair of rings 250 therebetween, whereby the magnetic pole units 530 are fixed in place with the rotor frame 233.

Since the magnetic pole unit 530 of this embodiment has a laterally symmetrical shape with respect to the axial direction, being from the rotors 211 in the fifth to seventh embodiments, the necessity is obviated of inserting the magnetic pole units 530 which lie adjacent to each other in the circumferential direction into the rotor frame 233 from directions different from each other in the axial direction, and hence, the magnetic pole units 530 can be inserted from one of the axial directions of the rotator frame 233. In addition, although the inner support plate 545 is formed into the substantially T-shape as with the embodiments described above, the inner support plate 545 may be formed into a laterally symmetrical shape with respect to the axial direction in such a manner as to follow the configurations of lower surfaces of the main magnet portion 241 and the pair of magnetic members 242.

In addition, the other configurations and functions of the axial gap motor of this embodiment are similar to those of the axial gap motor of the seventh embodiment, and therefore, the description thereof will be omitted here.

The invention is not limited to the respective embodiments that have been described heretofore but can be modified or improved as required.

In addition, in this invention, although the fitting portions which are adapted to fit in the shaft portion or the rim portion of the rotor frame may be provided on either the outer support plates or the inner support plates, since when the rotor rotates, a centrifugal force is exerted radially outwards on the magnetic pole units, in order to support the magnetic pole units stably, the outer support plates are preferably made to be fitted in the rim portion of the rotor frame.

In addition, in the invention, although the rings may be interposed between the other of the shaft portion and the rim portion into which the fitting portions are fitted and the support plates, similarly, due to the centrifugal force exerted on the magnetic pole units, the rings are preferably inserted between the shaft portion and the inner support plates, so as to bring the magnetic pole units into abutment with the rim portion so as to fix the magnetic pole units to the rotor frame.

What is claimed is:

1. An axial gap motor comprising:
a rotor which rotates around a rotational axis; and
a stator which is disposed on at least one side in a rotational axis direction of the rotor in such a manner as to confront the rotor,
wherein the rotor comprises a rotor frame, a plurality of main magnet portions which are magnetized in the rotational axis direction and are disposed in a circumferential direction and a plurality of magnetic members which are disposed individually on surfaces of the main magnet portions which face the at least one side in the rotational axis direction of the main magnet portions,
wherein the magnetic members have fitting portions extending away from at least one of an outer circumferential surface and an inner circumferential surface of the magnetic members in a radial direction of the rotor and are configured to fittingly engage the rotor frame, and
wherein the rotor frame comprises a plurality of ribs which are disposed at predetermined intervals in the circumferential direction and which extend in the radial direction, a shaft portion which is provided at inside diameter sides of the plurality of ribs, and a rim portion which is provided at outside diameter sides of the plurality of ribs, wherein the plurality of main magnet portions are disposed individually between the ribs which lie adjacent to each other in the circumferential direction, wherein the magnetic members are disposed on both sides in the rotational axis direction of the main magnet portions, wherein the rotor further comprises support plates which each hold the main magnet portion and the pair of magnetic members from a radial side thereof, wherein a plurality of magnetic pole units each unitizing the main magnet portion and the pair of magnetic members are configured by the support plates, and wherein the fitting portions of the magnetic members fit in the support plates which are supported by the rotor frame.

2. An axial gap motor as set forth in claim 1, wherein the rotor further comprises a plurality of sub-magnet portions which are magnetized in a direction which is orthogonal to the rotational axis direction and the radial direction and are disposed individually between the magnetic members which lie adjacent to each other in the circumferential direction on both sides in the rotational axis direction of the ribs, wherein the support plate further supports the two sub-magnet portions in such a manner as to hold the magnetic member which is disposed on the one side in the rotational axis direction of the main magnet portion by the two sub-magnet portions therebetween in the circumferential direction, and wherein the main magnet portion, the pair of magnetic members and the two sub-magnet portions configure the magnetic pole unit by the support plate.

3. An axial gap motor as set forth in claim 1, wherein the support plate comprises a pair of support plates for holding the main magnet portion and the pair of magnetic members from both radial sides thereof, and wherein one of the support plates has a fitting portion which fits in one of the shaft portion and the rim portion.

4. An axial gap motor as set forth in claim 3, wherein the one of support plates has further another fitting portion which fits on the magnetic member.

5. An axial gap motor as set froth in claim 3, further comprising: a ring which is interposed between the other of the shaft portion and the rim portion and the other of support plates.

6. An axial gap motor as set forth in claim 5, wherein the other of the shaft portion and the rim portion has arc-shaped projecting portions which are formed between the ribs on the other of the shaft portion and the rim portion, and wherein the other of support plates has a positioning portion which is bent in the radial direction so as to be held by the arc-shaped projecting portion and the ring therebetween.

7. An axial gap motor as set forth in claim 3, wherein the pair of support plates have end face supporting surfaces for supporting radial end faces of the sub-magnet portions and lateral surface supporting surfaces for supporting lateral surfaces of the sub-magnet portions which are different from the radial end faces.

8. An axial gap motor as set forth in claim 7, wherein the sub-magnet portion has recessed portions whose depth is substantially equal to the thickness of the support plate and which are formed on the lateral surface of the sub-magnet portion in positions where the sub-magnet portion is supported by the pair of support plates.

9. An axial gap motor as set forth in claim 1, wherein the magnetic pole units which lie adjacent to each other in the circumferential direction are inserted into the rotor frame from directions which are different from each other in the rotational axis direction.

10. An axial gap motor comprising:
a rotor which rotates around a rotational axis; and
a stator which is disposed on at least one side in a rotational axis direction of the rotor in such a manner as to confront the rotor,
wherein the rotor comprises a rotor frame, a plurality of main magnet portions which are magnetized in the rotational axis direction and are disposed in a circumferential direction and a plurality of magnetic members which are disposed individually on surfaces of the main magnet portions which face the at least one side in the rotational axis direction of the main magnet portions,
wherein the magnetic members have fitting portions extending away from at least one of an outer circumferential surface and an inner circumferential surface of the magnetic members in a radial direction of the rotor and are configured to fittingly engage the rotor frame,
wherein the rotor frame comprises a plurality of ribs which are disposed at predetermined intervals in the circumferential direction and which extend in the radial direction, a shaft portion which is provided at inside diameter sides of the plurality of ribs, and a rim portion which is provided at outside diameter sides of the plurality of ribs, wherein the plurality of main magnet portions are disposed individually between the ribs which lie adjacent to each other in the circumferential direction, wherein the rotor further comprises a plurality of sub-magnet portions which are magnetized in a direction which is orthogonal to the rotational axis direction and the radial direction and are disposed individually between the magnetic members which lie adjacent to each other in the circumferential direction on-both sides in the rotational axis direction of the ribs, and wherein the axial gap motor further comprises: a biasing member which is disposed between the magnetic members and the shaft portion or the rim portion of the rotor frame, so as to bias the magnetic members in the radial direction, and
wherein the rotor further comprises support plates which are disposed on radial sides of the main magnet portions, the magnetic members and the sub-magnet portions, so as to configure magnetic pole units together with the main magnet portions, the magnetic members and the sub-magnet portions, and wherein the biasing member is made up of the support plates.

11. An axial gap motor comprising:
a rotor which rotates around a rotational axis; and
a stator which is disposed on at least one side in a rotational axis direction of the rotor in such a manner as to confront the rotor,
wherein the rotor comprises a rotor frame, a plurality of main magnet portions which are magnetized in the rotational axis direction and are disposed in a circumferential direction and a plurality of magnetic members which are disposed individually on surfaces of the main magnet portions which face the at least one side in the rotational axis direction of the main magnet portions,
wherein the magnetic members have fitting portions extending away from at least one of an outer circumferential surface and an inner circumferential surface of the magnetic members in a radial direction of the rotor and are configured to fittingly engage the rotor frame,
wherein the rotor frame comprises a plurality of ribs which are disposed at predetermined intervals in the circumferential direction and which extend in the radial direction, a shaft portion which is provided at inside diameter sides of the plurality of ribs, and a rim portion which is provided at outside diameter sides of the plurality of ribs, wherein the plurality of main magnet portions are disposed individually between the ribs which lie adjacent to each other in the circumferential direction, wherein the rotor further comprises a plurality of sub-magnet portions which are magnetized in a direction which is orthogonal to the rotational axis direction and the radial direction and are disposed individually between the magnetic members which lie adjacent to each other in the circumferential direction on-both sides in the rotational axis direction of the ribs, and wherein the axial gap motor further comprises: a biasing member which is disposed between the magnetic members and the shaft portion or the rim portion of the rotor frame, so as to bias the magnetic members in the radial direction, and
wherein the biasing member is disposed further between the sub-magnet portions and the shaft portion or the rim portion of the rotor frame, whereby the magnetic members and the sub-magnet portions are biased individually radially by the biasing member.

12. An axial gap motor as set forth in claim 11, wherein the biasing member is a biasing ring having a plurality of projections which are formed in such a manner as to project radially outwards or inwards as viewed from a side thereof.

13. An axial gap motor comprising:
a rotor which rotates around a rotational axis; and
a stator which is disposed on at least one side in a rotational axis direction of the rotor in such a manner as to confront the rotor;
wherein the rotor comprises a rotor frame, a plurality of main magnet portions which are magnetized in the rotational axis direction and are disposed in a circumferential direction and a plurality of magnetic members which are disposed individually on surfaces of the main magnet portions which face the at least one side in the rotational axis direction of the main magnet portions, and
wherein the magnetic members have fitting portions extending away from at least one of an outer circumferential surface and an inner circumferential surface of the magnetic members in a radial direction of the rotor and are configured to fittingly engage the rotor frame,
wherein a pin is inserted into the magnetic member in such a manner as to penetrate through an interior thereof in the radial direction, and wherein the pin that projects from the magnetic member configures the fitting portion; and
an engagement ring, which is interposed between the other end faces in the radial direction of the rotor of the magnetic members and the rotor frame and is adapted to be brought into engagement with the pins for fixing.

14. An axial gap motor comprising:
a rotor which rotates around a rotational axis;
a stator which is disposed on at least one side in a rotational axis direction of the rotor in such a manner as to confront the rotor,
wherein the rotor comprises a rotor frame, a plurality of main magnet portions which are magnetized in the rotational axis direction and are disposed in a circumferential direction and a plurality of magnetic members which are disposed individually on surfaces of the main magnet portions which face the at least one side in the rotational axis direction of the main magnet portions, wherein the magnetic members have fitting portions extending away from at least one of an outer circumferential surface and an inner circumferential surface of the magnetic members in a radial direction of the rotor and are configured to fittingly engage the rotor frame, and wherein the magnetic member is made up of magnetic sheets which each include a clamping portion and which are stacked together in the radial direction, and wherein the clamping portion of the magnetic sheet which configures one end face in the radial direction of the rotor of the magnetic member configures the fitting portion; and hooking plates, which are provided between the other end faces in the radial direction of the rotor of the magnetic members and the rotor frame, and are adapted to be brought into engagement with the clamping portions of the magnet sheets which configure the other end faces in the radial direction of the rotor of the magnetic members.

15. An axial gap motor as set forth in claim 14, wherein a pin is inserted into the magnetic member in such a manner as to penetrate through an interior thereof in the radial direction, and wherein the pin that projects from the magnetic member configures the fitting portion.

16. An axial gap motor as set forth in claim 14, wherein a plurality of fitting portions are provided on the one end face of the magnetic member.

17. An axial gap motor as set forth in claim 14, wherein the rotor further comprises a plurality of sub-magnet portions which are magnetized in a circumferential direction and are disposed at both end portions of the main magnet portions, and wherein the sub-magnet portions have fitting portions which are adapted to be brought into engagement with the rotor frame and are provided on one end faces in the radial direction of the rotor of the sub-magnet portions.

\* \* \* \* \*